US011807231B2

(12) United States Patent
Song et al.

(10) Patent No.: US 11,807,231 B2
(45) Date of Patent: Nov. 7, 2023

(54) ELECTRONIC DEVICE FOR VEHICLE AND OPERATING METHOD THEREOF

(71) Applicant: Samsung Electronics Co., Ltd., Gyeonggi-do (KR)

(72) Inventors: Minwoo Song, Gyeonggi-do (KR); Kyungjin Yoon, Gyeonggi-do (KR); Chulmin Lee, Gyeonggi-do (KR); Jaeseung Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 16/944,630

(22) Filed: Jul. 31, 2020

(65) Prior Publication Data
US 2021/0039639 A1     Feb. 11, 2021

(30) Foreign Application Priority Data
Aug. 5, 2019    (KR) .................. 10-2019-0094938

(51) Int. Cl.
*B60W 30/095*     (2012.01)
*B60W 50/16*     (2020.01)
(Continued)

(52) U.S. Cl.
CPC ........... *B60W 30/095* (2013.01); *B60R 11/04* (2013.01); *B60W 50/16* (2013.01);
(Continued)

(58) Field of Classification Search
CPC ............... B60W 30/095; B60W 50/16; B60W 2050/0075; B60W 2556/10;
(Continued)

(56) References Cited

U.S. PATENT DOCUMENTS 9,113,786 B2    8/2015    Li
9,242,654 B2    1/2016    Do et al.
(Continued)

FOREIGN PATENT DOCUMENTS

JP     2006-85285 A     3/2006
JP     2018-195301 A     12/2018
(Continued)

OTHER PUBLICATIONS

Korean Search Report dated Dec. 16, 2020.
(Continued)

*Primary Examiner* — Jeff A Burke
*Assistant Examiner* — Sihar A Karwan
(74) *Attorney, Agent, or Firm* — Cha & Reiter, LLC

(57) ABSTRACT

An electronic device and method are disclosed herein. The electronic device includes communication circuitry, an output interface, memory and a processor. The processor implements the method, including: storing, in the memory, accident modeling information including at least one of a history of accidents at a present location, and a first driver profile of a driver associated with the history of accidents at the present location, receiving at least a portion of a second driver profile from at least one external vehicle proximate to the vehicle via the communication circuitry, the second driver profile indicating driving characteristics of a driver of the at least one external vehicle, generating accident risk information based at least on the accident modeling information and the second driver profile, and outputting the generated accident risk information through the output interface.

19 Claims, 34 Drawing Sheets

(51) Int. Cl.
*B60R 11/04* (2006.01)
*G01C 21/34* (2006.01)
*G06F 21/32* (2013.01)
*G06V 20/62* (2022.01)
*G06V 20/58* (2022.01)
*B60W 50/00* (2006.01)

(52) U.S. Cl.
CPC ......... *G01C 21/3415* (2013.01); *G06F 21/32* (2013.01); *G06V 20/584* (2022.01); *G06V 20/62* (2022.01); *B60W 2050/0075* (2013.01); *B60W 2556/10* (2020.02); *B60W 2556/65* (2020.02)

(58) Field of Classification Search
CPC ......... B60W 2556/65; B60W 2556/45; B60W 40/09; B60W 2420/42; B60W 2540/043; B60W 2540/221; B60W 2554/4041; B60W 50/0097; B60W 2050/143; B60W 2540/30; B60W 2556/50; B60W 2556/55; B60W 2050/146; B60W 2554/4046; B60W 30/0956; B60W 2050/0005; B60W 50/14; B60W 30/08; B60W 40/02; B60W 40/08; B60W 60/001; B60W 2040/0872; B60R 11/04; G01C 21/3415; G06F 21/32; G06V 20/584; G06V 20/62; B60Y 2400/90; B60Y 2400/92; B60K 35/00; B60K 2370/11; B60K 2370/5915; G05D 1/0088; G05D 1/0285; G05D 2201/0213
See application file for complete search history.

(56) References Cited

U.S. PATENT DOCUMENTS

| | | | |
|---|---|---|---|
| 9,870,708 B2 | 1/2018 | Chandran et al. | |
| 10,024,684 B2 | 7/2018 | Wang | |
| 11,173,925 B2* | 11/2021 | Suzuki | B60K 35/00 |
| 2006/0284839 A1* | 12/2006 | Breed | B62D 1/046 |
| | | | 345/156 |
| 2008/0004806 A1* | 1/2008 | Kimura | B60W 50/16 |
| | | | 701/301 |
| 2015/0375756 A1* | 12/2015 | Do | G07C 5/0808 |
| | | | 701/1 |
| 2016/0061625 A1* | 3/2016 | Wang | G01C 21/3697 |
| | | | 701/454 |
| 2017/0057411 A1* | 3/2017 | Heath | G08G 1/20 |
| 2019/0118805 A1 | 4/2019 | Lim | |
| 2019/0329791 A1 | 10/2019 | Oba | |
| 2020/0079368 A1* | 3/2020 | Yamada | G05D 1/0055 |
| 2020/0148200 A1* | 5/2020 | Lerner | B60W 50/14 |

FOREIGN PATENT DOCUMENTS

| | | |
|---|---|---|
| KR | 10-2017-0102476 A | 9/2017 |
| KR | 10-2018-0068173 A | 6/2018 |
| KR | 10-2019-0045511 A | 5/2019 |
| KR | 10-2019-0090534 A | 8/2019 |
| WO | 2018/135318 A1 | 7/2018 |

OTHER PUBLICATIONS

European Search Report dated Feb. 1, 2021.
Korean Search Report dated Jul. 20, 2020.
Notice of Allowance dated Feb. 21, 2023.

* cited by examiner

FIG. 6

| ITEM | SOURCE | INFORMATION ATTRIBUTE | ACCIDENT ASSOCIATION/ ACCIDENT POINT | EVALUATION VALUE (ACCUMULATED) | EVALUATION VALUE (LAST ONE MONTH) | MEASUREMENT VALUE |
|---|---|---|---|---|---|---|
| LANE KEEPING IGNORANCE INFORMATION | OUTSIDE CAMERA | REAL-TIME | ACCIDENT/ ROAD123 | SEVERE | DANGER | 30 TIMES |
| DRIVER MONITORING INFORMATION | INSIDE CAMERA | REAL-TIME | | NORMAL | CHAOTIC | NORMAL/FATIGUE/DROWSY OMS(NUMBER OF PASSENGERS) |
| WEATHER INFORMATION | SYSTEM | S(static) | | LARGE INFLUENCE | NORMAL | 2019.06.23 CLEAR |
| SUDDEN START INFORMATION | | | | | | |
| SUDDEN BRAKING INFORMATION | | | | | | |

FIG. 11

| ORDER | ACCIDENT POINT | RELATIVE POSITION AT TIME OF ACCIDENT | DRIVER INFORMATION |
|---|---|---|---|
| 1 | ROAD #123 | F1 | DRIVER INFORMATION 1 |
| 2 | ROAD #123 | S1 | DRIVER INFORMATION 2 |
| 3 | ROAD #123 | S1 | DRIVER INFORMATION 2 |
| 4 | ROAD #123 | B2 | DRIVER INFORMATION 3 |
| 5 | SUBURBAN INTERSECTION #234 | ⋮ | ⋮ |
| 6 | ROAD #777 | F1 | DRIVER INFORMATION 4 |
| 7 | ROAD #777 | S1 | DRIVER INFORMATION 5 |
| 8 | ⋮ | | |
| 9 | ⋮ | | |

FIG. 20
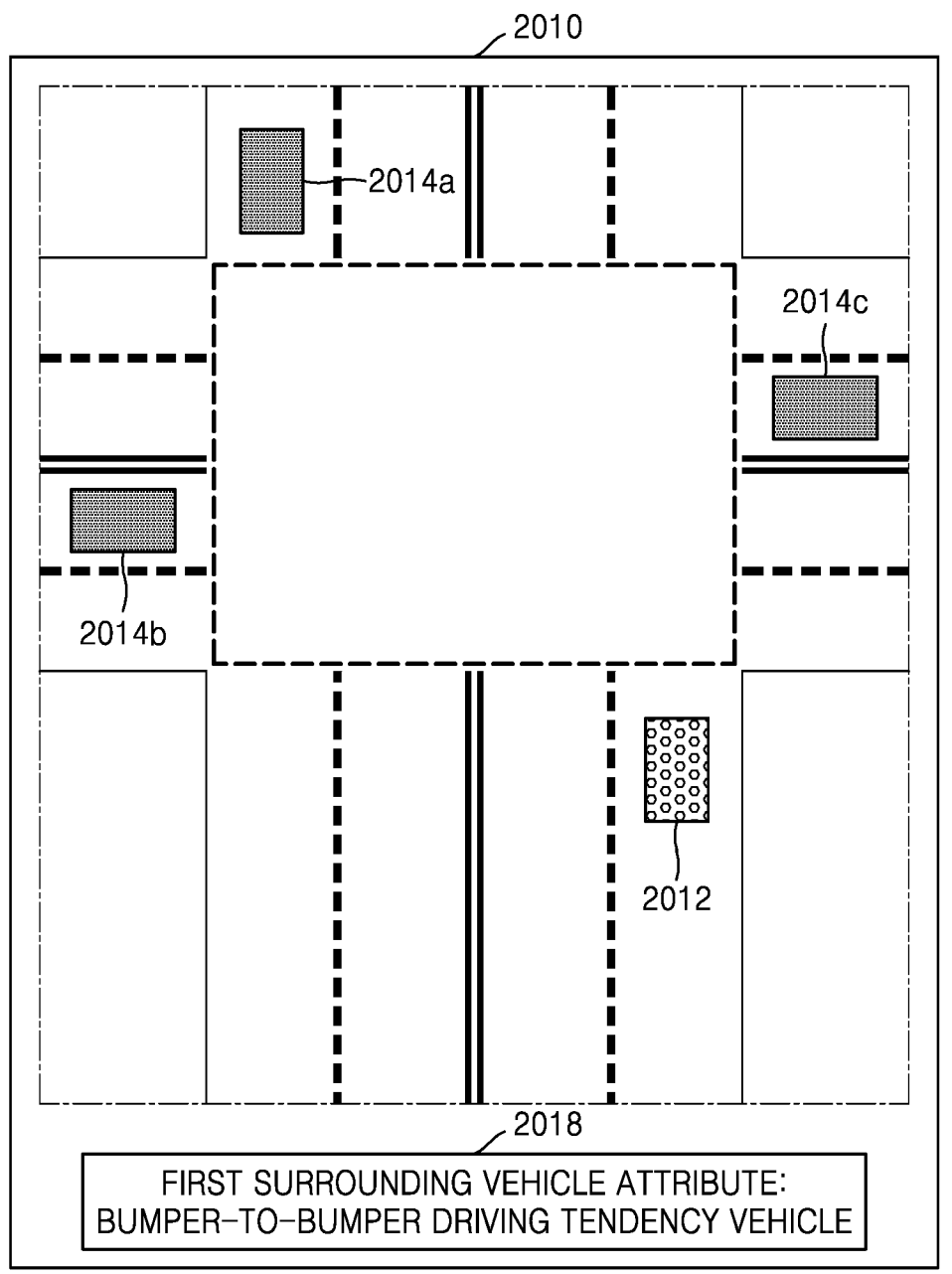
< ACCIDENT MODEL INFORMATION >
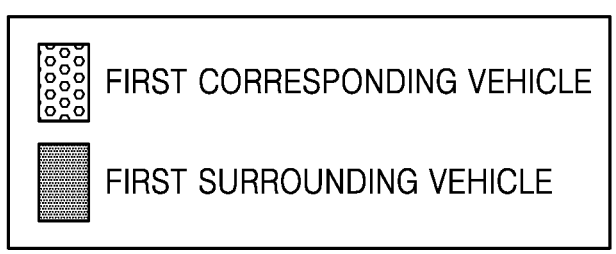

ELECTRONIC DEVICE FOR VEHICLE AND OPERATING METHOD THEREOF

CROSS-REFERENCE TO RELATED APPLICATIONS

This application is based on and claims priority under 35 U.S.C. § 119 to Korean Patent Application No. 10-2019-0094938, filed on Aug. 5, 2019, in the Korean Intellectual Property Office, the disclosure of which is incorporated by reference herein in its entirety.

BACKGROUND

1. Field

The disclosure relates to smart electronic devices for controlling motor vehicles, and more particularly, to electronically-assisted accident avoidance for motor vehicles.

2. Description of Related Art

Motor vehicle accidents are random events that are difficult to avoid. There are various causes of such accidents including drowsy driving, driver carelessness, lane deviation, road and ground factors, inclement weather, poor driving habits and human error, etc. These various causes, alone or in combination, often contribute to resulting car accidents. As the causes are difficult to predict, and because the causes affect the accidents in combination with the unpredictability of other vehicles on the road, it is difficult to predict and prevent car accidents.

SUMMARY

The present disclosure provides an electronic device for a vehicle, which is capable of predicting car accidents using accident modeling of vehicles and driver habits of surrounding vehicles, and providing accident risk information to a driver, which may serve to prevent car accidents.

Embodiments of the disclosure are provided to effectively prevent car accidents and guide a driver, by providing accurate and particular guidelines about situations in which the driver has to be careful and to facilitate accident prevention.

Embodiments of the disclosure are provided to effectively collect essential information about drivers of surrounding vehicles, in order to reduce a load on an electronic device for a vehicle and to address personal information protecting issues of the drivers of surrounding vehicles.

Additional aspects will be set forth in part in the description which follows and, in part, will be apparent from the description, or may be learned by practice of the presented embodiments of the disclosure.

According to an embodiment of the disclosure, an electronic device for a vehicle, which is provided in the vehicle, includes communication circuitry; an output interface; a memory; and at least one processor configured to: store, in the memory, accident modeling information including at least one of a history of accidents at a present location, and a first driver profile of a driver associated with the history of accidents at the present location, receive at least a portion of a second driver profile from at least one external vehicle proximate to the vehicle via the communication circuitry, the second driver profile indicating driving characteristics of a driver of the at least one external vehicle, generate accident risk information based at least on the accident modeling information and the second driver profile, and output the generated accident risk information through the output interface.

The accident model information may include accident point information and driver information of vehicles related to an accident.

The at least one processor may be further configured to determine whether a corresponding vehicle is within a certain range from a location corresponding to the accident point information, based on determining that the corresponding vehicle is in the certain range from the location corresponding to the accident point information, match the driver information included in the accident model information with the at least one piece of the second surrounding driver information received through the communicator, and based on the driver information included in the accident model information matching with the at least one piece of the second surrounding driver information, generate the accident risk information for notifying a risk of accident.

The accident model information may include relative position information of a plurality of vehicles related to the accident model and driver information of each of the plurality of vehicles, and the at least one processor may be further configured to match the driver information of the accident model with the second surrounding driver information based on the relative position information of the plurality of vehicles related to the accident model and relative positions of surrounding vehicles.

The accident model information may include attribute information of a first surrounding vehicle related to the accident model and relative position information of the first surrounding vehicle, and the at least one processor may be further configured to generate the accident risk information for notifying the accident risk, based on detecting a surrounding vehicle corresponding to the attribute information of the first surrounding vehicle at a location corresponding to relative position information of the first surrounding vehicle.

The at least one processor may be further configured to calculate risk level information of each of one or more surrounding vehicles based on similarity between the driver information included in the accident model information and the at least one piece of the second surrounding driver information, and output the risk level information for each surrounding vehicle through the output interface as the accident risk information.

The at least one processor may be further configured to calculate predicted routes of the corresponding vehicle and the at least one surrounding vehicle and a predicted accident point based on the accident model information and the at least one piece of the second surrounding driver information, and output information about the predicted routes and the predicted accident point through the output interface as the accident risk information.

The at least one processor may be further configured to output the accident risk information by vibrating a vibration device installed in a steering wheel of the vehicle.

The vibration device may include a plurality of vibration devices arranged at different locations in the steering wheel, and the at least one processor may be further configured to selectively vibrate the vibration device at a location corresponding to a direction having a threshold accident risk, from among the plurality of vibration devices.

The at least one processor may be further configured to receive image data of the surrounding vehicles captured by a camera included in the vehicle, determine a surrounding vehicle from which the at least one piece of the second surrounding driver information is to be requested based on number plate information of the surrounding vehicle identified from the image data, and request the at least one piece of the second surrounding driver information from the surrounding vehicle via the communicator.

The at least one processor may be further configured to identify a driver by authenticating the driver of the vehicle, obtain corresponding driver information of the authenticated driver, and generate the accident risk information based on the corresponding driver information, the accident model information, and the at least one piece of the second surrounding driver information.

The at least one processor may be further configured to authenticate the driver through biometric authentication of the driver.

The at least one processor may be further configured to obtain the corresponding driver information of the authenticated driver from a server via the communicator, update the corresponding driver information of the authenticated driver based on information collected during driving, and upload the corresponding driver information that is updated to the server via the communicator.

The at least one processor may be further configured to determine an accident risk area having a threshold risk of occurrence of an accident on a driving route based on destination information and the accident model information, and output information about the accident risk area via the output interface.

The at least one processor may be further configured to generate driving guide information for preventing an accident based on the accident model information and the at least one piece of the second surrounding driver information, and output the driving guide information via the output interface.

The at least one processor may be further configured to detect occurrence of an accident caused by the driver of the vehicle based on at least one of image data obtained from the camera of the vehicle, a detection signal obtained by a sensor in the vehicle, an abnormal system turn-off signal obtained from the vehicle, or accident information obtained from an external server.

The at least one piece of the second surrounding driver information received from the surrounding vehicle may include at least one of real-time second surrounding driver information or second surrounding driver information accumulated for a certain time period, and the at least one processor may be further configured to generate the accident risk information based on at least one of the real-time second surrounding driver information or the second surrounding driver information accumulated for the certain time period.

The at least one processor may be further configured to generate accident risk information related to an inside situation of the vehicle based on inside situation information of the vehicle obtained by monitoring the inside situation of the vehicle, and output the accident risk information related to the inside situation of the vehicle via the output interface.

According to another embodiment of the disclosure, an operating method of an electronic device for a vehicle is disclosed, including storing, in a memory, accident modeling information including at least one of a history of accidents at a present location, and a first driver profile of a driver associated with the history of accidents at the present location, receiving, via communication circuitry, at least a portion of a second driver profile from at least one external vehicle proximate to the vehicle, the second driver profile indicating driving characteristics of a driver of the at least one external vehicle, generating, via a processor, accident risk information based at least on the accident modeling information and the second driver profile, and outputting the generated accident risk information through an output interface.

According to another embodiment of the disclosure, a non-transitory computer-readable recording medium stores thereon computer program instructions for performing, when executed by a processor, an operating method of an electronic device for a vehicle, wherein the operating method includes storing, in a memory, accident modeling information including at least one of a history of accidents at a present location, and a first driver profile of a driver associated with the history of accidents at the present location, receiving, via communication circuitry, at least a portion of a second driver profile from at least one external vehicle proximate to the vehicle, the second driver profile indicating driving characteristics of a driver of the at least one external vehicle, generating, via the processor, accident risk information based at least on the accident modeling information and the second driver profile, and outputting the generated accident risk information through an output interface.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram showing an example of driver habit information, according to an example embodiment of the disclosure;

FIG. 11 is a diagram showing first type accident model information according to an example embodiment of the disclosure;

FIG. 20 is a diagram showing second type accident model information corresponding to bumper-to-bumper vehicles, according to an example embodiment of the disclosure;

DETAILED DESCRIPTION

Figure 1:
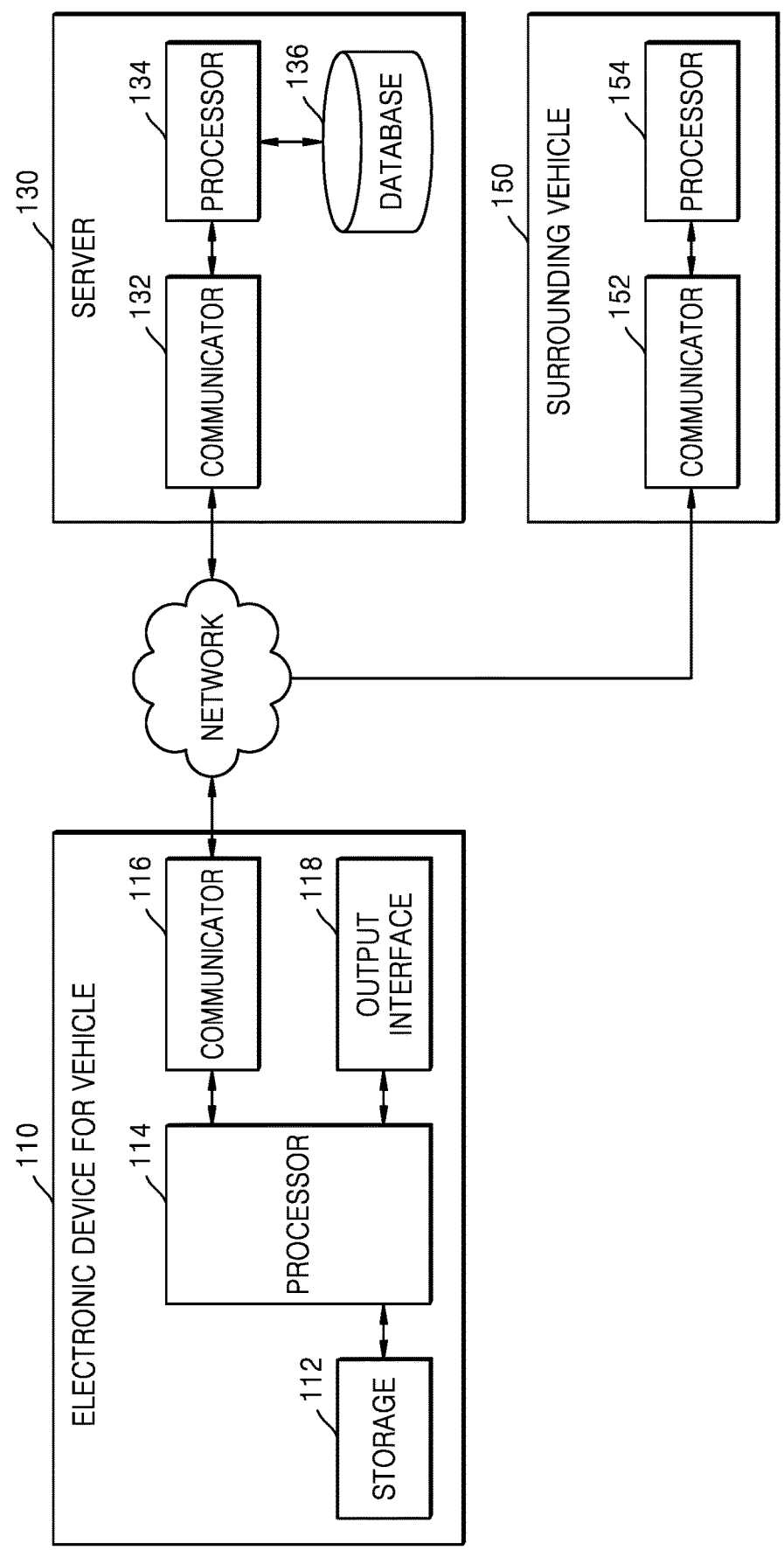
FIG. 1 is a diagram illustrating a structure including an electronic device for a vehicle, a server, and a surrounding vehicle, according to an example embodiment of the disclosure.

The specification describes and discloses principles of the disclosure so as to clarify the claims and enable one of ordinary skill in the art to implement the embodiments of the disclosure described in claims. The embodiments of the disclosure may be implemented in various ways.

Throughout the specification, like reference numerals denote the same elements. The present specification does not explain all of the elements of the embodiments of the disclosure, and content common in the technical field to which the embodiments of the disclosure belongs or same content among the embodiments of the disclosure will be omitted. In the specification, terminologies 'module' or 'unit' may be implemented by one or combination of two or more of hardware, software, and firmware, and according to the embodiments of the disclosure, a plurality of 'modules' or 'units' may be implemented as one element or one 'module' or 'unit' may include a plurality of elements. The principles and certain embodiments of the disclosure will be described with reference to the accompanying drawings.

Throughout the disclosure, the expression "at least one of a, b or c" indicates only a, only b, only c, both a and b, both a and c, both b and c, all of a, b, and c, or variations thereof.

In the specification, a vehicle includes all kinds of moving units running on a road or a track. The vehicle may include, for example, automobiles, motor bicycles, etc., and the automobiles include various forms such as passenger cars, freight cars, two-wheeled cars, etc. The vehicle includes autonomous vehicles. In the specification, a corresponding vehicle denotes a vehicle on which an electronic device 110 is mounted. In the specification, a surrounding vehicle denotes a vehicle adjacent to the corresponding vehicle in front, rear, side, and diagonal directions. According to an embodiment of the disclosure, the surrounding vehicle may include a vehicle adjacent to the corresponding vehicle with an intervening vehicle therebetween, or a vehicle adjacent to the corresponding vehicle with an empty lane therebetween.

In the specification, a driver denotes a person who drives the vehicle. A corresponding driver denotes a driver of a vehicle on which the electronic device 110 is mounted, and a surrounding driver denotes a driver of a surrounding vehicle.

In the specification, driver information (e.g., a driver "profile") may include at least one of driving habits of the driver, tendency of the driver, or driving history of the driver, or a combination thereof. The driver information includes driving habit information. According to an embodiment of the disclosure, the driver information may be managed and stored for each person. According to another embodiment of the disclosure, the driver information may be managed and stored for each vehicle, and the vehicle may be identified via number plate information, vehicle identification number, etc. Corresponding driver information denotes driver information of a driver of a corresponding vehicle, and surrounding driver information denotes driver information of a driver in a surrounding vehicle.

In the specification, a passenger refers to a passenger, except the driver, from among passengers riding the vehicle.

FIG. 1 is a diagram illustrating a structure including the electronic device 110, a server, and a surrounding vehicle, according to an embodiment of the disclosure.

The electronic device 110 may be mounted on the vehicle. The electronic device 110 provides a user interface in a vehicle system, and also provides various information and functions that a user may utilize. The electronic device 110 may be provided as a component of the vehicle electronic control unit (ECU) controlling power and other core systems of the vehicle, or implemented separately from the ECU. The electronic device 110 may be implemented as an advanced driver assistant system (ADAS). The electronic device 110 may be or include components (e.g., displays) arranged around a dashboard of the vehicle. The electronic device 110 may be built-in the vehicle, or may be detachable from the vehicle.

The electronic device 110 includes a storage 112 (e.g., memory), a processor 114, a communicator 116, and an output interface 118.

The storage 112 stores program instructions, information, and content that are utilized for operating the electronic device 110. The storage 112 may include a volatile storage medium, a non-volatile storage medium, or a combination thereof. The storage 112 may be implemented in various types of storage media. The storage 112 may include a storage medium of at least one type of a flash memory type, a hard disk type, a multimedia card micro type, a card type memory (e.g., an SD or XD memory, etc.), random access memory (RAM), static RAM (SRAM), a read-only memory (ROM), electrically erasable programmable ROM (EEPROM), programmable ROM (PROM), a magnetic memory, a magnetic disk, or an optical disk.

The processor 114 controls overall operations of the electronic device 110. The processor 114 may include one or more processors. The processor 114 may perform a certain operation by executing an instruction or a command stored in the storage 112.

The communicator 116 (e.g., communication circuitry) may perform wired and/or wireless communication with a surrounding vehicle 150, and a server 130. During operation (e.g., driving) wireless may be desirable as wired connections are not feasible. During maintenance or non-travel situations, in some embodiments, wired connections may be utilized. The communicator 116 may include at least one communication circuit (e.g., a "module" which is not shown) that communicates according to a wireless communication standard. The communicator 116 may perform near field communication by using, for example, Bluetooth, Bluetooth low energy (BLE), near field communication, WLAN (Wi-Fi), ZigBee, infrared data association (IrDA) communication, Wi-Fi direction (WFD), ultra-wideband (UWB), Ant+ communication, etc. In another example, the communicator 116 may perform mobile communication, and may transmit/receive at least one wireless signal to/from at least one of a base station, an external terminal, or a server on a mobile communication network. For example, the communicator 116 may use Wave, C-Vehicle to Everything (V2X), 5G-V2X, LTE-V2X, etc.

The output interface 118 outputs various information generated by the electronic device 110. The output interface 118 may include a display and/or an audio output. The output interface 118 may include a touch screen. The display displays a graphical user interface (GUI) view of the electronic device 110. The display may include, for example, a liquid crystal display apparatus, an organic electroluminescent display apparatus, an electrophoretic display apparatus, etc.

The server 130 may include a communicator 132 (e.g., communication circuitry), a processor 134, and a database 136.

The server 130 may correspond to various types of electronic devices or may be implemented in the form of a cloud server.

The communicator 132 communicates with the electronic device 110. The communicator 132 may communicate a plurality of electronic devices for vehicle. As in the above description about the communicator 116 of the electronic device 110, the communicator 132 may be implemented in the forms of various communication types.

The processor 134 controls overall operations of the server 130. The processor 134 transmits accident model information to the electronic device 110 and receives driver information and accident information from the electronic device 110 via the communicator 132.

The database 136 stores accident model information, driver information for each driver, authentication information, etc. The database 136 may be implemented in various types of storage media. The database 136 may include a storage medium in at least one type of a flash memory type, a hard disk type, a multimedia card micro type, a card type memory (e.g., SD or XD memory), RAM, SRAM, ROM, EEPROM, PROM, a magnetic memory, a magnetic disk, or an optical disk. According to an embodiment of the disclosure, the database 136 may correspond to a cloud storage space. For example, the server 130 and the database 136 may be implemented by cloud service.

The surrounding vehicle 150 communicates with the electronic device 110 via the communicator 152. The surrounding vehicle 150 may include an electronic device including the processor 154 and the communicator 152. The surrounding vehicle 150 may transfer surrounding driver information of the surrounding vehicle 150 according to a request from the electronic device 110 of the corresponding vehicle. Also, the electronic device 110 in the corresponding vehicle may transfer corresponding driver information to the surrounding vehicle 150 according to a request from the surrounding vehicle 150.

Communication between the corresponding vehicle and the surrounding vehicle 150 may be performed by various vehicle-to-vehicle (V2V) communication methods. For example, the electronic device 110 may communicate with the surrounding vehicle 150 by using a dedicated short-range communications (DSRC) system, C-V2X, 5G-V2X, LET-V2X, etc.

Figure 2:
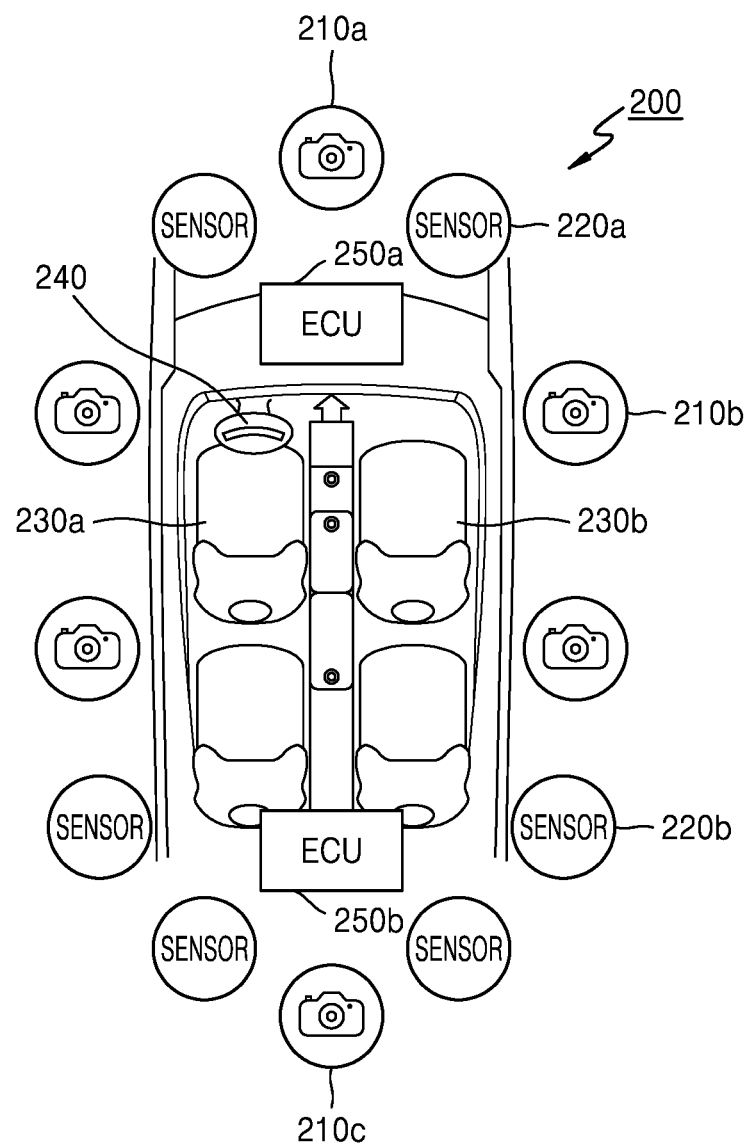
FIG. 2 is a diagram showing a configuration of a vehicle system according to an example embodiment of the disclosure.

FIG. 2 is a diagram showing a configuration of a vehicle system 200 according to an embodiment of the disclosure.

According to an embodiment of the disclosure, the vehicle system 200 includes a plurality of components which may be installed within a vehicle frame. The vehicle system 200 include one or more cameras 210a, 210b, and 210c on front, side, rear portions, etc. of the vehicle. One or more cameras 210a, 210b, and 210c may include an exterior camera for monitoring (e.g., via optical video or image capture) an exterior environment of the vehicle and an interior camera for monitoring (e.g., via optical video or image capture) of the vehicle. The vehicle system 200 includes one or more sensors 220a and 220b. The sensors 220a and 220b may be disposed on a plurality of locations within the vehicle frame. The sensors 220a and 220b may include various types of sensors, e.g., a proximity sensor, an illuminance sensor, a rain sensor, etc. The vehicle system 200 includes a driver's seat 230a and a passenger seat 230b, and a steering wheel 240 disposed in front of the driver's seat 230a. The vehicle system 200 includes one or more electronic control units (ECU) 250a and 250b that control overall vehicle systems and functionality (e.g., power systems, coordinating engine and drivetrain controls, etc.).

Figure 3:
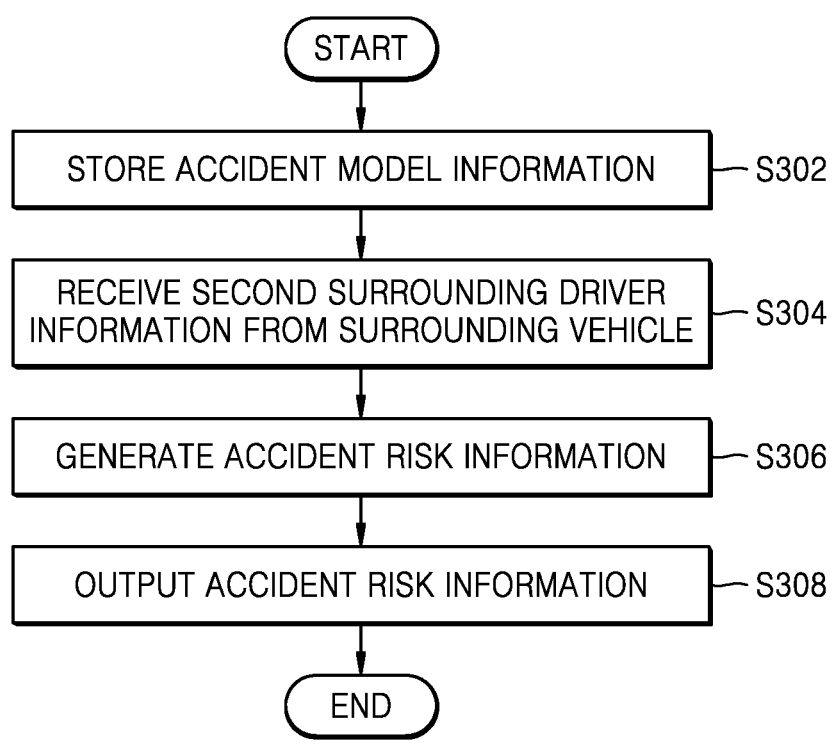
FIG. 3 is a flowchart of an operating method of an electronic device for a vehicle, according to an example embodiment of the disclosure.

FIG. 3 is a diagram for describing an operating method of the electronic device 110, according to an embodiment of the disclosure.

Each of the stages in the operating method of the electronic device 110 for a vehicle according to the embodiment of the disclosure may be performed by various types of electronic devices each including a processor, a communicator, and an output interface. In the present disclosure, an example is provided, in which the electronic device 110 executes the operating method of the electronic device 110 for a vehicle, as will be described below. Therefore, embodiments of the disclosure, which are described with respect to the electronic device 110, may be applied to embodiments of the disclosure with respect to the operating method of the electronic device 110 for a vehicle, or vice versa. The operating method of the electronic device 110 for a vehicle according to the embodiments of the disclosure is not limited to performance by the installed electronic device 110 described in the specification herein, but may be implemented using various types of electronic devices. For example, the operating method of the electronic device 110 for a vehicle may be implementing using a portable electronic device, such as, for example, when a driving mode of the portable electronic device is executed.

The electronic device 110 stores accident model information in the storage 112 (S302). The electronic device 110 may receive the accident model information from the server 130 and store the accident model information in the storage 112 at a certain time point. For example, the electronic device 110 may download and store the accident model information when initially activated. In another example, the electronic device 110 may receive and store the accident model information in storage 112 when the vehicle is started, when a navigation function is started, or when an accident guide function is executed.

According to an embodiment of the disclosure, the electronic device 110 may store the accident model information cyclically. For example, the electronic device 110 may receive and store the accident model information every few minutes, in order to maintain up-to-date accident model information.

According to another embodiment of the disclosure, the electronic device 110 may receive and store the accident model information whenever the server 130 updates the accident model via a push-notification model. For example, whenever an accident model is updated, the server 130 "pushes" the accident model information to the electronic device 110, and the electronic device 110 may then receive and store the accident model information.

The accident model information includes information about historical traffic incidents useful for predicting the possibility of an accident, based on existing accident history and/or information related to surrounding nearby drivers. The accident model information is related to driver information (e.g., or driver profile), meaning information related to a present operator of the motor vehicle, such as driving habits, characteristics, etc. That is, the accident model information may define an accident model based on corresponding driver information related to a present operator of the vehicle, and surrounding driver information related to other drivers of other vehicles proximate to the operated vehicle.

In the specification, the corresponding driver information and the surrounding driver information included in the accident model information are referred to as first corresponding driver information and first surrounding driver information. Also, in the specification, driver information of a vehicle including the electronic device 110 is referred to as second corresponding driver information, and surrounding driver information of a surrounding vehicle obtained during actual operation of the electronic device 110 is referred to as second surrounding driver information.

There may be various types of accident model information.

A first type of accident model information indicates a location where an accident has historically occurred, and driver information for drivers present at the scene, at the time of the accident. This first type of accident modeling can predict accidents by detecting similarities between 1) driver information for drivers who were present and/or involved with the historical accidents, 2) driver information of a current operator of the vehicle, and 3) driver information of drivers who are proximate to the vehicle, when the vehicle is traveling near the site of the historical accident. When matches of a certain threshold exist in the data indicated above, the electronic device 110 may calculate a quantified risk of an accident. Here, an embodiment of the disclosure in which the combination of the second surrounding driver information is considered (e.g., excluding other considerations), and an embodiment of the disclosure in which the combination of the second corresponding driver information and the combination of the second surrounding driver information are both considered may be implemented.

The accident model information may include information relevant to the location where the historical accident(s) occurred, such as information about the road or surrounding environment. The location information may include a geographic coordinate indicating the precise locational "point" of the accident. The road type may also be indicated therein, identifying the road as a highway, a local road, an intersection, etc. According to an embodiment of the disclosure, the location information may in some embodiments include the road type without including information on a specific point of the accident. For example, the first type accident model may define a type of accident that frequently occurs on any highway access road without identifying a specific highway access road.

The accident model information may further include driver information relating to driver actions, habits or characteristics of drivers present at the historical accident(s). For example, the first type accident model information may include a model about an accident between a vehicle "B" situated in a left turn lane, and a vehicle "C" disposed at the right of the vehicle B at intersection A, and may also include information indicating driver habit of the respective drivers of vehicle B and vehicle C. Here, the driver information for the operator of vehicle C may indicate a history of failing to observe entry lane positions.

In a second type of accident model information, the accident model information may be defined by a combination of the first driver information (i.e., driver information of an operator of the vehicle) and the first surrounding driver information (i.e., driver information of an operator of a nearby vehicle). In this second type, the accident model is defined purely by the considerations of the corresponding driver information and the surrounding driver information, without reference to accident history. For example, the accident model information may be generated by a consideration of the driver nearby driver's history of overtaking from a right rear position, and the first current vehicle operator's history of failing to comply with a regulated speed limit. In the second type, further information may be considered, such as road type, weather, etc., in addition to driver characteristics as indicated above.

Next, the electronic device 110 may receive second driver information from a surrounding vehicle (S304) (e.g., a nearby vehicle), indicating driving characteristics of a driver operating the surrounding vehicle.

Figure 4:
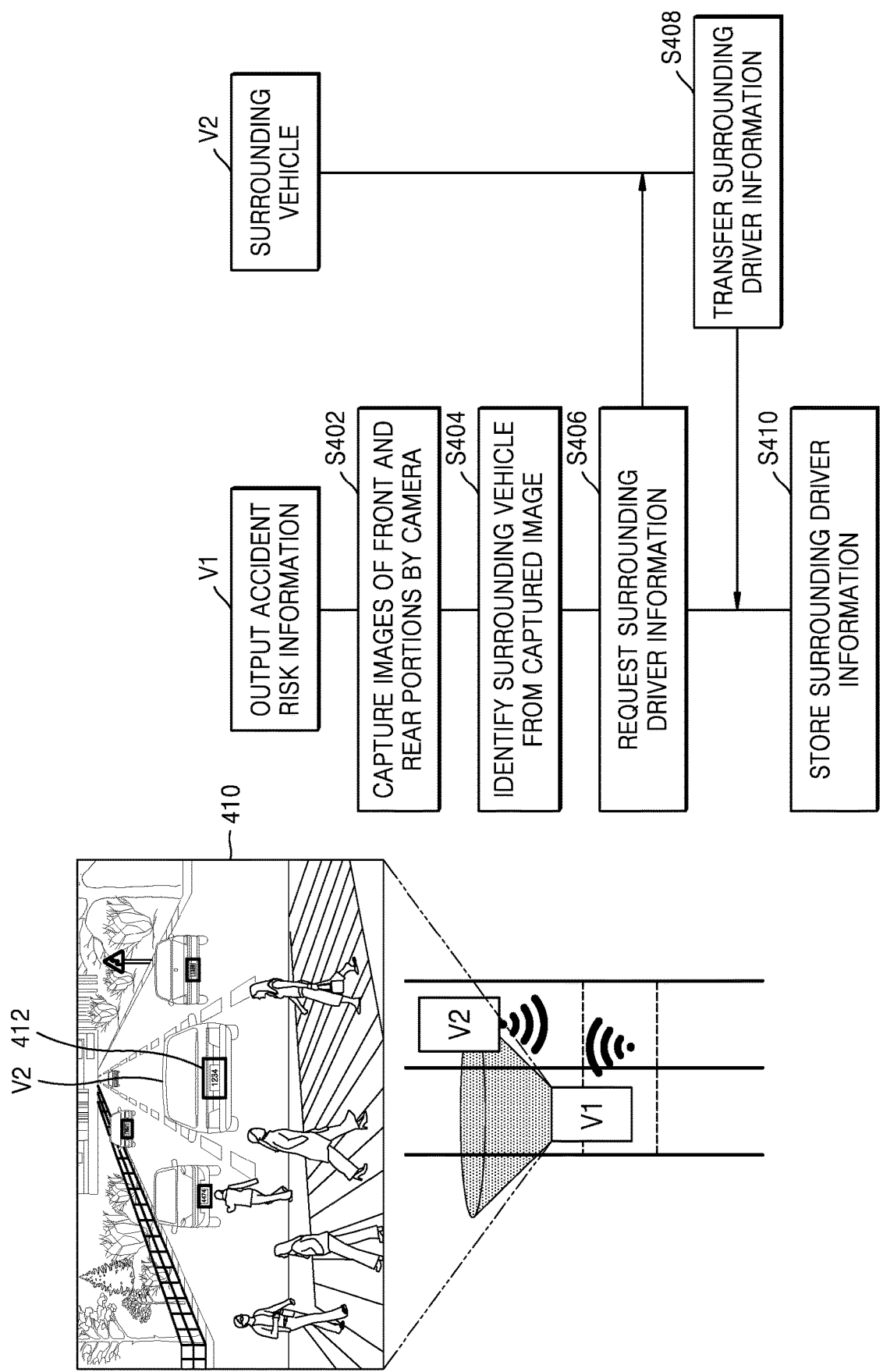
FIG. 4 is a flowchart illustrating a process of receiving second surrounding driver information, according to an example embodiment of the disclosure.

FIG. 4 is a flowchart illustrating a process of receiving second surrounding driver information according to an embodiment of the disclosure.

As shown in FIG. 4, an example is illustrated in which a present vehicle V1 is driving on a road, and a surrounding vehicle V2 is driving adjacent to the present vehicle V1.

The electronic device 110 may capture imagery 410 of front, rear, and side portions of the present vehicle V1, using one or more cameras (S402). The imagery 410 may be continually captured in real-time.

When the imagery 410 is captured, the electronic device 110 of the present vehicle V1 may identify surrounding vehicles from the captured image 410 (S404). According to an embodiment of the disclosure, the electronic device 110 of the present vehicle V1 detects the surrounding vehicle V2 and recognizes a number plate 412 of the surrounding vehicle V2 to identify the surrounding vehicle V2.

The electronic device 110 of the corresponding vehicle V2 requests second surrounding driver information from the surrounding vehicle V2, based on the number plate (S406). According to an embodiment of the disclosure, the electronic device 110 may request the second surrounding driver information from some of the surrounding vehicles detected from the captured image 410 (e.g., from less than all surrounding vehicles). For example, the electronic device 110 may select a particular vehicle. The particular vehicle may be selected based on positioning within a threshold distance from the present vehicle V1, driving for a certain time period within the threshold distance, a vehicle for which generated quantified risk information indicates at least a threshold level of danger, etc. One or more such particular vehicles may thus be selected from among the recognized surrounding vehicles captured in imagery 410, and the present vehicle V1 may transmit a request for driver information related to the operators of the selected vehicles.

The surrounding vehicle V2 may also transmit the driver information request to the present vehicle V1 in response to receiving the request for driver information from the present vehicle V1 (S408). When transmitting the requested driver information, the surrounding vehicle V2 may transmit an entirety of the requested driver information, or may transmit a portion of the requested driver information (e.g., less than all extracted items). When a portion less than entirety of the information is to be transmitted, parts of the driver information may be selected for transmission by considering, for example, a relative position of the surrounding vehicle V2 to the present vehicle V1, driver habit information of the present vehicle A1, etc. Also, the surrounding vehicle V2 may transmit the second surrounding driver information to the present vehicle V1 except the items regarding personal information (e.g., driver's name, phone number, age, etc.)

When receiving the second surrounding driver information from the surrounding vehicle V2, the present vehicle V1 stores the second surrounding driver information (S410). According to an embodiment of the disclosure, when storing the second surrounding driver information, the electronic device 110 may store the second surrounding driver information in association with the relative position of the surrounding vehicle V2 with respect to the present vehicle V1. For example, relative location information, e.g., "right front portion," may be stored as the relative position of the surrounding vehicle V2 together with the second surrounding driver information indicating driving habits and history of the operator of the surrounding vehicle V2. The relative position of the surrounding vehicle V2 may be determined based on GPS information, the captured image, etc.

According to an embodiment of the disclosure, when the second surrounding driver information is not obtained from the surrounding vehicle V2, the electronic device 110 may set the second surrounding driver information using default information. The electronic device 110 may fail to obtain the second surrounding driver information from the surrounding vehicle V2 for reasons such as communication incompatibility with the surrounding vehicle V2, a lack of communication functionality in the surrounding vehicle V2, failure to communicate with the surrounding vehicle V2 despite adequate hardware due to distance or other environment factors, etc. In this case, the electronic device 110 may set the second surrounding driver using default values, and may generate accident risk information.

According to another embodiment of the disclosure, the electronic device 110 does not obtain the second surrounding driver information directly from the surrounding vehicle V2, the electronic device 110 may request the second surrounding driver information from a server. The present vehicle V1 transmits identification information of the surrounding vehicle V2 to a server and requests the driver information of the operator of the surrounding vehicle V2. The server may retrieve the second surrounding driver information of the surrounding vehicle V2 from storage, and transmit the second surrounding driver information to the present vehicle V1.

Figure 5A:
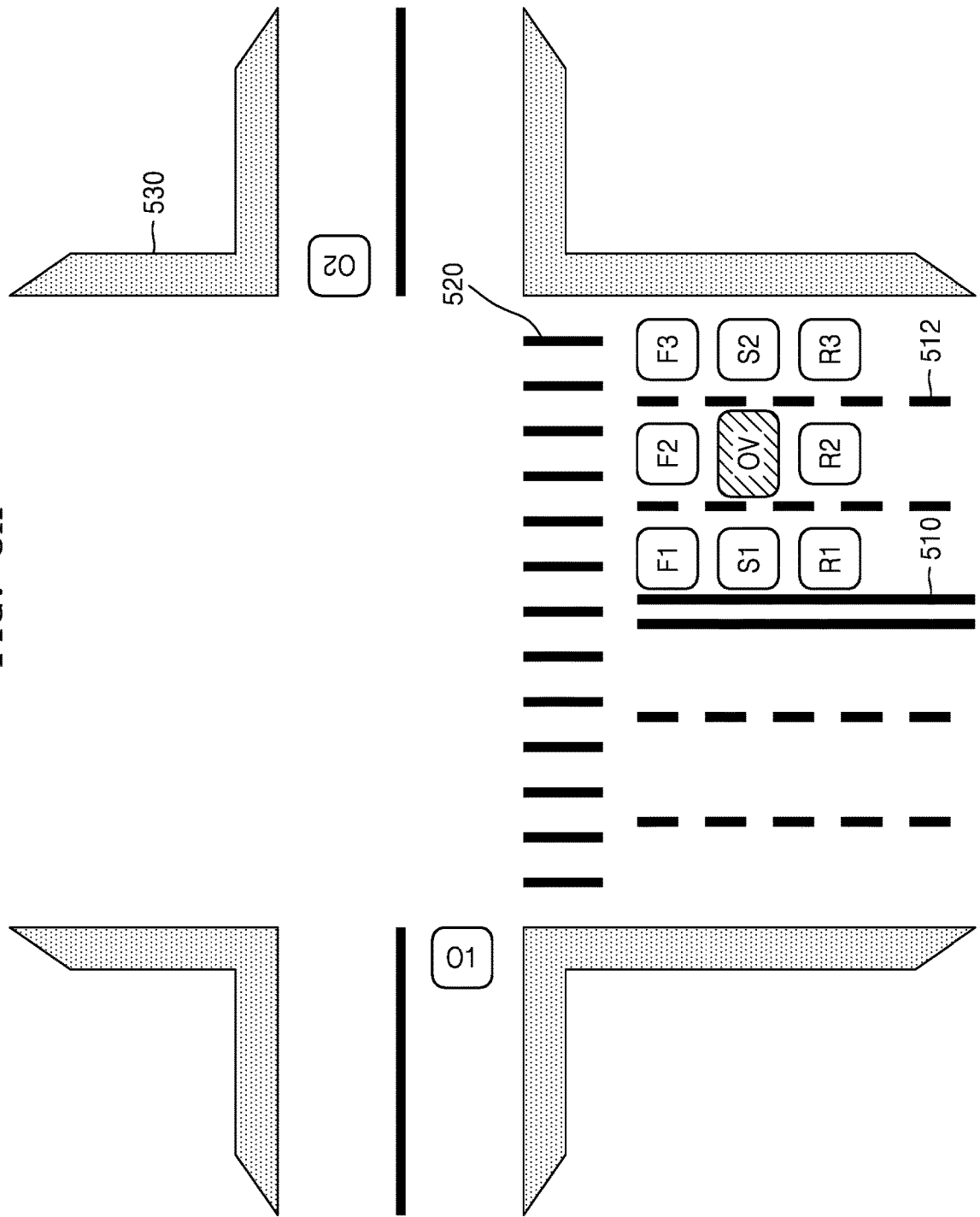
FIG. 5A is a diagram illustrating an example of defining relative positions of a corresponding vehicle and a surrounding vehicle, according to an example embodiment of the disclosure.

FIG. 5A is a diagram illustrating an example, in which relative locations of a corresponding vehicle and a surrounding vehicle are defined, according to an embodiment of the disclosure.

FIG. 5A illustrates a method of defining relative positions between a present vehicle OV and surrounding vehicles F1, F2, F3, S1, S2, R1, R2, R3, O1, and O2 at an intersection. In the specification of the disclosure, the method of defining the relative positions of the surrounding vehicles at an intersection, for example, but the relative positions of surrounding vehicles may be defined in a similar way in various types of roads, besides the intersection. FIG. 5A shows a center line 510, a white dotted line 512, a crosswalk 520, and a sidewalk border 530.

As shown in FIG. 5A, based on the present vehicle OV, front surrounding vehicles F1, F2, and F3, side surrounding vehicles S1 and S2, and rear surrounding vehicles R1, R2, and R3 may be defined. According to an embodiment of the disclosure, identification symbols such as F1, F2, F3, S1, S2, R1, R2, and R3 may be assigned to the vehicles according to relative positions of the vehicles, to notate them in memory. In addition, the nearby vehicle O1 waiting for left turn or going straight on a left side of the intersection, and the nearby vehicle O2 waiting for left turn or going straight at a right side of the intersection, may also be defined as the surrounding vehicles despite not being proximately adjacent to the present vehicle OV. The vehicles waiting for the left turn or going straight at the left and right sides of the intersection may be defined as the surrounding vehicles because there is a possibility of an accident when the vehicles violate a traffic signal or approach bumper-to-bumper closeness in the intersection.

According to an embodiment of the disclosure, the relative positions of the surrounding vehicles may be defined by assigning identification numbers corresponding to certain locations, as shown in FIG. 5A. For example, the left front vehicle may be defined as F1, the front center vehicle may be defined as F2, the right front vehicle may be defined as F3, the left side vehicle may be defined as S1, the right side vehicle may be defined as S2, the left rear vehicle may be defined as R1, the rear center vehicle may be defined as R2, and the rear right vehicle may be defined as R3. Also, the left turn/going straight standby vehicle at the left of the intersection may be defined as O1 and the left turn/going straight standby vehicle at the right of the intersection may be defined as O2. The identification symbol for each relative position is provided herein as an example, and may be variously defined.

According to another embodiment of the disclosure, the relative position of the surrounding vehicle may be defined using a relative coordinate. For example, a coordinate system having the present vehicle OV at a center is defined, coordinates of surrounding vehicles are defined in the coordinate system, and then, the relative positions of the surrounding vehicles may be represented.

The relative positions of the surrounding vehicles vary depending on driving of the vehicles. The present vehicle OV may detect and update the relative positions of the surrounding vehicles in real-time.

A distance between the present vehicle OV and the surrounding vehicle may be detected in various manners.

According to an embodiment of the disclosure, the distance between the present vehicle OV and the surrounding vehicle may be measured by a sensor such as Radar. The present vehicle OV may include radar sensors at a plurality of locations, e.g., a front portion, a rear portion, side portions, etc. thereof, and may measure the distance to the surrounding vehicle by detecting an echo wave that is obtained by reflecting electromagnetic waves of the radar sensors from the surrounding vehicles. The electronic device 110 may measure the distance to the surrounding vehicle based on the detection signal obtained from the sensor such as radar.

According to another embodiment of the disclosure, the distance between the present vehicle OV and the surrounding vehicle may be measured by using GPS information. The electronic device 110 may measure the distance between the present vehicle OV and the surrounding vehicle from location information of the present vehicle OV and the surrounding vehicle obtained from the GPS information.

The operation of calculating the distance between the present vehicle OV and the surrounding vehicle may be performed by a combination of a plurality of methods. For example, the electronic device 110 may measure the distance between the present vehicle OV and the surrounding vehicle by using the information obtained from a sensor signal of radar, etc. and GPS information together.

Figure 5B:
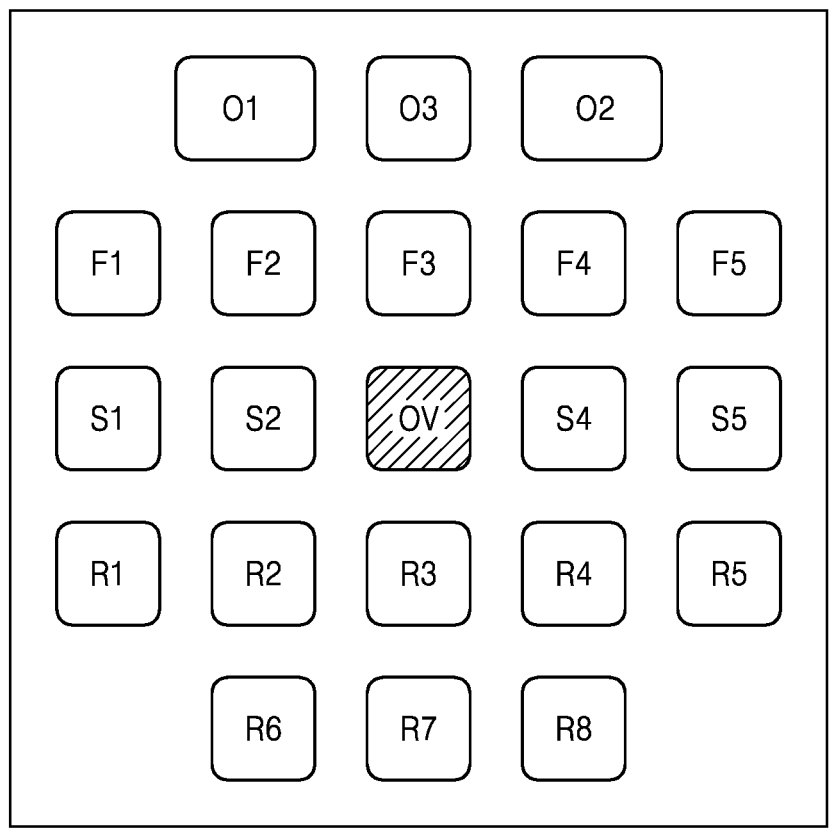
FIG. 5B is a diagram illustrating an example of defining relative positions of a corresponding vehicle and a surrounding vehicle, according to an example embodiment of the disclosure.

FIG. 5B is a diagram illustrating an example, in which relative locations of a corresponding vehicle and a surrounding vehicle are defined, according to an embodiment of the disclosure.

According to another embodiment of the disclosure, the surrounding vehicles may include vehicles F2, F3, F4, S2, S4, R2, R3, and R4 adjacent to the present vehicle OV and vehicles F1, F5, S1, S5, R1, R5, R6, R7, and R8 across the adjacent vehicles. Also, at an intersection, the surrounding vehicles may include a nearby vehicle O1 waiting for left turn/go-straight at the left of the intersection, a nearby vehicle O2 waiting for left turn/go-straight at the right of the intersection, and a nearby vehicle O3 waiting for left turn at opposite side of the intersection.

Referring back to FIG. 3, when receiving the second surrounding driver information, the electronic device 110 generates accident risk information based on the accident model and the second surrounding driver information (S306). As described above, the accident model includes the first type (as described earlier, which is based on the historical accident information for the location, and driver information of the vehicles that were present at the historical accident), and the second type (as described earlier, which is defined by a combination of the first corresponding driver information and surrounding driver information). The accident models may predict a threshold risk of occurrence of an accident at the present time, based on the various subsets of data. That is, the electronic device 110 may generate the accident risk information by comparing all or portions of the accident model with the current location, second corresponding driver information, and/or surrounding driver information in real-time.

When the current location corresponds to a location where the accident has occurred, based on the first type accident model, the electronic device 110 may generate the accident risk information by matching the historical driver information included in the accident model with the second surrounding driver information received from the surrounding vehicle(s). Matching may indicate a threshold level of similarity between the historical driver information of the accident model and the present surrounding driver information, and as such, the electronic device 110 determines a threshold quantified probability of an accident occurring. When matching the driver information of the accident model with the second surrounding driver information, the electronic device 110 matches the positions of historical vehicles included in the accident model, to the present positions and arrangements of vehicles nearby and/or surrounding the present vehicle OV, and matches the respective driver information of the historical vehicles in the accident model to the driver information for the nearby/surrounding vehicles based on that positioning. For example, it may be determined that there is below-threshold possibility of causing an accident when surrounding nearby vehicle is at the left front portion (e.g., F2 in FIG. 5B), but it may be determined that there is a threshold probability of an accident when the nearby vehicle is disposed at the right side of the present vehicle (e.g., S4).

According to an embodiment of the disclosure, when the location information of the accident included in the first type accident model corresponds to the location information of the vehicle that is currently driving, and when driver information in the historical data has some threshold similarity with driver information of the presently involved drivers, the electronic device 110 may determine a threshold level of accident risk (whether using the first or second type of accident model).

The electronic device 110 generates the accident risk information by matching the driver information of the vehicles included in the accident model with the second surrounding driver information received from the surrounding vehicle, based on the second type accident model. As a result of matching, when there is a threshold similarity between the first surrounding driver information and the second surrounding driver information, the electronic device 110 determines that the accident risk meets a predetermined threshold value. When matching the driver information of the accident model with the second surrounding driver information, the electronic device 110 matches the driver information of the vehicles at corresponding locations. For example, it may be determined that there is rare possibility of causing an accident when the second surrounding vehicle is at the left front portion of the corresponding vehicle, but it may be determined that there is a possibility of causing an accident when the second surrounding vehicle is at the right side of the corresponding vehicle.

The accident risk information may include a risk level information defined in certain levels according to the accident risk possibility. For example, the risk level information may be defined in levels of safe, normal, cautious, danger, etc.

According to an embodiment of the disclosure, the accident risk information may represent risk level information according to a driving path of the corresponding vehicle. For example, the accident risk information may have the risk level information defined as a cautious level with respect to a left turn route and defined as a safe level with respect to a straight route.

According to another embodiment of the disclosure, the risk level information may represent risk level information of the surrounding vehicle. For example, the accident risk information of the front right vehicle may be defined as a cautious level and the accident risk information of the left side vehicle may be defined as a safe level.

When the accident risk information is determined, the electronic device 110 outputs the accident risk information through an output interface (S308). The electronic device 110 may display the accident risk information on a display or may output the accident risk information as voice guide via a speaker. In another example, the electronic device 110 may output the accident risk information as a vibration pattern through a steering wheel or a driver's seat. In another example, the electronic device 110 may transmit the accident risk information to an external device (e.g., a portable communication device, etc.)

FIG. 6 is a diagram showing an example of driver habit information, according to an embodiment of the disclosure.

The driver habit information (e.g., as a part of driver information, driver profile, etc.) includes information on a driver's behavior and tendencies, as collected in some embodiments during operation of the vehicle. The driver habit information may be obtained either in real-time, or historically over a time period based on the information collected during the driving of the vehicle, and may be further updated during operation.

The electronic device 110 may collect and generate the driver habit information from the information obtained from the vehicle system during the driving. The processor 114 may generates an evaluation value or a measurement value of the driver habit information based on the information obtained from the camera, the sensor, ECU in the vehicle, or the external device, and may store the evaluation value or the measurement value in the storage 112. Also, the processor 114 may generate statistics information about the driver habit information and generate and store the evaluation value and the measurement value, when the driving is ended. Also, the processor 114 may upload the driver habit information to the server 130 at the end of driving. In addition, the driver habit information may be transferred from the server 130 to the electronic device 110.

The driver habit information may be stored in the electronic device 110 of the corresponding vehicle or the database 136 of the server 130. The server 130 may additionally process the driving habit information received from the vehicle, and may store the driver habit information in the database 136 for each driver or each vehicle.

The driver habit information may include at least one of lane keeping ignorance information, driver monitoring information, weather information, sudden start information, sudden braking information, drowsiness information, road type/point information, entry lane location information, driver personal information, signal compliance information, date and time information, car model information, signal change time elapse information, guide ignorance tendency information, accident information, overtaking tendency information, regulated speed compliance information, steering wheel direction change/rapid turn information, multimedia utilization information, safety zone entry information, center line over information, U-turn lane non-compliance information, change lane (dotted line) non-compliance information, non-protected high speed entry information, bumper-to-bumper driving information, or left/right turn indicator violation information, or a combination thereof.

When an accident has occurred in association with one of the entries in the corresponding driver habit information, the driver habit information may include information pertaining to the related accident. For example, referring to the lane keeping ignorance information (e.g., a driver's tendency to fail to adhere to a present traffic lane), when an accident is caused by the driver's failure to adhere to the traffic lane, the driver habit information may include information on the historical accident related to the driver's failure to adhere to their lane (i.e., the lane keeping ignorance information), in addition to accident location information, and road type information about the road where the accident has occurred (e.g., local road, highway, on-ramp, off-ramp, etc.).

The driver habit information may further include an evaluation value about the corresponding item of the driver habit information. For example, an evaluation value such as normal, frequency, danger, severe, etc. may be granted with respect to the lane keeping ignorance information. The valuations may be associated with a count of certain driver actions. For example, a driver's failure to adhere to their lane may be rated "severe" if it occurs a predetermined number of times within a predetermined time period (e.g., five times a week). According to an embodiment of the disclosure, the driver habit information may include evaluation values in different time periods for the item of the driver habit information. For example, the driver habit information may store a cumulative evaluation value, a cumulative evaluation value for the last one month, a cumulative evaluation value for the last one week for the driver habit information item.

The driver habit information include a measurement value regarding the corresponding item of the driver habit information. For example, a measurement value obtained through 10 times may be granted to the lane keeping ignorance information.

The driver habit information may have various information attributes, e.g., static data, real-time data, tracking data, etc. The static data is information data that rarely changed once collected, the real-time data continuously changes in real-time, and tracking data is obtained by recording values of the driver habit information according to a viewpoint during a certain time period.

The lane keeping ignorance information includes information on the number of lane departure times. The lane keeping ignorance information may include information on lane violation count (i.e., except for lane change), information on lane keeping ignorance count per driving, etc. The lane keeping ignorance information may be obtained from image data obtained by an exterior camera of the vehicle. The lane keeping ignorance information is obtained in real-time during driving. The evaluation value of the lane keeping ignorance information may be set as normal, frequent, danger, and severe, and the measurement value may be defined by the count number (e.g., 10 times).

The driver monitoring system (DMS) information indicates a status of the driver obtained while monitoring the driver. The DMS information may be obtained from image data that is obtained by an interior camera of the vehicle. The DMS information may be obtained in real-time while driving. The evaluation value of the DMS information may be set as normal, frequent, danger, and severe, and the measurement value may include estimations of the driver's physical state, using facial recognition techniques of estimation, etc., and thus be defined as normal, alert, drowsy, fatigued, etc. The evaluation value of the DMS information may also include the number of passengers if any are present.

The weather information indicates weather conditions. The weather information may indicate relationships between driver habits and the weather. The weather information may be obtained from the information obtained by the vehicle system. For example, the weather information may be obtained by an illuminance sensor, a rain sensor, etc. included in the vehicle. In another example, the weather information may be obtained from an external device or the server 130 via the communicator 116. The weather information may be obtained at the time of starting the driving or with a certain period. The evaluation value of the weather information may denote a relationship between the weather and the risk level information of the driver, and may be set as, e.g., not affected, normal, largely affected, etc. The measurement value of the weather information may represent weather value according to time and date (clear, rain, snow, foggy, stormy, etc.)

The "sudden start" information a count of sudden starts during the driving, meaning instances in which the driver initiated sudden acceleration (e.g., typically from a stop). The sudden start information may be obtained from image data obtained by the exterior camera of the vehicle, a detected value of the sensor of the vehicle (e.g., accelerometer), or a velocity measurement value obtained by the vehicle system. The sudden start information may be obtained in real-time during the driving. The evaluation value of the sudden start information may be set as normal, frequent, danger, and severe, and a measurement value may be defined by a ratio of the number of sudden starts with respect to the total number of starts (e.g., 50%).

The "sudden braking" information denotes information about the number of sudden braking during the driving, meaning instances in which the driver initiated hard and sudden braking during operation. The sudden braking information may be obtained from image data obtained by the exterior camera of the vehicle, a detection value of the sensor in the vehicle, or a velocity measurement value obtained by the vehicle system. The sudden braking information may be obtained in real-time during the driving. The evaluation value of the sudden braking information may be set as normal, frequent, danger, and severe, and a measurement value may be defined by a ratio of the number of sudden braking with respect to the total number of braking (e.g., 50%).

The brake information denotes a frequency of using the brake, and/or brake application and tracking information. The brake tracking information may represent the number of times that the driver initiates braking during a recent time period (e.g., 30 seconds historically from a present time). The tracking information may include, e.g., braking information for 30 seconds before the accident occurs (a time point when the driver initiates braking, braking pattern, etc.) A tracking section duration may be set or changed by a user. Here, the user may include the driver, a server manager, a system designer, etc. The brake information may be obtained from the vehicle system such as ECU. The brake information may be obtained in real-time during the driving. The brake information after a braking event occurs is tracked, and then, the brake information may include tracked information regarding the brake. An evaluation value of the brake information may be set as normal, frequent, danger, and severe, and may represent the number of times that the driver initiates braking within a certain time period.

The drowsiness information represents a count of times the driver is identified as drowsy during operation of the vehicle, a current time (or time range) for which the user drove drowsy, and a location of the vehicle at the time of drowsy driving (e.g., section information of a route on which drowsy driving occurred). The drowsy driving information is obtained by a camera of the DMS, and time information and location information at the time of drowsy driving may be obtained from the GPS information. The drowsy driving information may be obtained in real-time during the driving. The drowsy driving information may include information regarding the drowsy driving tracked while the drowsy driving continues after the drowsy driving event occurs. The evaluation value of the drowsy driving information may be set as normal, frequent, danger, and severe, and a measurement value may include information on duration time of the drowsy driving, the time zone of the drowsy driving, weather at the time of drowsy driving, etc.

The road type/point information may include information about a type of road and/or a point (e.g., a point of interest). The road type/point information may be obtained from image data obtained by the exterior camera of the vehicle and the GPS information. The road type/point information may be obtained in real-time during the driving. An evaluation value of the road type/point information may be set as, e.g., local road, highway, intersection, tunnel, alley, etc. A measurement value of the road type/point information may include, for example, point information for a certain recent period.

The entry lane location information may represent information on whether the vehicle improperly enters (e.g., violates) the entry lane when making left turn or right turn at an intersection. The entry lane location information may be obtained from image data obtained by the exterior camera of the vehicle and the GPS information. The entry lane location information is obtained in real-time during the driving. An evaluation value of the entry lane location information may be set as compliant or non-compliant (e.g., indicating whether the driver, during the turn, moved the vehicle partially or fully into an incorrect lane of traffic). A measurement value of the entry lane location information may denote an entry lane location (for example, first straight lane for making left turn, right second lane for making right turn) when making the left turn or right turn while violating the entry lane.

The driver personal information include personal information of the driver, including driving experience of the driver (e.g., a number of years as an active driver), age of the driver, gender of the driver, and body size (e.g., body mass index falling into predefined ranges, associated with qualifiers such as "larger," "average," and "smaller"). The driver personal information may be set at an initial time of registering the driver. A measurement value of the driver personal information may include values of a plurality of items in the personal information of the driver (for example, 3 years of driving experience, 27 years old, male, average).

The "signal" compliance information denotes the number of traffic signal violations and/or law violations. The traffic signal compliance information may be obtained from the image data obtained by the exterior camera of the vehicle. According to an embodiment of the disclosure, the electronic device 110 senses a traffic signal from the obtained image data, and determines whether the driver complied with the traffic signal based on the driving information of the vehicle. The traffic signal compliance information may be obtained in real-time during driving. The evaluation value of the traffic signal compliance information may be set as normal, frequent, danger, and severe, based on pre-associations of each category with a certain range and frequency of violations. For example a frequency range of running one to four red light per year may be associated with "normal," whereas a frequency of running one to four red lights a month may be associated with "severe." These labels may then be applied to users based on the count of violations for a given time frame. The measurement value of the traffic signal compliance information may be defined as a ratio of signal violation with respect to the total number of signal detection (e.g., 10%).

The time and date information represents information about the driving time zone, days of the week, and holidays. The time and date information may be obtained from the vehicle system or an external device via the communicator 116 of the electronic device 110. An evaluation of the time and date information may include time and date information related to the accident (for example, Monday, holiday, 10 AM, etc.) A measurement value of the time and date information may represent certain time and date of driving.

The car model information indicates attributes of the vehicle, and may include, e.g., information as to whether the vehicle is a rental car, a vehicle type, a vehicle model, a vehicle manufacturer, etc. The car model information may be obtained from the vehicle system. An evaluation value of the vehicle information includes an evaluation value about the vehicle type and whether the vehicle is a rental car, for example, may be set as sedan/rental, sedan/own car, etc.

The traffic signal change time elapse information indicates elapsed time after signal change when the vehicle passes the traffic signal, in a case in which the driver violates the traffic signal. For example, when the driver violates the traffic signal, for example, by passing through an intersection after the traffic signal changes to the stop signal or passing through a crosswalk, the traffic signal change time elapse information indicates elapsed time after the traffic signal change. The traffic signal change time elapse information may be obtained from the image data obtained by the exterior camera of the vehicle. According to an embodiment of the disclosure, the electronic device 110 receives signal information from a signal system by communicating with the traffic signal system, determines the traffic signal change time from the traffic signal information, and obtains the traffic signal change time elapse information. The electronic device 110 may communicate with the traffic signal system through a V2X or vehicle to infrastructure (V2I) communication. The traffic signal change time elapse information may be obtained in real-time during the driving. An evaluation value of the traffic signal change time elapse information may be set as normal or elapse time statistical value (e.g., 3 seconds). A measurement value of the traffic signal change time elapse information may be set as signal compliance, yellow light (when crossing a stop line after the sign changes to yellow light), stop signal (when crossing a stop line after the sign changes to red light), etc.

The "guide ignorant tendency" information indicates a tendency of the driver to ignore accident risk information and/or driving guide information (e.g., navigational information). For example, when the driver changes the lane even though the system suggests maintenance of the lane, it is determined that the driver has ignored the guide, which may be counted or otherwise noted. The guide ignorant tendency information is obtained based on driving information obtained from the vehicle system, the accident risk information output through the output interface 118, or the driving guide information. The guide ignorant tendency information is obtained in real-time during the driving. An evaluation value of the guide ignorant tendency information may be set as normal, frequent, danger, severe, etc. A measurement value of the guide ignorant tendency information may be defined as a non-compliance ratio of the number of times of providing the accident risk information or driving guide information (e.g., 50%).

The accident information includes information about an accident, when an accident occurs. The accident information may include an accident point, and driver information at the time of the accident. The accident information may be obtained from information obtained by the vehicle system, the camera included in the vehicle, the sensor, a main control unit (MCU) of the vehicle, etc. According to an embodiment of the disclosure, the accident information may be obtained from an external server, for example, an insurance company server, a traffic-infrastructure related server, a police server, etc.

The overtaking tendency information indicates information on whether the driver frequently overtakes other vehicles while driving. The overtaking tendency information may include information about overtaking frequency, lanes before/after the overtaking, overtaking velocity, etc. The overtaking tendency information may be obtained from information obtained by the exterior camera of the vehicle, the vehicle system, etc. An evaluation value of the overtaking tendency information may be set as normal, frequent, danger, severe, etc.

The regulated speed compliance information includes information as to whether the vehicle observes the legal speed limit. The regulated speed compliance information may be determined based on regulated speed detected from the image data obtained by the exterior camera of the vehicle or regulated speed information obtained from an external server. Also, the regulated speed compliance information may be obtained by using speed information obtained from the vehicle system. The regulated speed compliance information may be obtained in real-time during the driving. The regulated speed compliance information may include information obtained by tracking whether to comply with the regulated speed from the point of violating the regulated speed, when the regulated speed violation occurs. An evaluation value of the regulated speed compliance information may be set as normal, frequent, danger, severe, etc.

The "steering wheel direction change" or "rapid turn" information indicates historical information on the driver's habits in steering the car. The system may determine whether the driver has a tendency to steer aggressively, resulting in frequent rapid turns. The steering wheel direction change/rapid turn information may be obtained based on steering information obtained from the vehicle system. The steering wheel direction change/rapid turn information is obtained in real-time during the driving. An evaluation value of the steering wheel direction change/rapid turn information may be set as normal, frequent, danger, severe, of which each category may be associated with, for example, an arc length by which the steering wheel was turned as measured against a time in which the steering wheel turn was completed, etc.

The multimedia utilization information includes information on whether audio/video system is used during the driving. The multimedia utilization information may include information such as information on whether the audio/video system is used during the driving, volume, etc. The multimedia utilization information may be obtained from the vehicle system, and may be obtained in real-time during the driving. An evaluation value of the multimedia utilization information may be set as normal, frequent, danger, severe, etc., and a measurement value may be set as a ratio of the time of using the multimedia (e.g., 50%) with respect to the total driving time.

The safety zone entry information denotes information about the number of times entering the safety zone (e.g., the curbside) on the road while driving. The center line violation information denotes information about the number of times crossing over the center line while driving. The U-turn lane non-compliance information denotes information about the number of times that the driver does not comply with the U-turn lane (e.g., illegal U-turn execution). The changing lane (dotted line) non-compliance information denotes information about the number of times the driver changes lane through a lane (e.g., solid line) other than the changing lane. The safety zone entry information, the center line violation information, the U-turn lane non-compliance information, and the changing lane non-compliance information may be obtained from image data obtained by the exterior camera of the vehicle and the information obtained from the vehicle system. Evaluation values of the above information may be set as normal, frequent, danger, severe, etc., and measurement values of the above information may be represented by the number of detected during a certain time period or certain number of driving operations, or a ratio with respect to the number of times changing the lanes.

The unprotected signal high-speed entry information denotes information about a velocity, the number of attempts, presence of surrounding vehicles, and a distance when making unprotected pass. The unprotected signal high-speed entry information may be obtained from image data obtained by the exterior camera of the vehicle and may be obtained in real-time during the driving. An evaluation value of the unprotected signal high-speed entry information may be set as normal, frequent, danger, severe, etc., and a measurement value of the unprotected signal high-speed entry information may be represented as a ratio of high-speed entries (e.g., 50%) with respect to the total number of unprotected signal entries.

Figure 7:
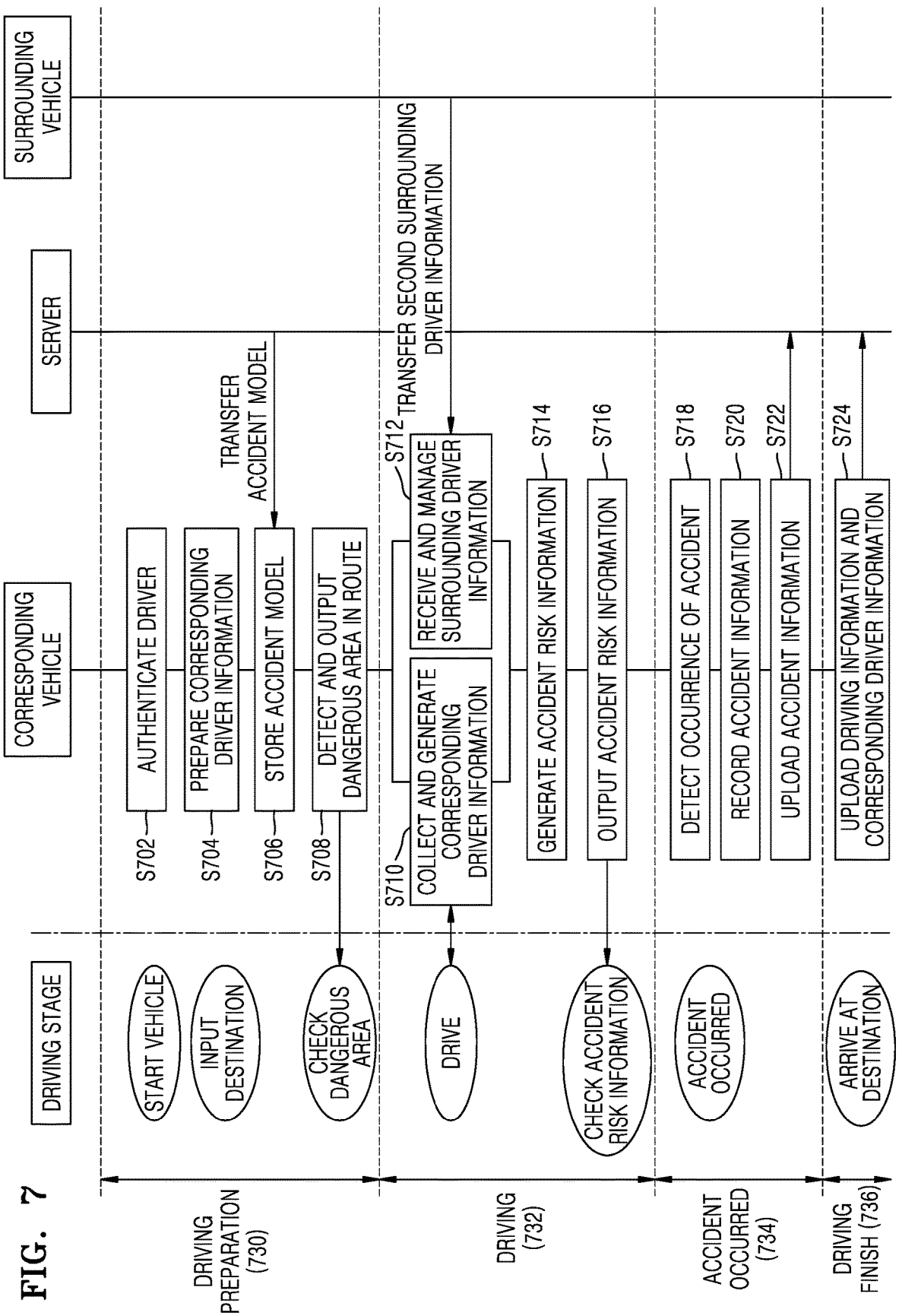
FIG. 7 is a diagram illustrating operations of a corresponding vehicle, a server, and a surrounding vehicle according to a driving stage, according to an example embodiment of the disclosure.

FIG. 7 is a diagram illustrating operations of a corresponding vehicle, a server, and a surrounding vehicle according to a driving step, according to an embodiment of the disclosure.

According to an embodiment of the disclosure, the driving stage may include a driving preparation stage 730, a driving stage 732, and a driving termination stage 736. Also, when an accident occurs, the driving stage may include an accident occurrence stage 734. The driving stages are performed by the corresponding driver of the corresponding vehicle during driving of the corresponding vehicle, and operations of the driving stages may be related with the actions of the corresponding vehicle.

In the driving preparation stage 730, the corresponding driver (e.g., the present driver) starts the vehicle and the electronic device 110 is activated. In addition, in the driving preparation stage 730, the corresponding driver may input a destination. In the driving preparation stage 730, the corresponding vehicle (e.g., the present vehicle) performs a corresponding driver authentication when started (S702). The corresponding driver authentication may be performed by a method of using bio-signals such as fingerprints, iris, etc., a method of using an identification (ID)/password, a method of receiving authentication information through short-range communication with an external device (portable communication terminal, etc.), etc.

Next, the corresponding vehicle prepares second corresponding driver information by using the driver authentication information (S704). The second corresponding driver information includes the driver habit information. The electronic device 110 may prepare the second corresponding driver information by using the second corresponding driver information stored therein, receiving the second corresponding driver information from a server, or by using a combination thereof.

In addition, the electronic device 110 receives and stores accident modeling information from the server in the driving preparation stage 730 (S706). The storing of the accident modeling information may correspond to S302 of FIG. 3, and detailed descriptions thereof are omitted.

Operation S704 and operation S706 may be performed sequentially or in parallel.

When receiving the accident model, the electronic device 110 detects a dangerous area included in the path to the destination and outputs the detected dangerous area information by using the accident history information included in the accident model. The electronic device 110 determines whether the dangerous area corresponding to the accident location information is included in the passage to the destination based on the accident location information of the accident history information included in the accident model. When the dangerous area corresponding to the accident location information is included in the passage, the electronic device 110 outputs information about the dangerous information through the output interface 118. The user is provided with the dangerous area included in the passage to the destination in the driving preparation stage 730, and then may drive carefully in the dangerous area. When there are a plurality of passages to the destination, the electronic device 110 determines whether there is a dangerous area in each of the plurality of passages. The electronic device 110 may provide information about the dangerous area for each of the plurality of passages.

When starting the driving, the driving stage 732 is performed. When starting driving of the vehicle, the electronic device 110 collects and generates the second corresponding driver information (S710). During the driving of the vehicle, the electronic device 110 collects and updates information with respect to each of the one or more driver information items included in the second corresponding driver information. For example, the electronic device 110 collects lane keeping ignorance information from the captured image of the exterior camera of the vehicle in real-time, and performs statistics on the lane keeping ignorance information collected in real-time and generates the lane keeping ignorance information. Also, when generating the lane keeping ignorance information from the captured image, the electronic device 110 may calculate a plurality of statistical values for different time sections, for example, a cumulative evaluation value, a recent one-month evaluation value, a current driving evaluation value, etc., and may generate a plurality of evaluation values according to the time periods respectively from the plurality of statistical values.

In addition, while the vehicle is operated and travel is underway, the electronic device 110 may continually receive and manage second surrounding driver information (S712) (e.g., data regarding the driving habits of other drivers encountered on the roadway). The receiving of the second surrounding driver information corresponds to operation S304 described above with reference to FIG. 3. The managing of the second surrounding driver information includes an operation of determining whether to request surrounding vehicles for driver information, an operation of managing the second surrounding driver information received from the surrounding vehicles according to relative locations of the surrounding vehicles. The surrounding vehicle transmits the second surrounding driver information to the corresponding vehicle according to the request from the corresponding vehicle.

The electronic device 110 generates the accident risk information based on the accident model information, the second corresponding driver information, and the second surrounding driver information (S714). Processes of generating the accident risk information correspond to operation S306 of FIG. 3.

Also, the electronic device 110 for the corresponding vehicle outputs the accident risk information (S716) (e.g., via an output interface, such as a display, an audio system, etc.). The outputting of the accident risk information corresponds to operation S308 of FIG. 3.

When an accident occurs during the driving, the accident occurrence stage 734 is initiated.

The electronic device 110 for the corresponding vehicle may detect occurrence of an accident based on at least one of the captured image of the exterior camera, a sensor signal of the corresponding vehicle, an ECU output signal, abnormal turning-off of the vehicle system during the driving, or accident information received from an external device, or a combination thereof (S718).

When detecting the accident, the electronic device 110 obtains and records the relevant accident information (S720). The accident information may include at least one of an accident location, a road type at the accident location, corresponding driver information at the time of accident, surrounding driver information and relative location of the surrounding vehicle at the time of accident, or signal information, or a combination thereof. The accident information may include accident information for a certain time period before the accident occurs. During the driving, the electronic device 110 may collect and temporarily store at least one of location information within a certain time period, road type, corresponding driver information, the surrounding driver information and relative location of the surrounding vehicle, or signal information, or a combination thereof. When the accident occurs, the electronic device 110 may record the accident information within a certain time period by using temporarily stored information.

The electronic device 110 uploads the obtained accident information to the server (S722). The server generates and stores accident model information of a first type by using the received accident information.

Operations in the accident occurrence stage 734 are performed when the accident occurs, and are not performed when the accident does not occur.

When finishing the driving of the corresponding vehicle, the driving termination stage 736 is performed (e.g., "driving finish"). In the driving termination stage 736, the electronic device 110 for the corresponding vehicle uploads driving-related information collected during the driving stage 732 and the second corresponding driver information to the server (S724). According to an embodiment of the disclosure, the electronic device 110 for the corresponding vehicle performs statistics on the second corresponding driver information with respect to a certain section to calculate an evaluation value, and uploads the evaluation value to the server. In addition, according to an embodiment of the disclosure, the electronic device 110 for the corresponding vehicle may transmit the second corresponding driver information to the server, except for the personal information (e.g., driver's name, phone number, age, etc.).

Figure 8:
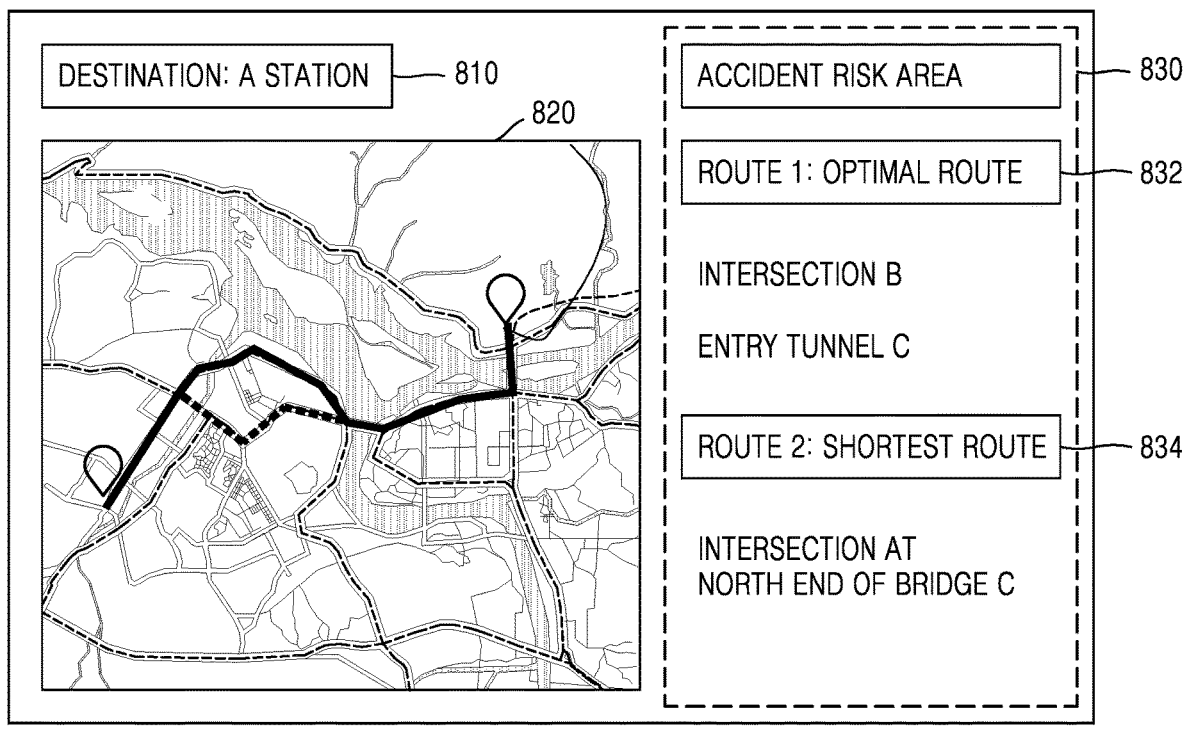
FIG. 8 is a diagram showing a graphical user interface (GUI) view detecting and outputting a dangerous area on a route in a driving preparation stage, according to an example embodiment of the disclosure.

FIG. 8 is a diagram showing a graphical user interface (GUI) view detecting and outputting a dangerous area in a route in a driving preparation step according to an embodiment of the disclosure.

According to an embodiment of the disclosure, the electronic device 110 may detect and indicate via output a dangerous portion along a navigational route to the destination in the driving preparation stage (S708). FIG. 8 shows a GUI view outputting the dangerous area in the passage, according to an embodiment of the disclosure. According to an embodiment of the disclosure, the electronic device 110 searches for passages to the destination when the destination is set. To do this, the electronic device 110 may execute a navigation program to search for a route to the destination or may receive route information to the destination from the server. When the route to the destination is determined, the electronic device 110 determines a dangerous area in the route by matching the accident location information included in the accident model to each point in the route. As shown in FIG. 8, the electronic device 110 may provide information about the dangerous area detected in the route.

The GUI view providing the dangerous area according to an embodiment of the disclosure may include destination information 810, map information 820, and accident risk area information 830. The destination information 810 indicates a destination set by the user. The map information 820 indicates route information from a starting location to the destination on a map. The accident risk area information 830 indicates dangerous area information detected along the route to the destination. The accident risk area information 830 indicates dangerous area information for each of one or more routes 832 and 834. According to an embodiment of the disclosure, the accident risk area information 830 includes a list of accident risk area information as shown in FIG. 8. According to another embodiment of the disclosure, the accident risk area information may be expressed on the map information 820. For example, an indicator indicating the accident risk area may be indicated on a point corresponding to the accident risk area information. According to another embodiment of the disclosure, the accident risk area information is indicated on the map information 820, and at the same time, may be expressed in a list as illustrated with the accident risk area information 830 depicted in FIG. 8.

Figure 9:
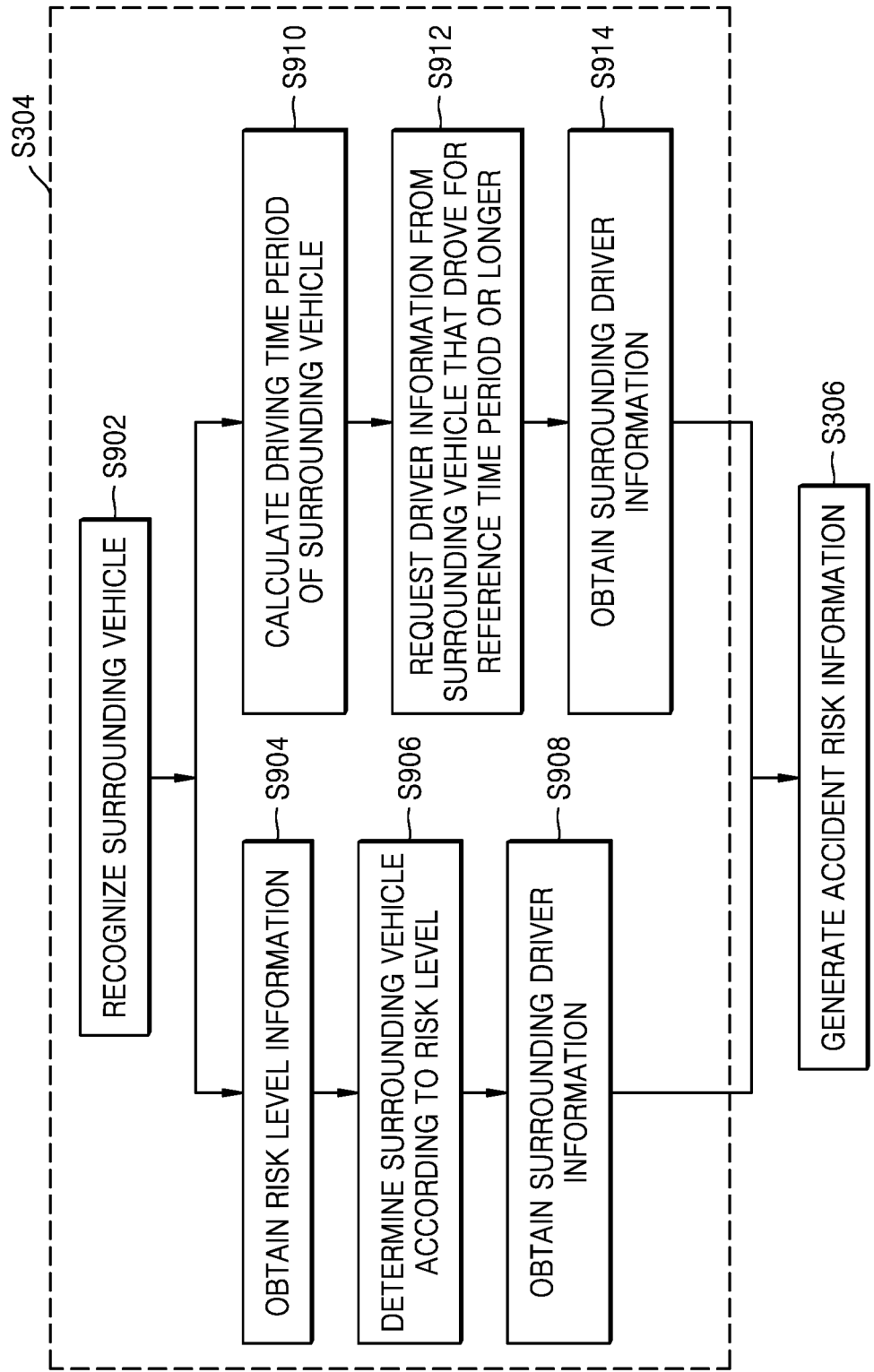
FIG. 9 is a flowchart illustrating a process of collecting second surrounding driver information, according to an example embodiment of the disclosure.

FIG. 9 is a flowchart illustrating a process of collecting second surrounding driver information according to an embodiment of the disclosure. The flowchart of FIG. 9 illustrates an example of the detailed operation in operation S304 of FIG. 3.

According to an embodiment of the disclosure, the electronic device 110 for the vehicle identifies surrounding vehicles from the imagery obtained by the exterior camera in order to request, from the surrounding vehicles, second surrounding driver information (S902) (e.g., information indicating driving characteristics of the drivers of the surrounding vehicles). The electronic device 110 identifies the surrounding vehicles detected from the captured image by using, for example, license plate number information.

The electronic device 110 may not transmit such requests to all the identified surrounding vehicles, but may request the driver information from some of the surrounding vehicles. A criterion for selecting the surrounding vehicles for requesting the second surrounding driver information may include, for example, the risk level information, the time of driving around the corresponding vehicle, etc. When the second surrounding driver information is requested according to a plurality of criteria, processes of detecting the surrounding vehicles suitable for the criteria may be performed in series or in parallel.

An example, in which the second surrounding driver information is requested based on the risk level information, will be described below. The electronic device 110 obtains risk level information of the surrounding vehicles by requesting the identified surrounding vehicles for the risk level information (S904). The risk level information is determined based on the evaluation value included in the second surrounding driver information, and according to the relative position of the second surrounding driver information, the item of the second surrounding driver information used as the risk level information may vary. For example, the evaluation value of the lane keeping ignorance information is obtained as the risk level information with respect to the right side surrounding vehicle and the left side surrounding vehicle, the evaluation value of the steering wheel direction change/rapid turn information is obtained as the risk level information with respect to the right front surrounding vehicle and the left front surrounding vehicle, and the evaluation information of the sudden braking information may be obtained as the risk level information with respect to the front center surrounding vehicle. The risk level information of the second surrounding vehicle may be determined by the second corresponding vehicle or the second surrounding vehicle.

When obtaining the risk level information of the surrounding vehicle, the electronic device 110 determines the surrounding vehicle for requesting the second surrounding driver information based on the risk level information (S906). Also, the electronic device 110 requests the determined surrounding vehicle for the second surrounding driver information and obtains the second surrounding driver information (S908).

As another example of a process for selecting the second surrounding vehicle, which is to be requested for the second surrounding driver information, an example of requesting the second surrounding driver information based on the time period of driving around the corresponding vehicle will be described below. According to an embodiment of the disclosure, the electronic device 110 calculates a driving time period (e.g., a period of time for which the two cars are in proximity), for each of the one or more second surrounding vehicles, within a certain distance from the second corresponding vehicle in real-time (S910). To do this, the electronic device 110 identifies the second surrounding vehicle in real-time (S902), defines an initial detection time of each second surrounding vehicle, and calculates a time period elapsed from the initial detection time while detecting each of the second surrounding vehicles. When there is no further second surrounding vehicle detected, the process of calculating the driving time period of the second surrounding vehicle is ended.

When there is a second surrounding vehicle, the driving time period of which exceeds a certain reference time, the electronic device 110 requests the second surrounding vehicle for the second corresponding driver information (S912). For example, the certain reference time of the driving time period around the corresponding vehicle may be set as tens of seconds to a few minutes.

The electronic device 110 receives and obtains the second surrounding driver information from the second surrounding vehicle according to the request (S914).

Figure 10:
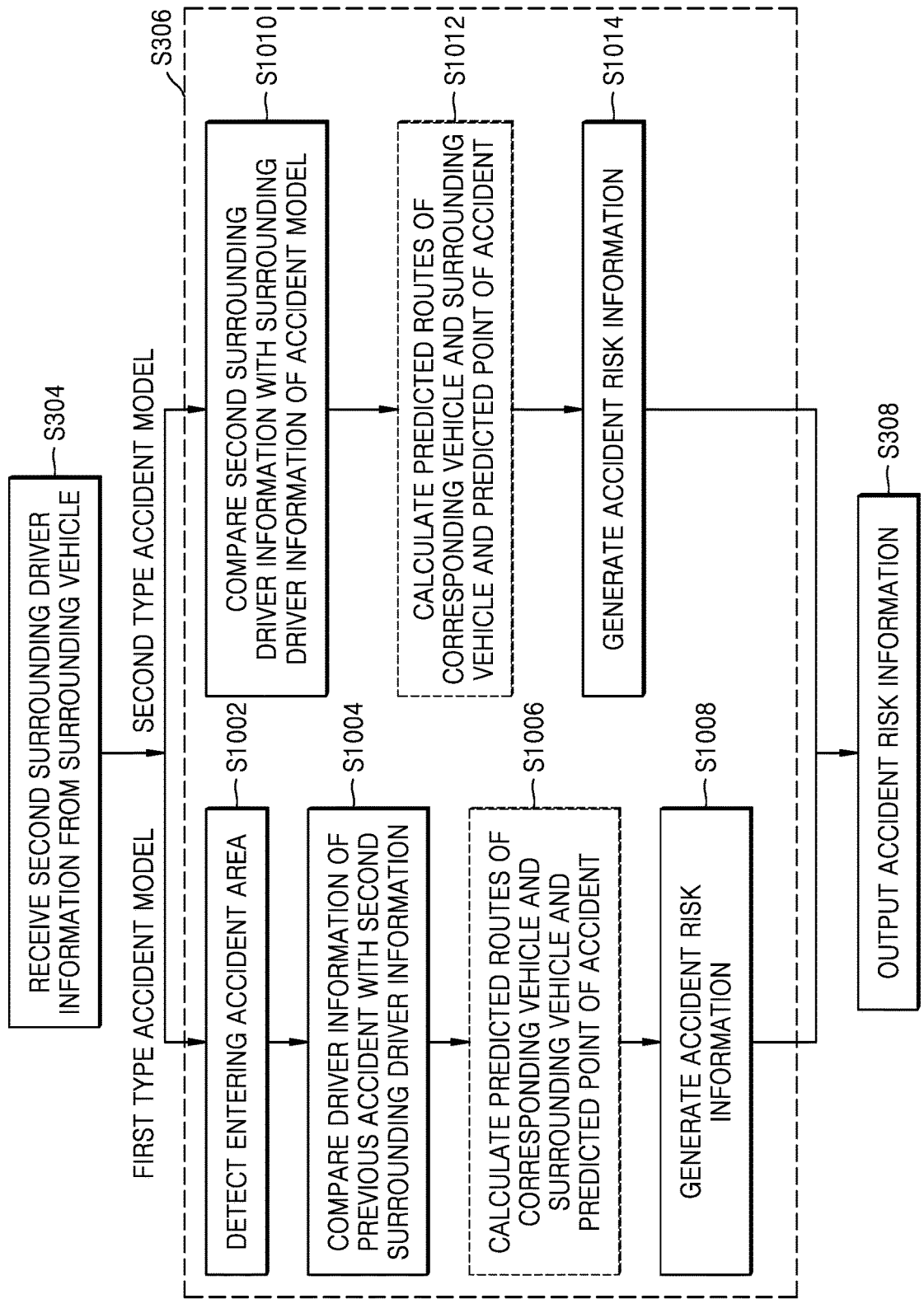
FIG. 10 is a flowchart illustrating a process of outputting accident risk information according to an example embodiment of the disclosure.

FIG. 10 is a flowchart illustrating a process of outputting an accident risk information according to an embodiment of the disclosure.

As described above, the accident model information is of the first type and is defined based on actual accident history, and the second type may be defined by a combination of the first corresponding driver information having a threshold risk of occurrence of an accident and the first surrounding driver information. The process of generating the accident risk information (S306) may be performed with respect to both the accident model information of the first type and the accident model information of the second type in series or in parallel.

Processes of generating the accident risk information by using the accident model information of the first type will be described below. The electronic device 110 may detect that the corresponding vehicle enters an accident area based on the location information of the corresponding vehicle (S1002). To do this, the electronic device 110 may continuously monitor whether the vehicle enters the accident area based on the location information during the driving of the vehicle.

When detecting that the corresponding vehicle enters the accident area, the electronic device 110 compares the driver information included in the accident model information with the second corresponding/surrounding driver information obtained in real-time (S1004). The electronic device 110 compares the driver information of the vehicles related to the accident, from among the driver information included in the accident model information based on previous accidents, with the second corresponding driver information and the second surrounding driver information. Here, the electronic device 110 matches relative positions of the vehicles included in the accident model to the relative positions of the corresponding and surrounding vehicles obtained in real-time, and compares the driver information of the accident model with the second corresponding/surrounding driver information between the vehicles at corresponding locations.

The electronic device 110 generates the accident risk information based on similarity between the driver information included in the first type accident model and the second corresponding driver information and the second surrounding driver information in real-time (S1008).

Next, processes of generating the accident risk information by using the accident model information of the second type will be described below. The electronic device 110 compares the driver information included in the second type accident model information with the second corresponding driver information and the second surrounding driver information (S1010). The second type accident model information defines arrangement of a plurality of vehicles, and defines driver information having a threshold risk of occurrence of an accident for each of the plurality of vehicles. For example, in the second type accident model information, a vehicle having a sudden braking tendency, the vehicle being in front of the corresponding vehicle, is defined to have a threshold possibility of causing an accident, and a vehicle having a threshold overtaking tendency, the vehicle being behind the corresponding vehicle, is defined to have threshold possibility of causing an accident.

The electronic device 110 continuously compares the second type accident model information with the second surrounding driver information obtained in real-time during the driving of the corresponding vehicle. Here, the electronic device 110 matches relative positions of the vehicles included in the second type accident model to the relative positions of the corresponding and surrounding vehicles obtained in real-time, and compares the driver information of the accident model with the second corresponding/surrounding driver information between the vehicles at corresponding locations.

The electronic device 110 generates the accident risk information based on similarity between the driver information included in the second type accident model and the second corresponding driver information and the second surrounding driver information in real-time (S1014).

FIG. 11 is a diagram showing first type accident model information according to an embodiment of the disclosure.

The first type accident model information may be collected from the driver information generated while the driver operates the vehicle and an accident occurs during operation. According to an embodiment of the disclosure, the electronic device 110 may classify types of a plurality of accidents by using the first type accident model information, and may re-generate and store the first type accident model information by classifying the plurality of accidents according to types. For example, the plurality of accidents may include information on a type of road where the accident occurred, resulting in classifications such as local road, intersection, highway entry road, highway exit road, highway toll gate, etc., and may be stored in similar types. The server collects accident information and generates and stores statistics on the accident information.

The first type accident model information may include an accident location, relative position between vehicles at the time of accident, and driver information at the time of the accident. The accident location information may be written in various types for specifying a point, for example, may be defined by coordinate information specified by latitude and longitude, location information representing a road name and a point on the road, and geographical information, etc. The relative position at the time of accident indicates the relative positions of the accident vehicle and surrounding vehicles of the accident vehicle at the time of accident. The relative position at the time of accident may be defined based on one of the accident vehicles. The relative position may be defined in the form of coordinate information on a certain coordinate system, symbols assigned to certain relative positions, etc. based on a reference vehicle. The driver information indicates information of the driver in each of the accident vehicles and surrounding vehicles at the time of accident. The driver information may include the driving habit information described above.

The first type accident model information is stored in the server and may be downloaded to be stored in the corresponding vehicle from the server at the driving start stage of the corresponding vehicle. The first type accident model information may be updated reflecting new accidents. When an accident occurs, the electronic device 110 may update information regarding the accident (for example, accident location, relative positions of the vehicles, corresponding driver information, surrounding driver information, etc.) to the server.

Figure 12:
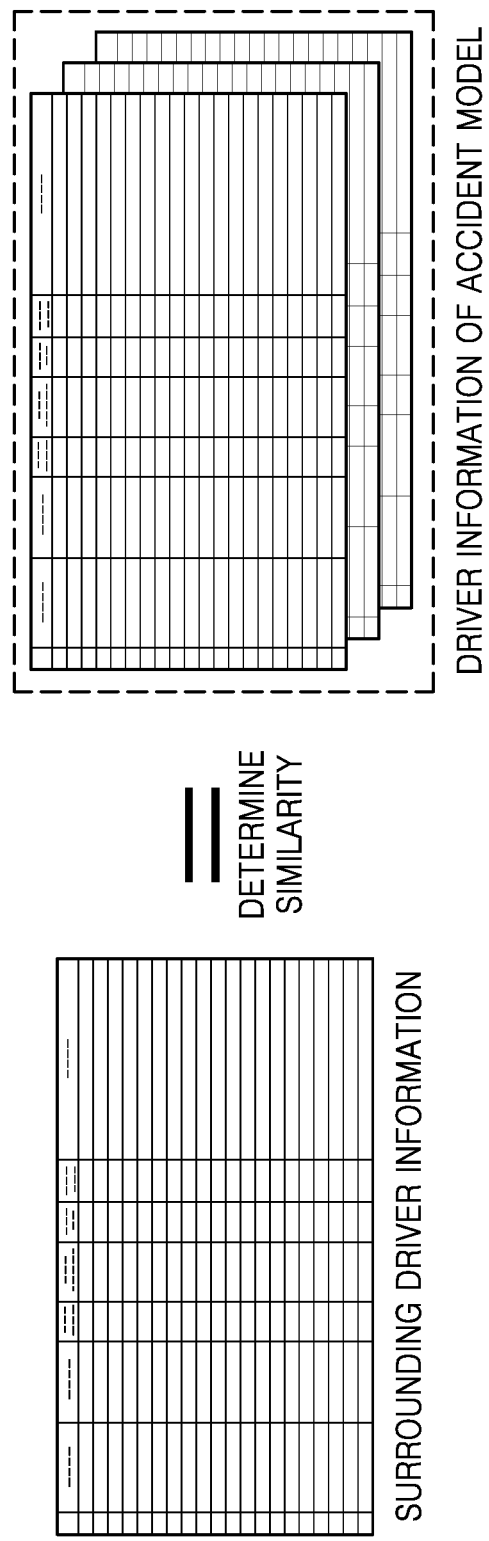
FIG. 12 is a diagram illustrating a process of comparing driver information of a previous accident with second corresponding/surrounding driver information based on a first type accident model, according to an example embodiment of the disclosure.

FIG. 12 is a diagram illustrating a process of comparing driver information of a previous accident with second corresponding/surrounding driver information based on the first type accident model, according to an embodiment of the disclosure.

According to an embodiment of the disclosure, when the corresponding vehicle enters an accident area, and is determined to be a certain distance from an accident point (e.g., a coordinate at which the accident such as a collision between two vehicles actually occurred), the electronic device 110 compares the driver information at the time of accident with the second corresponding driver information (e.g., historical driver profile including habit and characteristics for one or more driver involved in the accident) and the second surrounding driver information obtained in real-time (e.g., a nearby driver operating a vehicle in proximity to the present vehicle).

For example, when the first type accident model stores three pieces of driver information and there are four surrounding vehicles that are detected, the electronic device 110 compares the second surrounding driver information of each of the four surrounding vehicles with the three pieces of driver information in the accident model.

When comparing the driver information of the accident model with the second surrounding driver information, the electronic device 110 compares each of the items in the driver information and determines similarity of the driver information based on the similarity of each item in the driver information.

According to an embodiment of the disclosure, the similarity of the driver information may be expressed as a representative value that is calculated by combining the similarities of the respective items in the driver information. For example, the similarity of the driver information may be calculated by a linear combination of the similarities of respective five items in the driver information.

In another embodiment of the disclosure, the similarity of the driver information may be determined based on whether a similarity of a certain item among the plurality of items in the driver information exceeds a reference value. For example, the similarity of the driver information may be determined to be of a sufficient threshold and characterized as "high" when the similarity of the lane keeping ignoring tendency and the sudden braking information exceeds a reference value.

According to another embodiment of the disclosure, the similarity of the driver information may be determined based on the number of items each having a similarity of a reference value or greater. For example, when the number of driver information items having the similarity of reference value or greater is 7 or greater, it may be determined the driver information has high level of similarity, when the number is 3 to 6, it may be determined that the driver information has middle level of similarity, and when the number is less than 3, it may be determined that the driver information has lower level of similarity.

According to an embodiment of the disclosure, the process of generating the accident risk information based on a certain accident model may be performed by the electronic device 110, when the driver information or the location information satisfies with a certain condition. For example, the process of generating the accident risk information with respect to the first type accident model starts when the corresponding vehicle enters the accident area included in the first type accident model, and after that, the electronic device 110 may perform the process of calculating the similarity of the driver information. In another example, the process of generating the accident risk information with respect to the second type accident model may be performed when the similarity between the driver information included in the second type accident model and the second surrounding driver information has a certain value or greater. The second type accident models are layered with one another and classified according to the driver information types, and the electronic device 110 may monitor the plurality of second type accident models sequentially according to the types of the second type accident models. For example, the second type accident model related to each driver information item, e.g., the steering wheel information, the drowsy driving information, etc., may be defined respectively. In this case, when a surrounding vehicle having the evaluation value of the drowsy driving information of a certain value or greater is detected, the second type accident model related to the drowsy driving information may be triggered.

When the similarity is equal to or greater than a certain level in the process of calculating the driver information similarity, the electronic device 110 may determine that there is a risk of accident and performs a warning operation. According to an embodiment of the disclosure, a level of the warning operation may vary depending on the level of the similarity. For example, when the driver information matches 50% or greater, a caution warning may be provided, and when the driver information matches 80% or greater, an accident risk warning may be provided.

According to an embodiment of the disclosure, the process of generating the accident risk information may be ended when the driver information or the location information does not satisfy with a certain condition. For example, when the corresponding vehicle is away a certain distance from the accident area included in the first type accident model, the electronic device 110 may terminate the process of generating the accident risk information according to the accident model. In another example, when the similarity between the driver information included in the second type accident model and the second corresponding driver information is equal to or less than a certain reference value, the electronic device 110 may terminate the process of generating the accident risk information according to the corresponding accident model.

According to an embodiment of the disclosure, the electronic device 110 monitors the plurality of first type accident models and the plurality of second type accident models at a first time interval in the monitoring process, and when there is an accident model having the similarity of a certain reference value or greater based on the current location information or the second surrounding driver information, the electronic device 110 defines that accident model as a target accident model and generates the accident risk information based on the target accident model. A cycle of determining the similarity of the driver information with respect to the target accident model may be defined as a second time interval that is smaller than the first time interval. According to the embodiment of the disclosure, the electronic device 110 monitors various accident models, and then, triggers a target accident model when a certain condition is satisfied, and generates the accident risk information so that the accident model information based on various accident models may be generated more efficiently.

Figure 13:
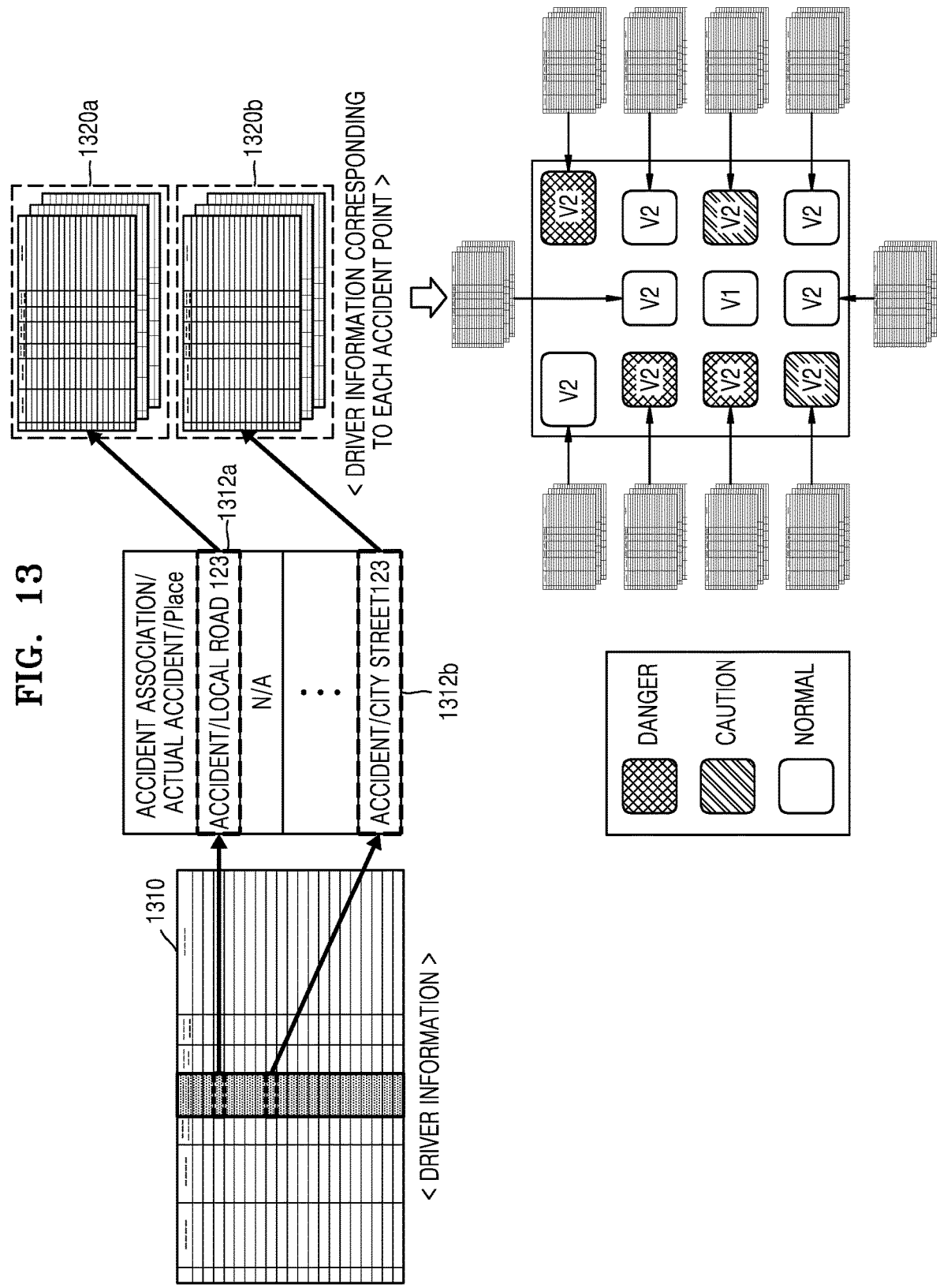
FIG. 13 is a diagram showing first type accident model information according to another example embodiment of the disclosure.

FIG. 13 is a diagram showing first type accident model information according to another embodiment of the disclosure.

According to another embodiment of the disclosure, the first type accident model information may be recorded in association with a certain item in the driver information. For example, related accident information 1312*a* and 1312*b* are recorded with respect to a certain item in driver information 1310. Also, at least one piece of accident location information corresponding to the related accident information 1312*a* and 1312*b* and accident driver information 1320*a* and 1320*b* respectively corresponding to the accident location information may be recorded in the first type accident model information. The related accident information 1312*a* and 1312*b* may be recorded by statistics of entire accident information, and as the accident information related to a certain driver information item increases, the number of the pieces of the related accident information 1312*a* and 1312*b* increases, and accordingly, the accident driver information 1320*a* and 1320*b* corresponding to the accident location information may be accumulated.

The electronic device 110 determines the similarity of the driver information by comparing driver information of each of a current present vehicle V1 and a surrounding vehicle V2 with the accident driver information 1320*a* included in the first type accident model information. For example, when the corresponding vehicle enters an area corresponding to the first related accident information 1312*a*, the electronic device 110 may determine the similarity by comparing the accident driver information 1320*a* corresponding to the first related accident information 1312*a* with the driver information of each of a current present vehicle V1 and a surrounding vehicle V2. According to a result of determining the similarity, the electronic device 110 may determine an accident risk level with respect to each of the surrounding vehicles V2. For example, the accident risk level of the surrounding vehicle V2 may be classified as danger, caution, or normal based on the similarity.

Figure 14:
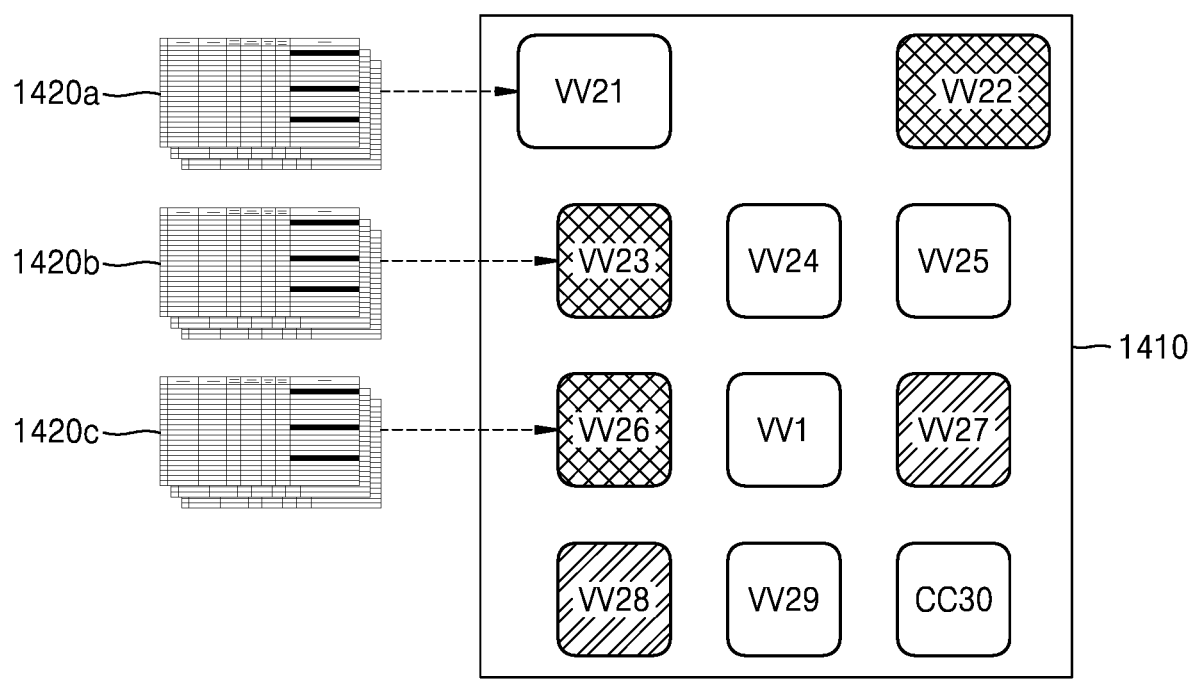
FIG. 14 is a diagram showing accident model information based on first type accident model information, according to an example embodiment of the disclosure.

FIG. 14 is a diagram showing accident model information based on the first type accident model information according to an embodiment of the disclosure.

According to an embodiment of the disclosure, the first type accident model information may define a vehicle arrangement 1410 at the time of accident (e.g., the relative positions of vehicles involved or proximate to the accident), and stores the accident driver information according to the relative position of each vehicle. Also, the first type accident model information may store accident driver information 1420*a*, 1420*b*, and 1420*c* of a plurality of vehicles included in the vehicle arrangement 1410 at the time of accident, with respect to each of vehicles VV21, VV22, . . . , VV30. The electronic device 110 may respectively define an accident model vehicle VV1 corresponding to the second corresponding vehicle and accident model vehicles VV21, VV22, . . . , VV30 corresponding to the second surrounding vehicles in the vehicle arrangement 1410 included in the first type accident model information. The electronic device 110 may determine corresponding vehicles based on locations of the vehicles on the road and relative arrangement among the vehicles, when matching the current vehicle arrangement to the vehicle arrangement of the accident model.

The electronic device 110 determines the similarity by comparing the accident driver information 1420*a*, 1420*b*, and 1420*c* with the second surrounding driver information, between the corresponding accident model vehicles VV21, VV22, . . . , VV30 and the second surrounding vehicles. Here, the accident driver information 1420*a*, 1420*b*, and 1420*c* may be generated and stored separately with respect to each of the accident model vehicles VV21, VV22, . . . , VV30. According to an embodiment of the disclosure, the electronic device 110 determines the similarity by comparing the second corresponding driver information of the second corresponding vehicle with the accident driver information of the accident model vehicle VV1 that corresponds to the second corresponding vehicle.

According to an embodiment of the disclosure, the firs type accident model information may define, with respect to each of the accident model vehicles VV21, VV22, . . . , VV30, a combination of main driver information items having evaluation values of certain reference or greater, and may determine whether the second surrounding driver information has a similar evaluation value with respect to the main driver information items. As the accident information is accumulated, the first type accident model information may define statistically define the characteristics of the accident driver information, and may define the combination of the main driver information items with respect to each of the accident model vehicles VV21, VV22, . . . , VV30 according to the statistical information. The statistical information may be obtained for each accident point, and in another embodiment of the disclosure, may be obtained for each of the types of accident points (e.g., intersection, five-way intersection, rotary, an elevated road accessing road, highway entry road, highway exit road, etc.). For example, the first type accident model information defines the non-protected left turn and the average hourly speed with respect to the accident mode vehicle VV21 as the main driver information items, defines the intersection bumper-to-bumper driving with respect to the accident model vehicle VV23 as the main driver information item, and defines the second-lane right turn tendency with respect to the accident model vehicle VV26.

Figure 15:
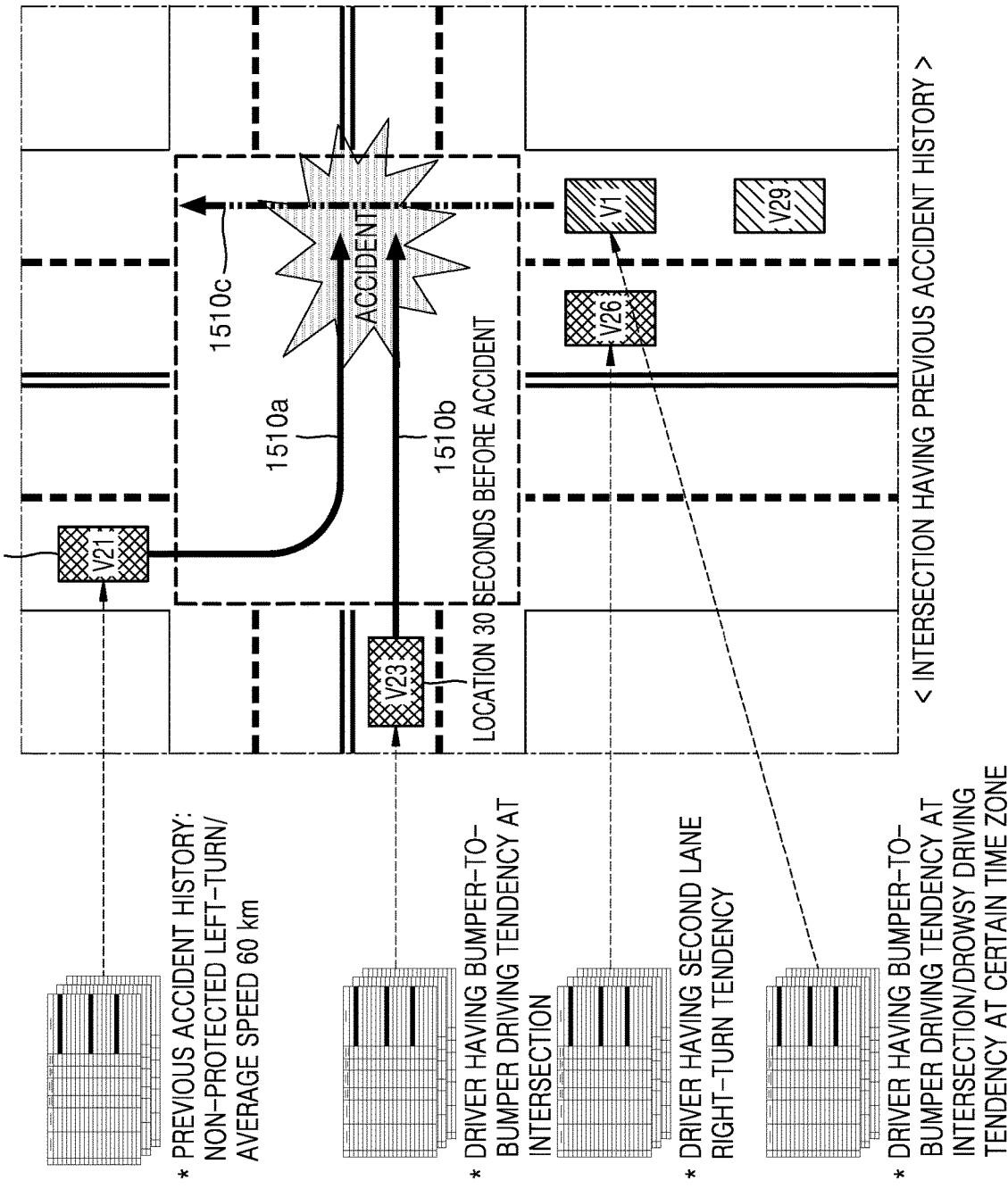
FIG. 15 is a diagram for describing a process of calculating accident risk information based on a first type accident model, according to an example embodiment of the disclosure.

FIG. 15 is a diagram for describing a process of calculating accident risk information based on first type accident model, according to an embodiment of the disclosure.

As described above with reference to FIG. 14, the electronic device 110 determines the accident risk by determining the similarity between the accident driver information and the second surrounding driver information based on the first type accident model. FIG. 15 shows a driving situation at an intersection having an accident history, and V1, V21, V23, V26, and V29 are vehicles actually driving. From among the vehicles, V1 denotes a second corresponding vehicle. As a result of comparing the accident driver information with the second surrounding driver information, when there is a threshold similarity between the second surrounding driver information of the vehicles V21, V23, and V26 with the accident driver information included in the first type accident model, the driver information for vehicle may determine there is a threshold risk of occurrence of an accident.

According to an embodiment of the disclosure, the first type accident model has a driving history within a certain time period before the accident stored therein, and may compare the accident driver information with the second surrounding driver information by matching the vehicle arrangement at a certain time before the accident with the current vehicle arrangement. As a result of comparing the accident driver information with the second surrounding driver information based on the situation at a certain time prior to the accident, when the similarity between the driver information has a certain value or greater, the electronic device 110 may determine that there is a threshold risk of occurrence of an accident and may warn the driver. According to an embodiment of the disclosure, the electronic device 110 predicts driving routes 1510a, 1510b, and 1510c on which an accident may occur with respect to the driving route at the time of accident included in the first type accident model information, and may provide the predicted driving routes 1510a, 1510b, and 1510c as the accident risk information. Also, the electronic device 110 may indicate the driving route 1510c of the present vehicle V1 to be distinguished from the driving routes 1510a and 1510b of the surrounding vehicles V21 and V23 (for example, by using different colors).

Figure 16:
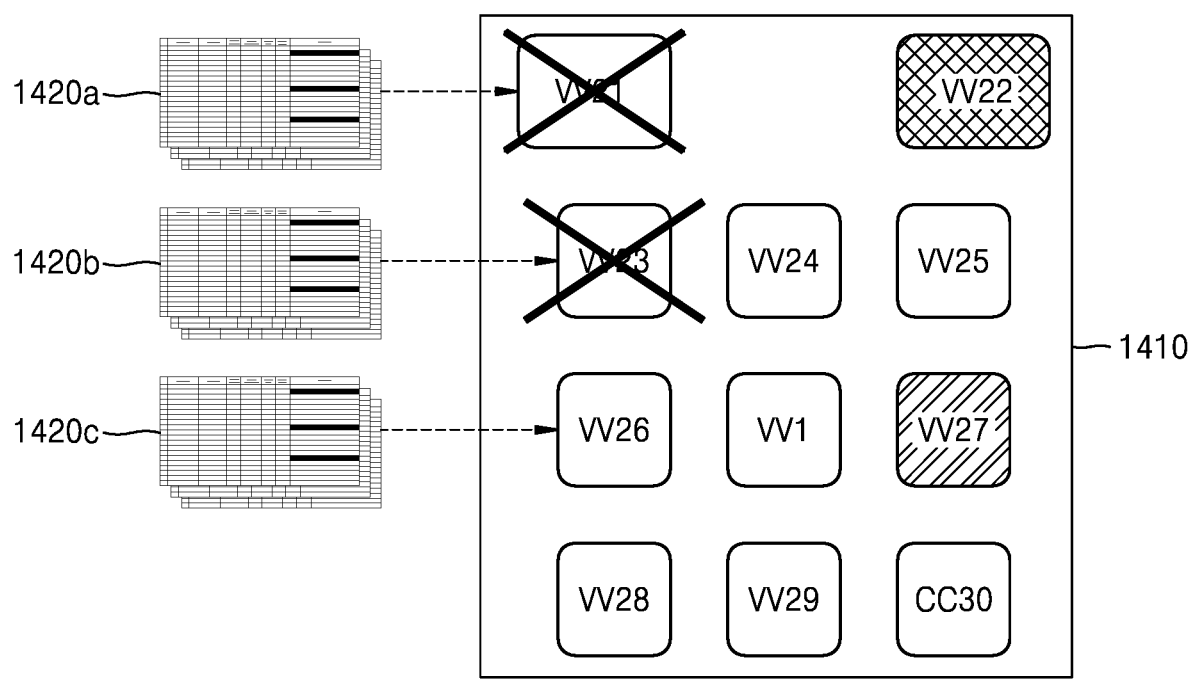
FIG. 16 is a diagram showing a result of a comparison between accident model information based on a first type accident model and second surround driver information, according to an example embodiment of the disclosure.

FIG. 16 is a diagram showing a result of a comparison between accident model information based on the first type accident model and second surround driver information, according to an embodiment of the disclosure.

As a result of comparing the accident driver information 1420a, 1420b, and 1420c of the first type accident model information with the second surrounding driver information according to an embodiment of the disclosure, when the similarity between the driver information is equal to or less than a certain reference value, the electronic device 110 determines that there is low risk of accident and may not warn the driver.

Figure 17:
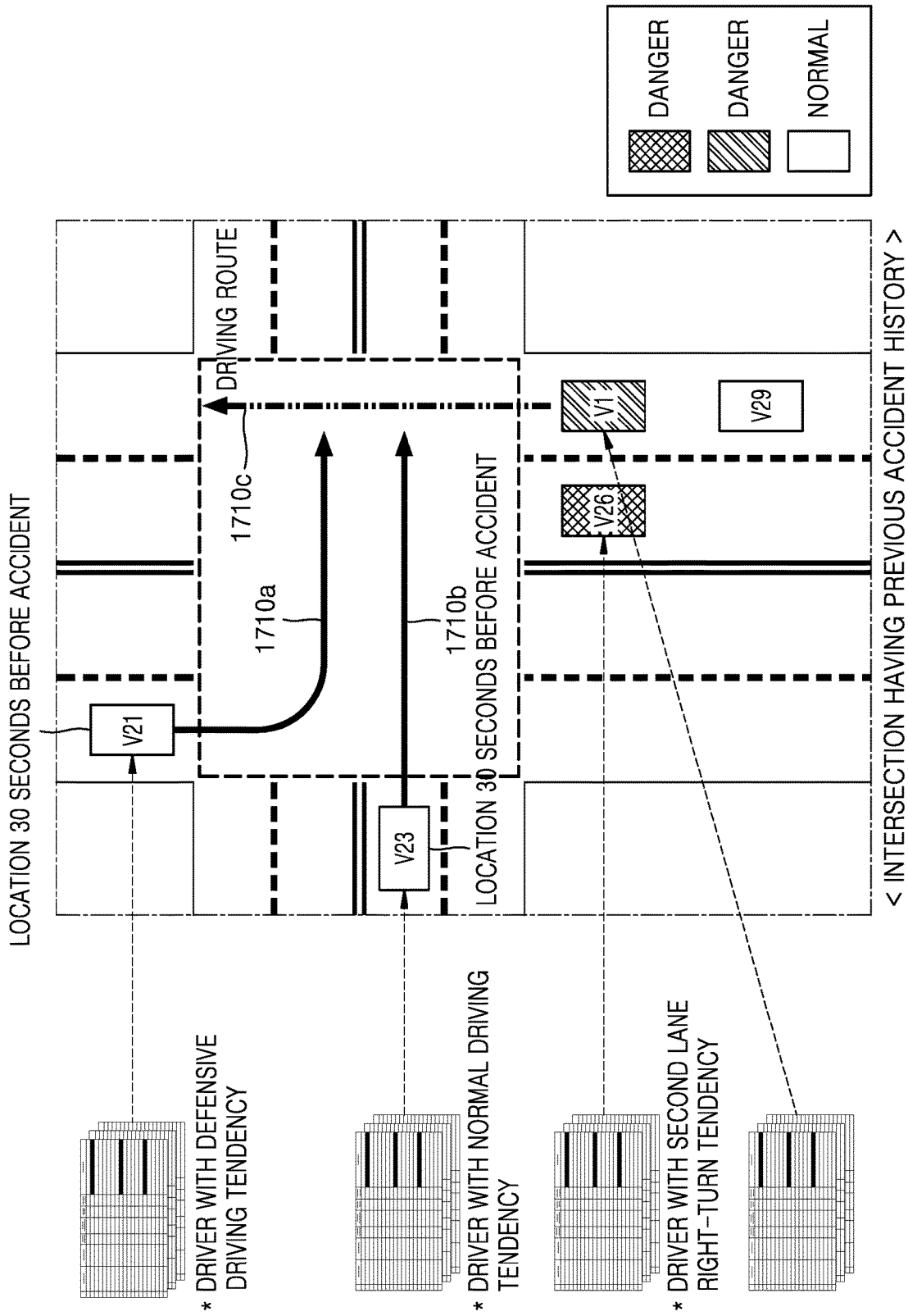
FIG. 17 is a diagram for describing a process of calculating accident risk information based on a first type accident model, according to an example embodiment of the disclosure.

FIG. 17 is a diagram for describing a process of calculating accident risk information based on first type accident model, according to an embodiment of the disclosure. FIG. 17 illustrates a process of calculating the accident risk information according to a comparison result of the example shown in FIG. 16.

FIG. 17 will be described under the assumption that, as a result of comparing the accident driver information 1420a, 1420b, and 1420c of the first type accident model with the second surrounding driver information, the similarity between the accident driver information and the second surrounding driver information of the surrounding vehicles V21, V23, and V29 is less than a certain reference value and the similarity between the accident driver information and the second surrounding driver information of the surrounding vehicle V26 is equal to or greater than a certain value. In this case, the electronic device 110 determines that there is a low possibility (e.g., below a predetermined threshold possibility) of an accident occurrence with respect to the vehicles V21, V23, and V29, and does not warn the driver. Also, when taking into account the driving route 1710c of the present vehicle V1 and predicted driving routes 1710a and 1710b of the surrounding vehicles V21 and V23, the possibility of the accident occurring on the driving route 1710c is determined to be low, and thus, the electronic device 110 may not warn the driver of the accident possibility of the driving route 1710c or may provide the driver with the information that the accident possibility is low.

A driver of the vehicle V26 has a second-lane right turn tendency and there is a risk of accident due to the second-lane right turn, and thus, the electronic device 110 may generate and provide the user with the accident risk information indicating that there is a possibility of accident with the vehicle V26.

According to the embodiment of the disclosure, even when a point or a road has an accident history, the vehicle arrangement at the time of accident and the accident driver information for each vehicle are separately stored, and the driver information and the second surrounding driver information corresponding to the relative positions of the corresponding vehicle and the surrounding vehicles are compared, and accordingly, the possibility of generating an accident may be predicted accurately. Also, according to the embodiment of the disclosure, even when there is an accident history, the accident possibility is not unconditionally warned, but cases having low possibility are filtered based on the driving habits of the surrounding drivers. Therefore, an unnecessary warning may not be performed.

Next, a detailed example of the second type accident model information and accident risk information according to the second type accident model information will be described below with reference to FIGS. 18 to 22. A corresponding vehicle included in the accident model information is referred to as a first corresponding vehicle and a surrounding vehicle included in the accident model information is referred to as a first surrounding vehicle in FIGS. 18 to 22. A corresponding vehicle that is actually driving is referred to as a second corresponding vehicle and a surrounding vehicle that is actually driving is referred to as a second surrounding vehicle. The second type accident model information may be defined with respect to a plurality of attributes of the first surrounding vehicles, and may include relative position information of the first surrounding vehicle, which is defined respectively to each of the plurality of first surrounding vehicle attributes. The relative position information of the first surrounding vehicle may be defined by an identification symbol indicating the relative position of the first surrounding vehicle (e.g., F1, F2, F3, S1, S2, R1, R2, R3, etc. defined in FIG. 5A) or relative location range. The relative location range may be defined as, for example, within 10 m behind the first corresponding vehicle. The plurality of first surrounding vehicle attributes may include, for example, a vehicle having an overtaking tendency, a vehicle making sudden left/right turn, a bumper-to-bumper vehicle, a vehicle entering safety zone, a sudden brake vehicle, a sudden start vehicle, etc.

Figure 18:
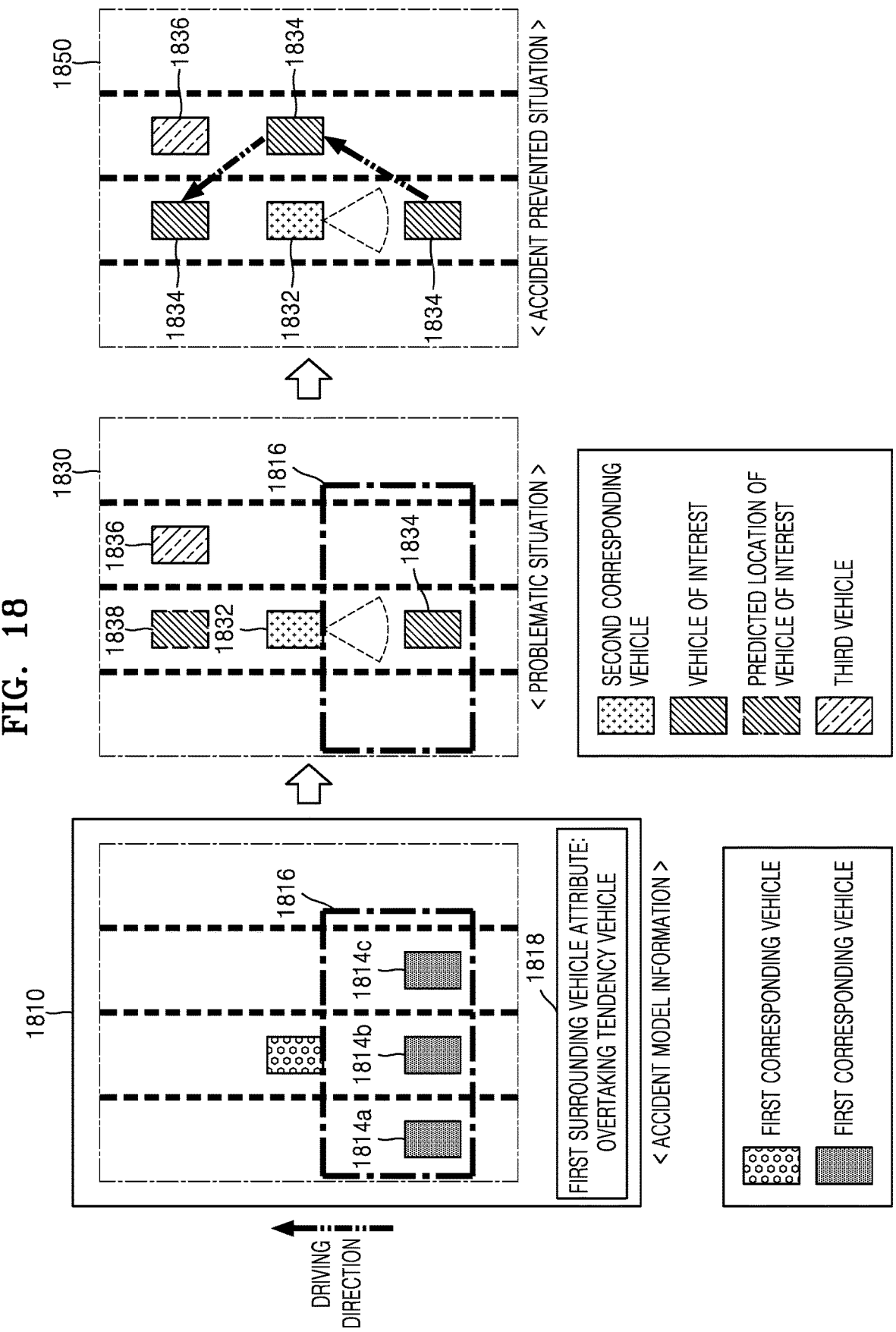
FIG. 18 is a diagram showing second type accident model information corresponding to a vehicle having an overtaking tendency, according to an example embodiment of the disclosure.

FIG. 18 is a diagram showing second type accident model information corresponding to a vehicle having an overtaking tendency, according to an embodiment of the disclosure.

According to an embodiment of the disclosure, the second type accident model information may include an accident model corresponding to the vehicle having the overtaking tendency from among the surrounding vehicles. The vehicle having the overtaking tendency may be defined based on the evaluation value of the overtaking tendency information in the driver information items. For example, when the evaluation value of the overtaking tendency information in the second surrounding driver information has a level of frequent or more, the surrounding vehicle may be classified as the vehicle having the overtaking tendency.

An accident model 1810 defines the vehicle having the overtaking tendency by using first surrounding vehicle attribute information 1818, and may include relative position information 1814a, 1814b, and 1814c of the first surrounding vehicle. The relative position information 1814a, 1814b, and 1814c may be defined as point information such as left behind (1814a), center behind (1814b), right behind (1814c), etc. as shown in FIG. 18, or may be defined as area information 1816 including a certain range of the rear portion. In the specification of the disclosure, the point information or area information included in the second type accident model information is referred to as a caution area information, and an area defined in the caution area information is referred to as a caution area. The caution area information may be defined by using various coordinate systems.

The accident model for the vehicle with the overtaking tendency may help prevent an accident when the overtaking vehicle is approaching from behind. For example, a situation is illustrated in which a vehicle of interest 1834 having the overtaking tendency is detected behind a second corresponding vehicle 1832, while the second corresponding vehicle 1832 is driving (1830). The vehicle of interest 1834 having the overtaking tendency is thus predicted to attempt to overtake the second corresponding vehicle 1832 and move to a predicted position 1838 within a predictive future time frame (e.g., a few seconds or a few minutes). Also, the vehicle of interest 1834 is predicted to attempt to overtake a third vehicle 1836. In this case, when the second corresponding vehicle 1832 is operated without warning of the risk of accident that may be caused by the vehicle of interest 1834, an accident may occur if the vehicle of interest 1834 tries to overtake in a dangerous fashion.

According to an embodiment of the disclosure, when the vehicle of interest 1834 having the overtaking tendency is detected from the caution area indicated in area information 1816 behind the second corresponding vehicle 1832, the electronic device 110 generates the accident risk information warning the driver of the overtaking vehicle approaching from behind and provides the driver with relevant accident risk information. In addition, when the vehicle having the overtaking tendency is detected within the caution area, the electronic device 110 may guide the driver to yield. The driver may predict the overtaking situation of the vehicle of interest 1834 behind the corresponding vehicle according to the accident risk information, and may drive carefully to deal with the overtaking of the vehicle of interest 1834 behind the second corresponding vehicle 1832 and prevent the accident (1850).

Also, according to an embodiment of the disclosure, the electronic device 110 may provide the third vehicle 1836 with the accident risk information about the vehicle of interest 1834 having the overtaking tendency.

Figure 19:
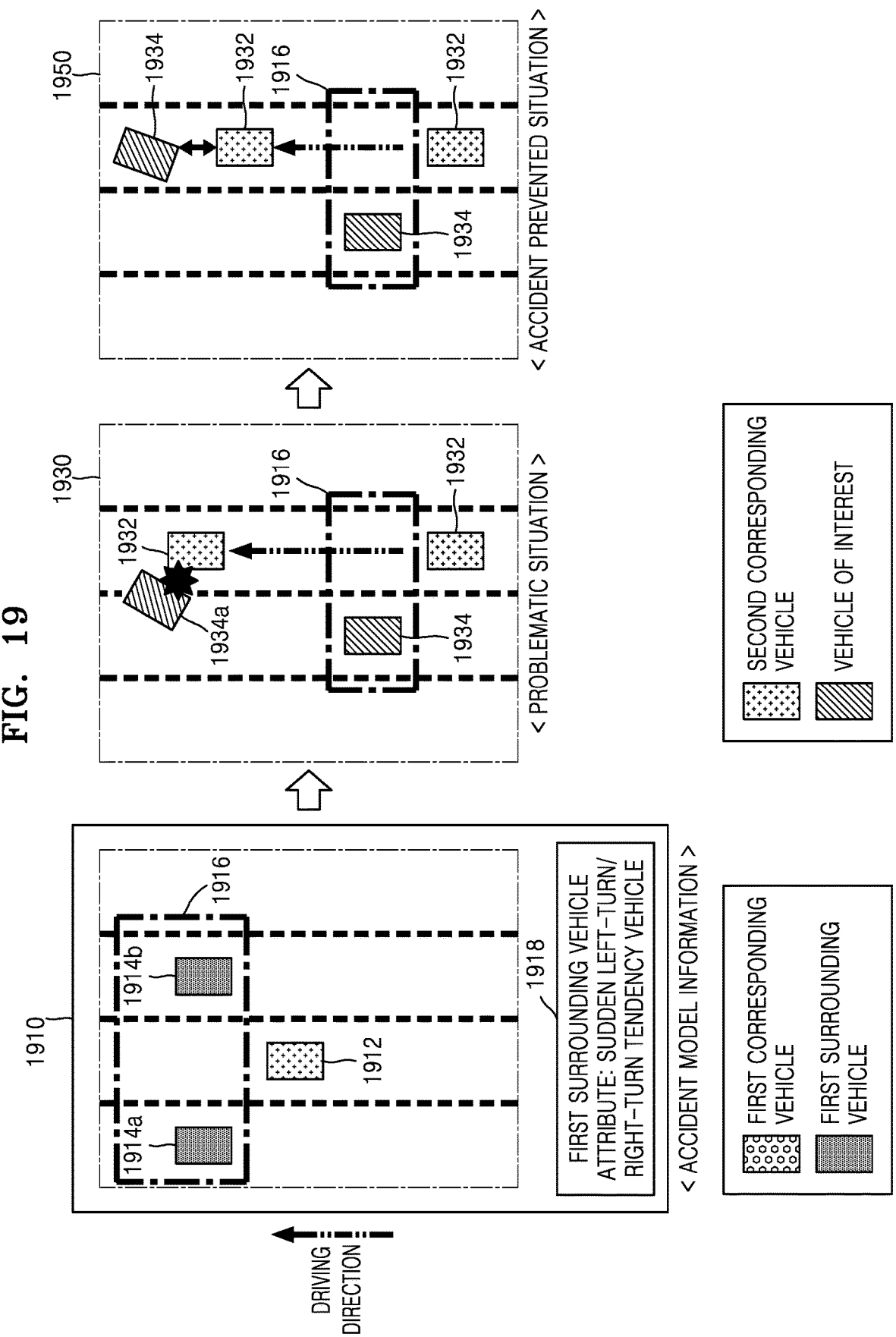
FIG. 19 is a diagram showing second type accident model information corresponding to a vehicle having a sudden left-turn/right-turn tendency, according to an example embodiment of the disclosure.

FIG. 19 is a diagram showing second type accident model information corresponding to a vehicle having sudden left-turn/right-turn tendency, according to an embodiment of the disclosure.

According to an embodiment of the disclosure, the second type accident model information may include an accident model corresponding to the vehicle having a sudden left-turn/right-turn tendency from among the surrounding vehicles. The vehicle having the sudden left-turn/right-turn tendency may be defined based on an evaluation value of the steering wheel direction change/rapid turn information (as described earlier above) in the driver information items. For example, when the driver of the respective value has a threshold frequency of executing rapid steering wheel direction inputs and rapid vehicular turns as indicated in the second surrounding driver information, the surrounding vehicle may be classified as a vehicle with a sudden left-turn/right-turn tendency.

An accident model 1910 defines the vehicle having the sudden left-turn/right-turn tendency by using first surrounding vehicle attribute information 1918, and may include relative position information 1914a and 1914b of the first surrounding vehicle. The relative position information 1914a and 1914b may be defined as point information such as front left 1914a, front right 1914b, etc. as shown in FIG. 19, or may be defined as region information (i.e., caution area 1916) including a certain range of a front portion.

The accident model about the sudden left-turn/right-turn tendency may prevent an accident when the vehicle having the sudden left-turn/right-turn tendency is detected within a caution area 1916 in front of the vehicle 1912. For example, a situation is illustrated in which a vehicle of interest 1934 having the sudden left-turn/right-turn tendency is detected from a left front portion of a second corresponding vehicle 1932 while the second corresponding vehicle 1932 is driving (1930). The vehicle of interest 1934 having the sudden left-turn/right-turn tendency is, based on the driver's habits, more likely to rapidly make left turn or right turn while driving, and may cut off the second corresponding vehicle 1932. When the second corresponding vehicle 1932 does not find the vehicle of interest 1934 trying to cut in line, or when the second corresponding vehicle 1932 accelerates, the second corresponding vehicle 1932 is likely to collide with a vehicle of interest 1934 trying to cut into the lane.

According to an embodiment of the disclosure, when the vehicle of interest 1934 having the sudden left-turn/right-turn tendency is detected within the caution area 1916 in front of the second corresponding vehicle 1932, the electronic device 110 generates the accident risk information to notify a driver to be cautious of the sudden left-turn/right-turn of the front vehicle, and provide the driver with the accident risk information. The driver may thus predict the cutting-in-line of the vehicle of interest 1934 in front of the driver having received the accident risk information, and thus notified, has a better chance to avoid an accident (1950).

FIG. 20 is a diagram showing second type accident model information corresponding to bumper-to-bumper vehicles, according to an embodiment of the disclosure.

According to an embodiment of the disclosure, the second type accident model information may include an accident model corresponding to a bumper-to-bumper vehicle from among the surrounding vehicles (e.g., a vehicle whose driver has a tendency to unsafely tailgate or otherwise driver too closely to other vehicles). The bumper-to-bumper vehicle may be defined based on the evaluation value of the bumper-to-bumper information in the driver information items. For example, when the evaluation value of the bumper-to-bumper information in the second surrounding driver information has a level of frequent or more, the surrounding vehicle may be classified as the bumper-to-bumper vehicle.

An accident model 2010 defines the bumper-to-bumper vehicle by using first surrounding vehicle attribute information 2018 for a present vehicle 2012, and may include relative position information 2014*a*, 2014*b*, and 2014*c* of the first surrounding vehicle. The relative position information 2014*a*, 2014*b*, and 2014*c* may be defined as a left opposite vehicle 2014*b*, a right opposite vehicle 2014*c*, and a front opposite vehicle 2014*a* at an intersection as shown in FIG. 20. The left opposite vehicle 2014*b* and the right opposite vehicle 2014*c* may include all vehicles on the straight lane and the left-turn lane and the front opposite vehicle 2014*a* may include the vehicle on the left-turn lane, except for the straight lane.

The accident model about the bumper-to-bumper vehicle may prevent an accident between vehicles crossing each other at an intersection. As described above with reference to FIG. 15, when a vehicle overlaps a route of the bumper-to-bumper vehicle at an intersection, there is a possibility of causing an accident. When the bumper-to-bumper vehicle is detected from the relative position defined in the accident model, the accident model 2010 predicts the possibility of an accident being caused by the bumper-to-bumper vehicle and generates the same as accident risk information, and then notifies the driver of the bumper-to-bumper vehicle, guiding the driver to use caution in order to reduce the possibility of an accident at the intersection.

Figure 21:
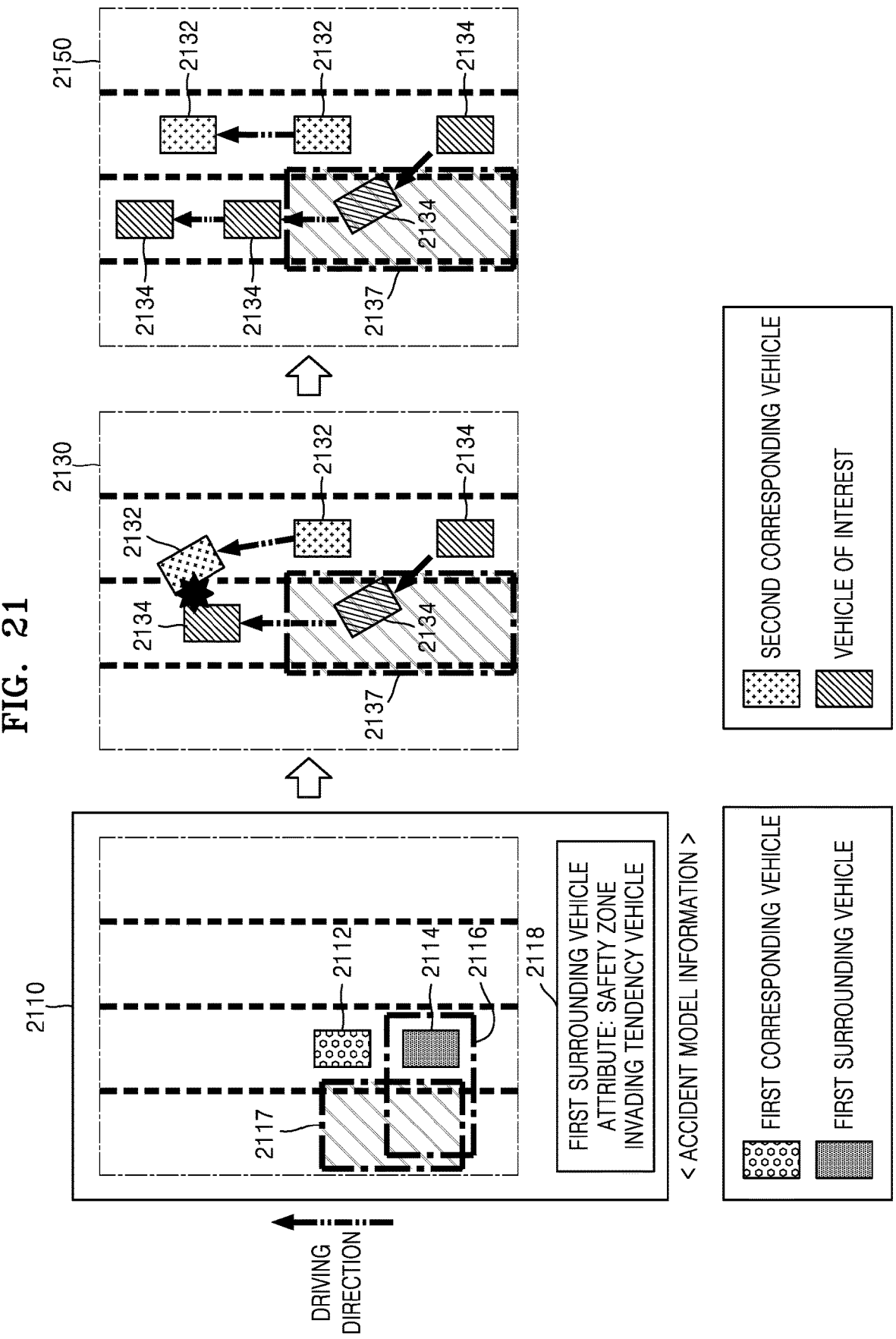
FIG. 21 is a diagram showing second type accident model information corresponding to a vehicle having a tendency of invading a safety zone, according to an example embodiment of the disclosure.

FIG. 21 is a diagram showing second type accident model information corresponding to a vehicle invading a safety zone, according to an embodiment of the disclosure.

According to an embodiment of the disclosure, the second type accident model information may include an accident model corresponding to the vehicle having a tendency of entering the safety zone of surrounding vehicles (e.g., a tendency to enter the safe trailing distance of other vehicles). The vehicle having the tendency of invading the safety zone may be defined based on the evaluation value of the safety zone entry information in the driver information items. For example, when the evaluation value of the safety zone entry information in the second surrounding driver information has a level of frequent or more, the surrounding vehicle may be classified as the vehicle having the tendency of invading safety zone.

An accident model 2110 defines the vehicle having the tendency of invading the safety zone by using first surrounding vehicle attribute information 2118, and may include relative position information 2114 of the first surrounding vehicle. When a safety zone 2117 is arranged on a left or right side of the first corresponding vehicle 2112 as shown in FIG. 21, the relative position information 2114 may be defined as a certain position behind the first corresponding vehicle 2112 or as an area information 2116 including a certain range behind the first corresponding vehicle 2112. The safety zone 2117 may be detected from a captured image captured by a camera during the driving of the second corresponding vehicle or may be detected based on road information and location information received from the server.

The accident model about the tendency of invading the safety zone may prevent an accident when a vehicle having the tendency of invading the safety zone is detected approaching from a caution area 1916 behind the vehicle. For example, a situation is illustrated in which a vehicle of interest 2134 having the tendency of invading the safety zone is detected behind a second corresponding vehicle 2132 while the second corresponding vehicle 2132 is driving (2130). The vehicle of interest 2134 having the tendency of invading the safety zone is more likely to collide with the second corresponding vehicle 2132 if the second corresponding vehicle 2132 attempts to change lanes at an end of the safety zone 2137, because the vehicle of interest 2134 has a tendency to enter the safety zone 2137 during driving and continue within it.

According to an embodiment of the disclosure, when the vehicle of interest 2134 having the tendency of invading the safety zone may be detected from the caution area indicated by the area information 2116 behind the second corresponding vehicle 2132, the electronic device 110 generates the accident risk information cautioning a driver about the vehicle's tendency to enter the safety zone, and provides the driver with the accident risk information. The driver may predict the vehicle of interest 2134 will tend to enter the safety zone behind the driver according to the output accident risk information, and exercise increased caution to avoid an accident (2150).

Figure 22:
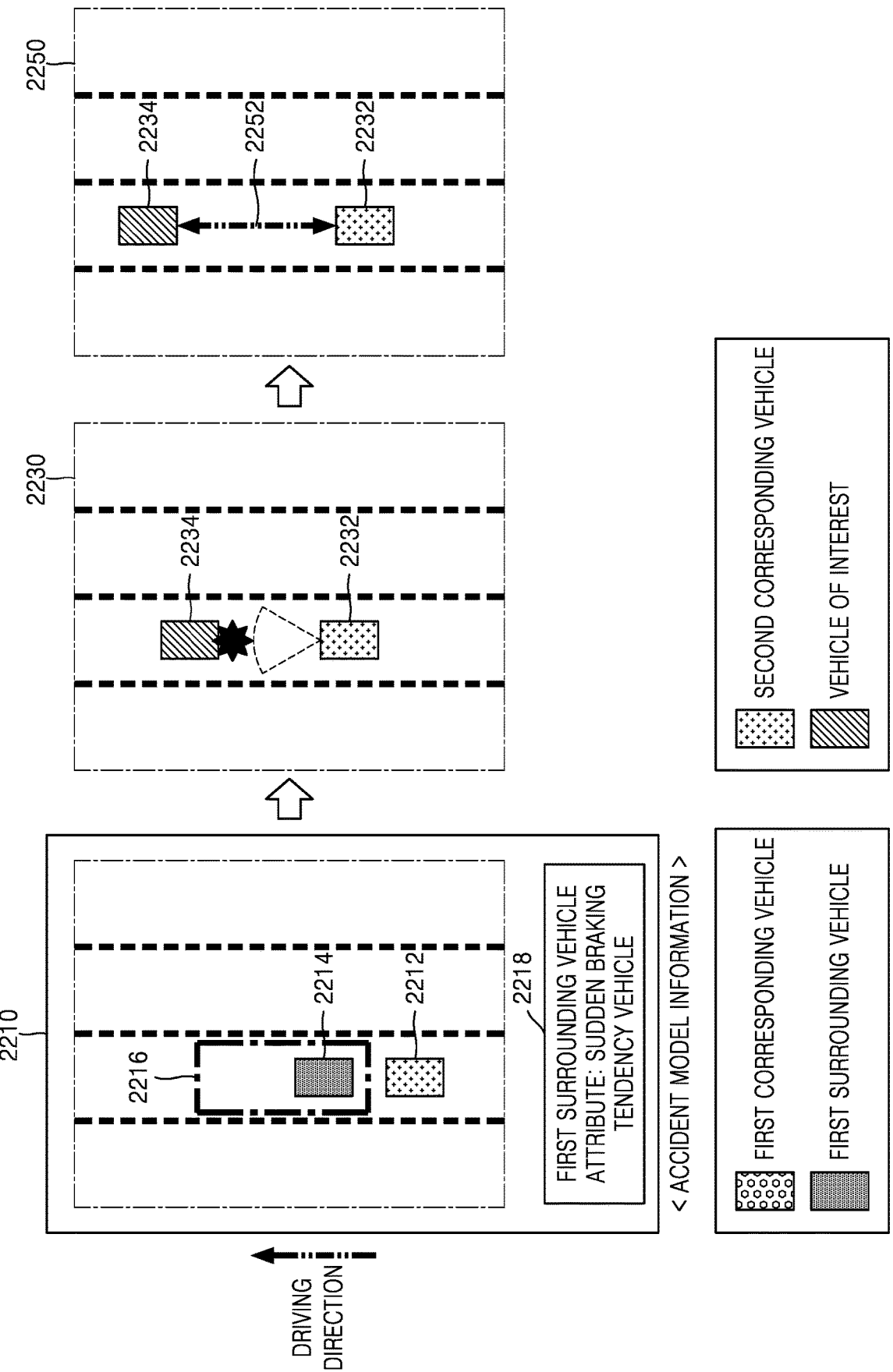
FIG. 22 is a diagram showing second type accident model information corresponding to a vehicle having a sudden braking tendency, according to an example embodiment of the disclosure.

FIG. 22 is a diagram showing second type accident model information corresponding to a vehicle having a sudden braking tendency, according to an embodiment of the disclosure.

According to an embodiment of the disclosure, the second type accident model information may include an accident model corresponding to the vehicle having the sudden braking tendency from among the surrounding vehicles. The vehicle having the sudden braking tendency may be defined based on the evaluation value of the sudden braking information in the driver information items. For example, when the evaluation value of the sudden braking information in the second surrounding driver information has a level of frequent or more, the surrounding vehicle may be classified as the vehicle having the sudden braking tendency.

An accident model 2210 defines the vehicle having the sudden braking tendency by using first surrounding vehicle attribute information 2218, and may include relative position information 2214 of the first surrounding vehicle. The relative position information 2214 may be defined as a front portion of a first corresponding vehicle 2212 or area information 2216 including a certain range in front of the first corresponding vehicle 2212 as shown in FIG. 22. For example, the area information 2216 may be defined as tens of meters ahead. The electronic device 110 measures a distance from a front vehicle by using a Radar sensor, etc. to detect vehicles within a caution area indicated by the area information 2216.

The accident model about the sudden braking tendency may prevent an accident when a vehicle having the sudden braking tendency is detected from a caution area indicated by the area information 2216 in front of the vehicle. For example, a situation is illustrated in which a vehicle of interest 2234 having the sudden braking tendency is detected in front of a second corresponding vehicle 2232 while the second corresponding vehicle 2232 is driving (2230). The vehicle of interest 2234 having the sudden braking tendency is likely to collide with the second corresponding vehicle 2232 due to tendency to execute a sudden braking operation during driving.

According to an embodiment of the disclosure, when the vehicle of interest 2234 having the sudden braking tendency is detected from the caution area indicated by the area information 2216 in front of the second corresponding vehicle 2232, the electronic device 110 generates the accident risk information to alert a driver to exercise caution and watch for sudden braking of the vehicle in front of the second corresponding vehicle 2232, and provide the driver with the accident risk information. Also, the accident risk information may include a guide to maintain a safe distance 2252 from the front vehicle. The driver may thus predict the possibility of sudden braking of the vehicle of interest 2234 in front of the driver according to the accident risk information, and may maintain the safe distance from the front vehicle to prevent the accident (2250).

Referring back to FIG. 10, an embodiment of the disclosure, which includes processes of calculating a predicted point of occurring an accident (S1006 and S1012) during the process of generating the accident risk information, will be described below.

According to an embodiment of the disclosure, the process of generating the accident risk information (S306) described above with reference to FIG. 10 may include the processes of calculating a predicted point of occurring accident (S1006 and S1012). When generating the accident risk information based on the first type accident model or the second type accident model, the electronic device 110 may calculate predicted routes of the second corresponding vehicle and the second surrounding vehicle based on the accident model information and calculate a predicted point of occurring the accident (S1006 and S1012).

With respect to the first type accident model, the electronic device 110 may obtain the predicted routes and the predicted point of occurring accident based on the driving route and the driver information at the time of actual accident. For example, when the second corresponding driver information of the second corresponding vehicle that is currently driving and the second surrounding driver information of the second surrounding vehicle similarly correspond to the driver information included in the accident model, the electronic device 110 may calculate the predicted route and the predicted point of occurring accident based on the driving route when the accident has actually occurred. When the second corresponding driver information of the second corresponding vehicle that is currently driving and the second surrounding driver information of the second surrounding vehicle do not similarly correspond to the driver information included in the accident model, the electronic device 110 may calculate the predicted route and the predicted point of occurring accident by correcting the driving route when the accident has actually occurred based on the second corresponding driver information and the second surrounding driver information.

With respect to the second type accident model, the electronic device 110 may predict the driving routes of the second corresponding vehicle and the second surrounding vehicle and calculate the predicted point of occurring the accident based on the second corresponding driver information of the second corresponding vehicle and the second surrounding driver information of the second surrounding vehicle.

According to an embodiment of the disclosure, the electronic device 110 may calculate the predicted route based on destination information of the second corresponding vehicle and the second surrounding vehicle. For example, when the second corresponding vehicle is predicted to go straight to the destination and the second surrounding vehicle is predicted to turn right to the destination, the electronic device 110 may predict the predicted route of each of the second corresponding vehicle and the second surrounding vehicle based on the prediction. To this end, the electronic device 110 may receive destination information or information regarding the predicted route from the second surrounding vehicle. According to an embodiment of the disclosure, the electronic device 110 may calculate the predicted route of the second surrounding vehicle based on a lane on which the second surrounding vehicle is driving.

According to an embodiment of the disclosure, the electronic device 110 tracks the second corresponding vehicle and the second surrounding vehicle in real-time, compares the predicted route with the actual route, and updates the predicted route based on the comparison. For example, when there is a difference between the predicted route and the actual route, the electronic device 110 may update the predicted route based on the real-time actual route.

A future time period in which the electronic device 110 predicts the predicted route may be set variously, for example, may be set as a few seconds to a few minutes. According to an embodiment of the disclosure, the future time period for predicting the predicted route may be determined based on at least one of a driving speed of the second corresponding vehicle, a road type (e.g., highway, local road, intersection, etc.), or driving habit information of the second corresponding vehicle, or a combination thereof.

Figure 23:
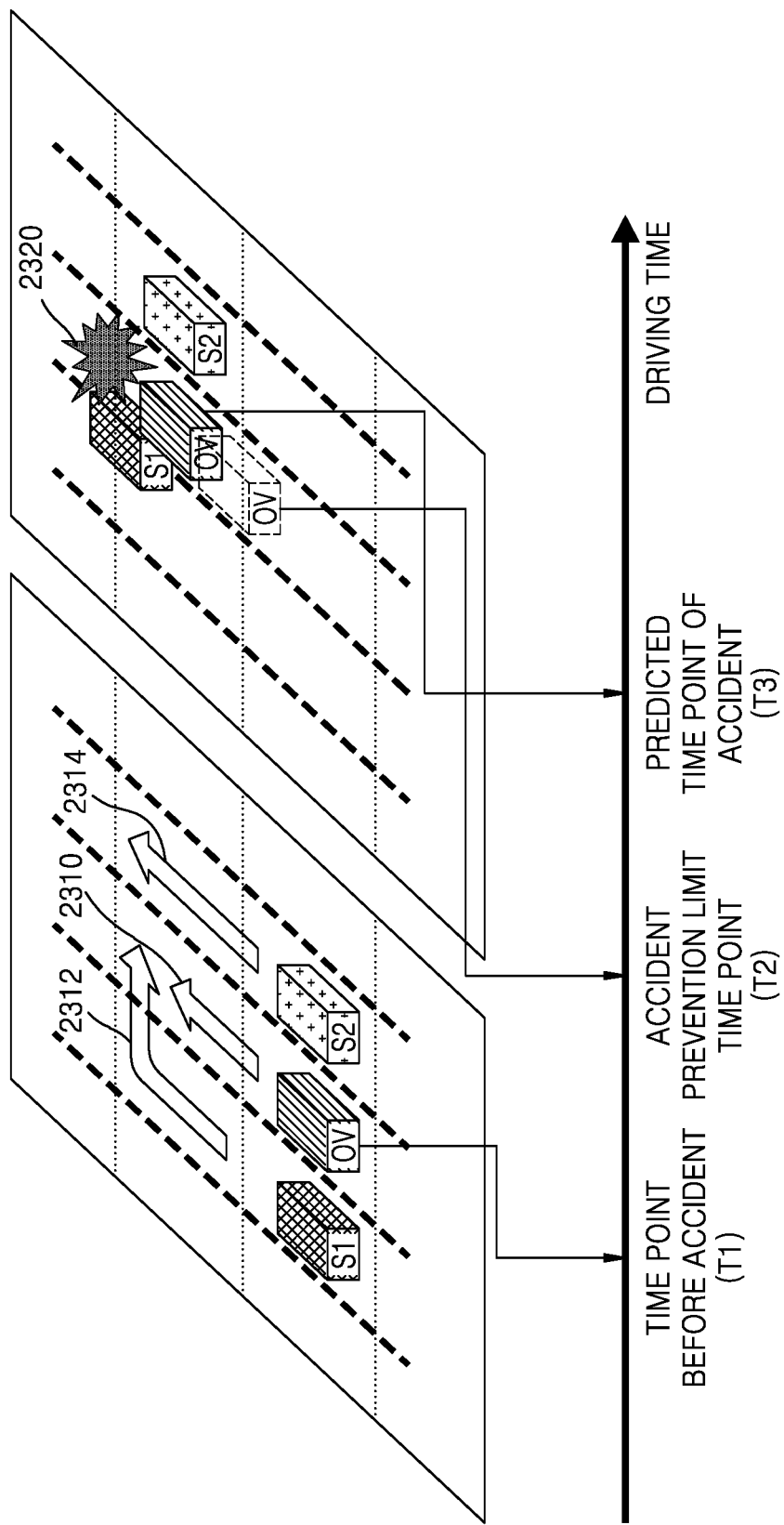
FIG. 23 is a diagram showing a prediction model of a driving route of a second corresponding vehicle and a second surrounding vehicle, according to an example embodiment of the disclosure.

FIG. 23 is a diagram showing a prediction model of driving routes of a second corresponding vehicle and a second surrounding vehicle, according to an embodiment of the disclosure.

Referring to FIG. 23, the electronic device 110 may predict predicted driving routes 2310, 2312, and 2314 of a second present vehicle OV and two second surrounding vehicles S1 and S2 in a driving situation at a time point T1, in which the second present vehicle OV and two surrounding vehicles S1 and S2 are driving. The electronic device 110 may predict a predicted route (S1006) based on the first type accident model and may predict a predicted route (S1014) based on the second type accident model in real-time during driving. The predicted driving routes 2310, 2312, and 2314 of the second present vehicle OV and two surrounding vehicles S1 and S2 may be predicted based on the accident history, the second corresponding driver information, and the second surrounding driver information as described above. For example, when the second surrounding vehicle S2 having the sudden left-turn/right-turn tendency is detected from a left side of the second present vehicle OV, the electronic device 110 may predict the predicted driving route 2312, in which the second surrounding vehicle S2 tries to cut in line in front of the second present vehicle OV.

The electronic device 110 may predict an occurrence of accident (2320) when a contact or a collision is predicted on the predicted driving route in the further time period based on the predicted route with respect to each of the vehicles. The electronic device 110 may predict an accident occurrence point T3 and an accident occurrence situation based on the predicted route over time, and may generate and output the accident risk information. When an accident is predicted to occur, the electronic device 110 may output the accident risk information as fast as possible.

The electronic device 110 calculates an accident prevention limit time point T2 for preventing the accident based on the predicted accident occurrence point T3, and may output the accident risk information prior to the accident prevention limit time point T2. When the accident prevention limit time point T2 has been already passed at the time of predicting the occurrence of the accident, the electronic device 110 may calculate an alternative route and output the alternative route to the driver for preventing the accident. For example, when a collision-type accident (2320) is predicted at the time point T3, the electronic device 110 may output the information guiding the driver to avoid the predicted accident point as the accident risk information.

According to an embodiment of the disclosure, the electronic device 110 may transfer the accident risk information to the second surrounding vehicles S1 and S2 to share the accident risk information with the second surrounding vehicles S1 and S2. Also, the electronic device 110 may transmit information requesting the second surrounding vehicles S1 and S2 to drive carefully.

Figure 24:
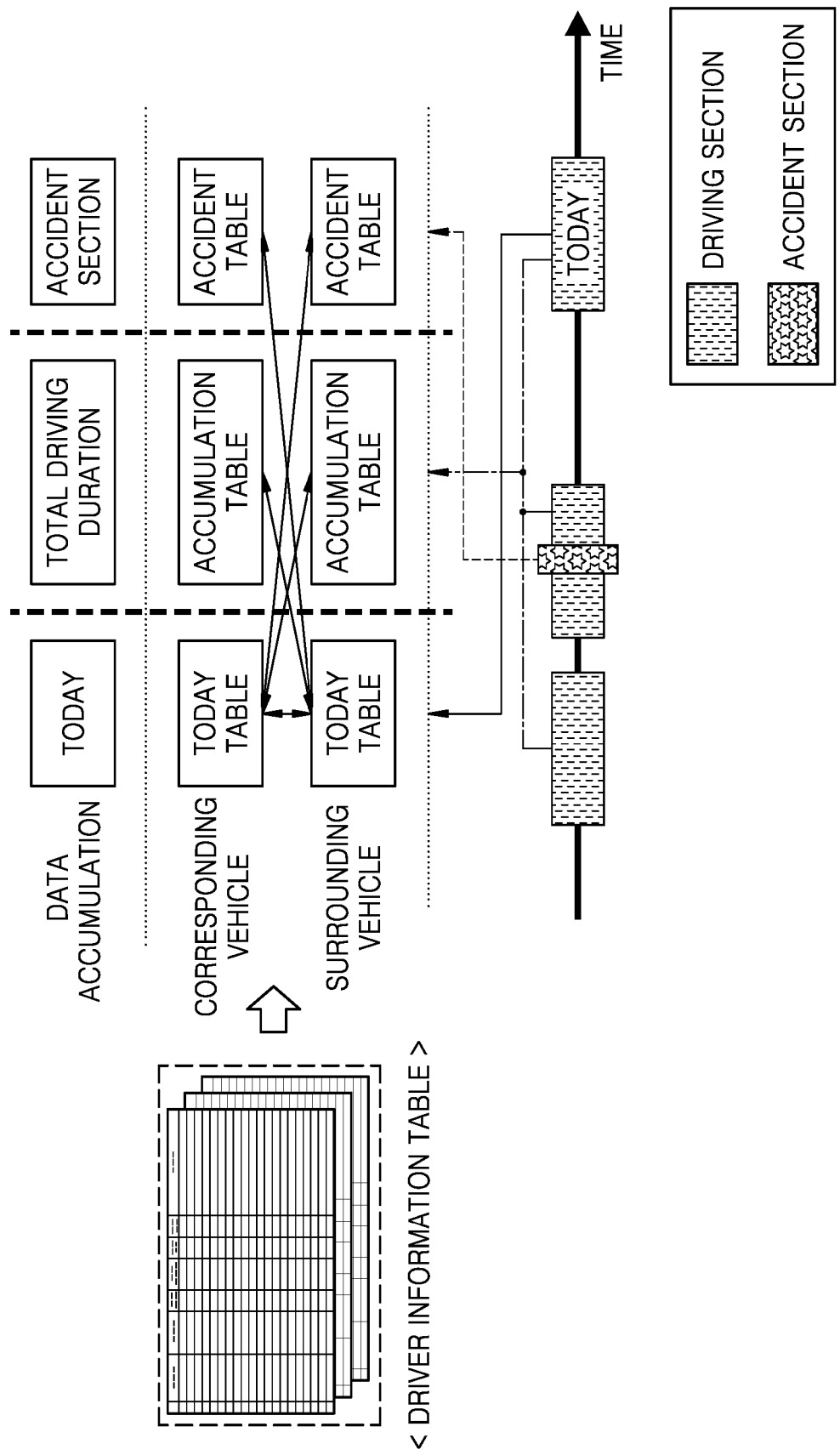
FIG. 24 is a diagram for describing an example of collecting statistics of driver information in an electronic device for a vehicle, according to an example embodiment of the disclosure.

FIG. 24 is a diagram for describing a way of collecting statistics of driver information in the electronic device 110, according to an embodiment of the disclosure.

According to an embodiment of the disclosure, the electronic device 110 may generate driver information accumulated for each period, by performing statistics for each period while collecting the driver information of the second corresponding vehicle. Also, the server may generate the driver information accumulated for each period, by performing statistics on the driver information for each period with respect to each vehicle or each driver.

According to an embodiment of the disclosure, the data accumulation period may be set as today, a total driving duration, or an accident section. 'Today' denotes statistics of the driver information collected on the day, 'total driving duration' denotes statistics of the driver information accumulated since the driver information of the corresponding driver is started to be collected, and 'accident section' denotes statistics of the driver information in the section where the accident has occurred. In the specification, a today table denotes today's statistical driver information, an accumulation table denotes driver information for which statistics have been performed for total driving duration, and an accident table denotes driver information for which statistics have been performed with respect to the accident section.

According to an embodiment of the disclosure, the data accumulation period may be set and changed by the user. The user may include at least one of a driver, a server manager, or a system designer, or a combination thereof. A user interface for changing the data accumulation period may be provided in the vehicle or the server. The data accumulation period may be set as, for example, 1 day, 3 days, 7 days, 10 days, etc. In another example, the data accumulation period may be set as a time zone, for example, hourly, daytime, nighttime, weekdays, weekend, etc.

According to an embodiment of the disclosure, when a certain driver information item has a tendency that varies according to time, a statistical value with respect to the driver information item according to time may be generated and stored. For example, when the drowsy driving information is represented as a danger level at a certain time zone in the afternoon, the electronic device 110 or the server generates statistical information on the drowsy driving information according to the time zone, and may define the evaluation value of the drowsy driving to be different according to the time zone. According to the embodiment of the disclosure, the electronic device 110 obtains an evaluation value with respect to a certain driver information item according to the time zone and may define the risk level information differently according to the time zone. For example, a certain driver may be defined as a dangerous driver between 2 PM and 4 PM, and then may be defined as a safe driver at other times.

When receiving the driver information from the second surrounding vehicle, the electronic device 110 may receive all of the today table, accumulation table, and accident table. The electronic device 110 may generate the accident risk information based on at least one of real-time second surrounding driver information, the today table, the accumulation table, or the accident table of the second surrounding vehicle, or a combination thereof.

The electronic device 110 may generate the accident risk information based on driver information for each period. For example, the electronic device 110 may compare the driver information with the first type accident model or the second type accident model, by setting a weight to the driver information for each period. The weight may vary depending on the accident model or the driver information item. For example, when comparing the first type accident model with the driver information, the electronic device 110 may set a largest weight to the accident section, set a next largest weight to the today table, and set a low weight to the accumulation table. In another example, when comparing the second type accident model with the driver information, the electronic device 110 may adjust a weight of the today table and a weight of the accumulation table according to attributes of the second type accident model, based on the attributes of the second type accident model (cut-in-line tendency, sudden left-turn/right-turn tendency, etc.). For example, with respect to the cut-in-line tendency, the weight of the accumulation table may be set to be greater than the today table, and with respect to the sudden left-turn/right-turn tendency, the weight of the today table may be set to be greater than the accumulation table.

Figure 25:
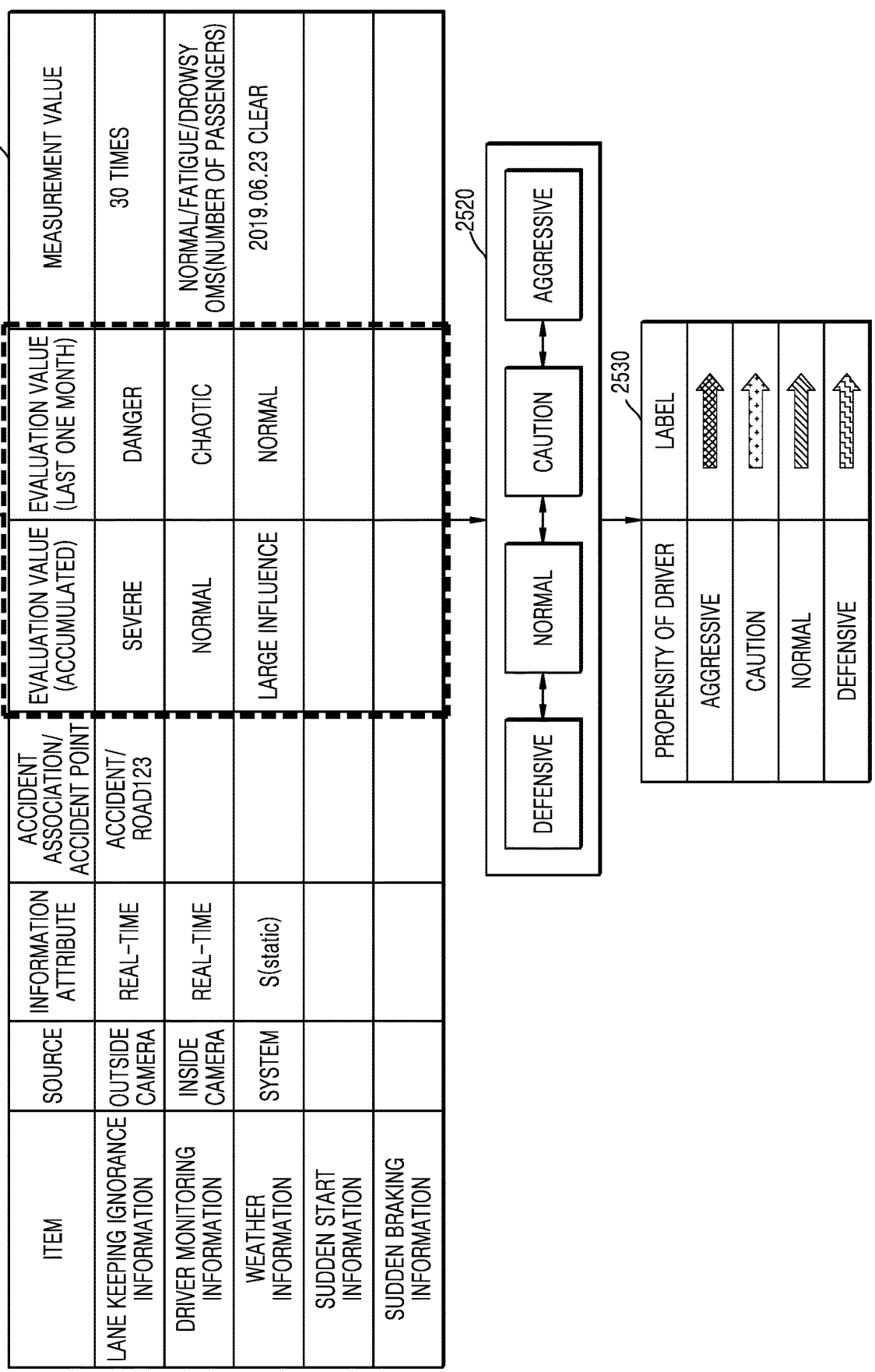
FIG. 25 is a diagram illustrating a process of classifying a driver's tendency according to an example embodiment of the disclosure.

FIG. 25 is a diagram illustrating a process of classifying a driver's tendency according to an embodiment of the disclosure.

According to an embodiment of the disclosure, the electronic device 110 may define the tendencies of the drivers of the second corresponding vehicle and the second surrounding vehicle. The electronic device 110 may define the driver's tendency from the second corresponding driver information or the second surrounding driver information. The electronic device 110 may define the driver's tendency from an evaluation value 2512 of driver information 2510. The driver's tendency may be defined as a certain level according to a certain criterion. For example, the driver's tendency may be classified as defensive, normal, caution, and aggressive (2520). Each level of the driver's tendency may be distinguished by a certain reference value with respect to an evaluation value 2512 of the driver information item.

According to an embodiment of the disclosure, a label may be assigned to each driver's tendency (2530). The label assigned to each driver's tendency may be discriminated by color, shape, pattern, sign, number, etc. The electronic device 110 may provide information about each driver by using the label defined with respect to the driver's tendency.

According to an embodiment of the disclosure, the driver's tendency may be defined according to the period or according to a driver information item. For example, the driver's tendency may be defined according to periods, e.g., the driver tendency for today, the driver tendency for the last month, the cumulative driver tendency, etc. Also, the driver's tendency may be defined for each item in the driver information, e.g., the driver tendency about the cut-in-line information, the driver tendency about the sudden left-turn/right-turn information, etc.

According to an embodiment of the disclosure, the electronic device 110 may request the second surrounding driver information from the second surrounding vehicle based on the driver's tendency. For example, the electronic device 110 may request the second surrounding driver information from the second surrounding vehicle having the caution or the aggressive tendency (e.g., but not from other vehicles), and may not request the second surrounding driver information from the second surrounding vehicle of the defensive or normal tendency.

According to an embodiment of the disclosure, the electronic device 110 may provide the accident risk information based on the driver's tendency. The electronic device 110 may provide information about the second surrounding vehicle by using the label indicating the driver's tendency when displaying the accident risk information. For example, when displaying the second surrounding vehicle while providing the accident risk information, the electronic device 110 may display each second surrounding vehicle by using a color or a label corresponding to the driver's tendency of each second surrounding vehicle.

Figure 26:
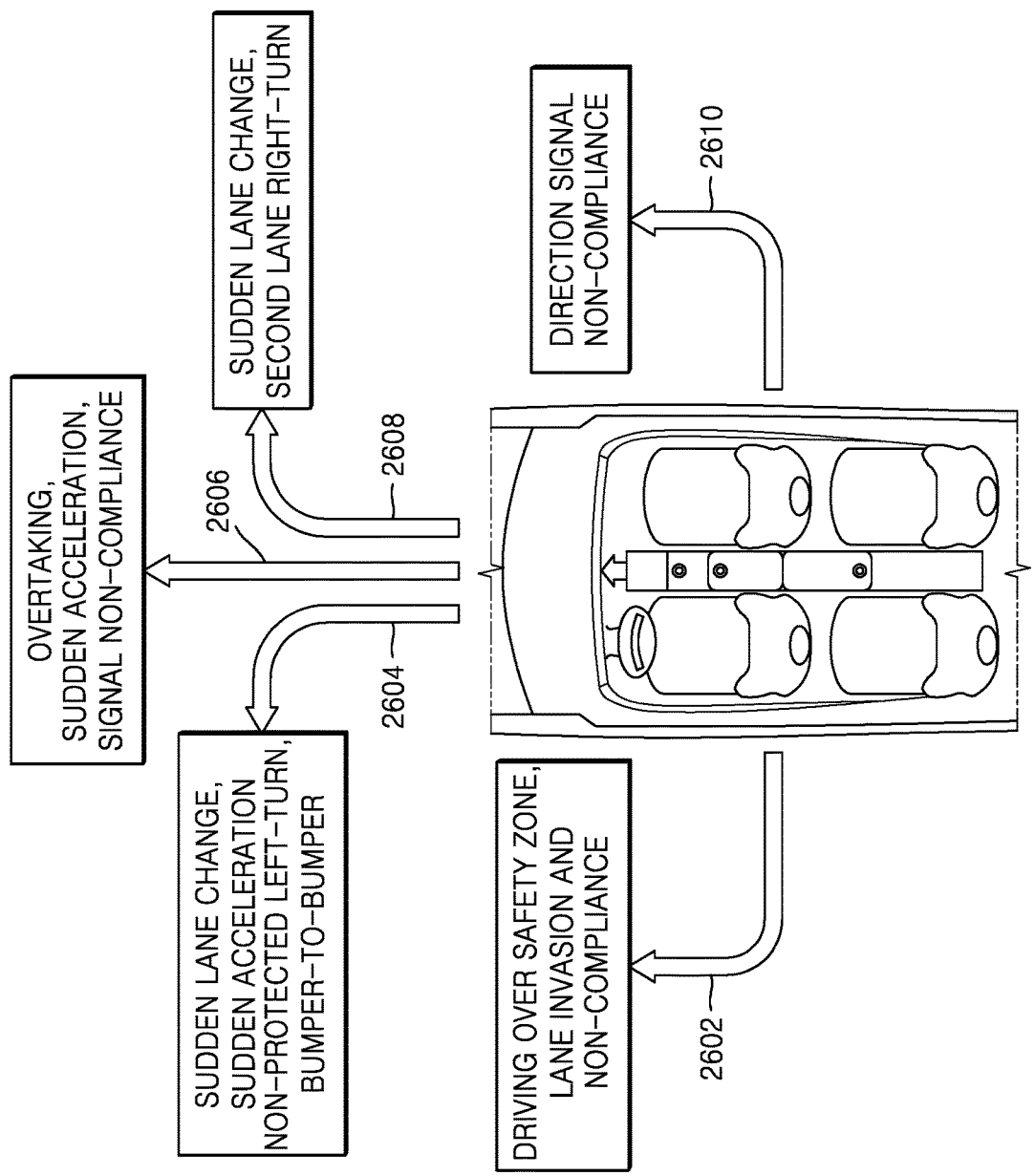
FIG. 26 is a diagram illustrating a method of defining a vehicle tendency, according to an example embodiment of the disclosure.

FIG. 26 is a diagram illustrating a method of defining vehicle tendency according to an embodiment of the disclosure.

According to an embodiment of the disclosure, the driver's tendency according to each driving route may be defined with respect to each vehicle. The driver's tendency according to the driving route may be defined based on an evaluation value of the driver information item that is related with that driving route. With respect to a left entry path (2602), the driver's tendency may be defined based on the driver information items such as safety zone entry information, lane keeping ignorance information, steering wheel direction change/rapid turn information, left/right turn signal non-compliance information, etc. With respect to a left-turn lane (2604), the driver's tendency may be defined based on entry lane location information, signal compliance information, signal change time elapse information, steering wheel direction change/rapid turn information, non-protected high speed entry information, bumper-to-bumper information, etc. With respect to a straight lane (2606), the driver's tendency may be defined based on sudden start information, sudden braking information, braking information, drowsy driving information, signal compliance information, signal change time elapse information, bumper-to-bumper information, etc. With respect to a right-turn path (2608), the driver's tendency may be defined based on entry lane position information, steering wheel direction change/rapid turn information, etc. With respect to a right entry path (2610), the driver's tendency may be defined based on the driver information items such as lane keeping ignorance information, steering wheel direction change/rapid turn information, left/right turn signal non-compliance information, etc. The items that are taken into account when determining the driver's tendency with respect to each path may be selectively and variously combined, and may be variously modified.

The driver's tendency may be determined by a combination of the evaluation values of the driver information items taken into account in the corresponding path. For example, the driver's tendency may be calculated by a linear combination, in which weights are respectively applied to the evaluation value of the driver information items considered in the corresponding route and summed.

According to an example, as shown in FIG. 26, a driver is likely to drive over the safety zone and to violate a lane on the left entry path 2602, and thus, a vehicle of the driver may be classified as a dangerous vehicle. Also, a driver is likely to not comply with the direction signal on the right entry path 2610, and thus, a vehicle of the driver may be classified as a dangerous vehicle. In addition, a vehicle driven by a driver having the tendency of sudden lane change, sudden non-protected left-turn, and bumper-to-bumper driving tendency on the left-turn lane 2604 may be classified as a dangerous vehicle, may be classified as a general vehicle on the straight lane 2606, and may be classified as a cautious vehicle due to the tendency of sudden lane change and second-lane right-turn tendency.

Figure 27:
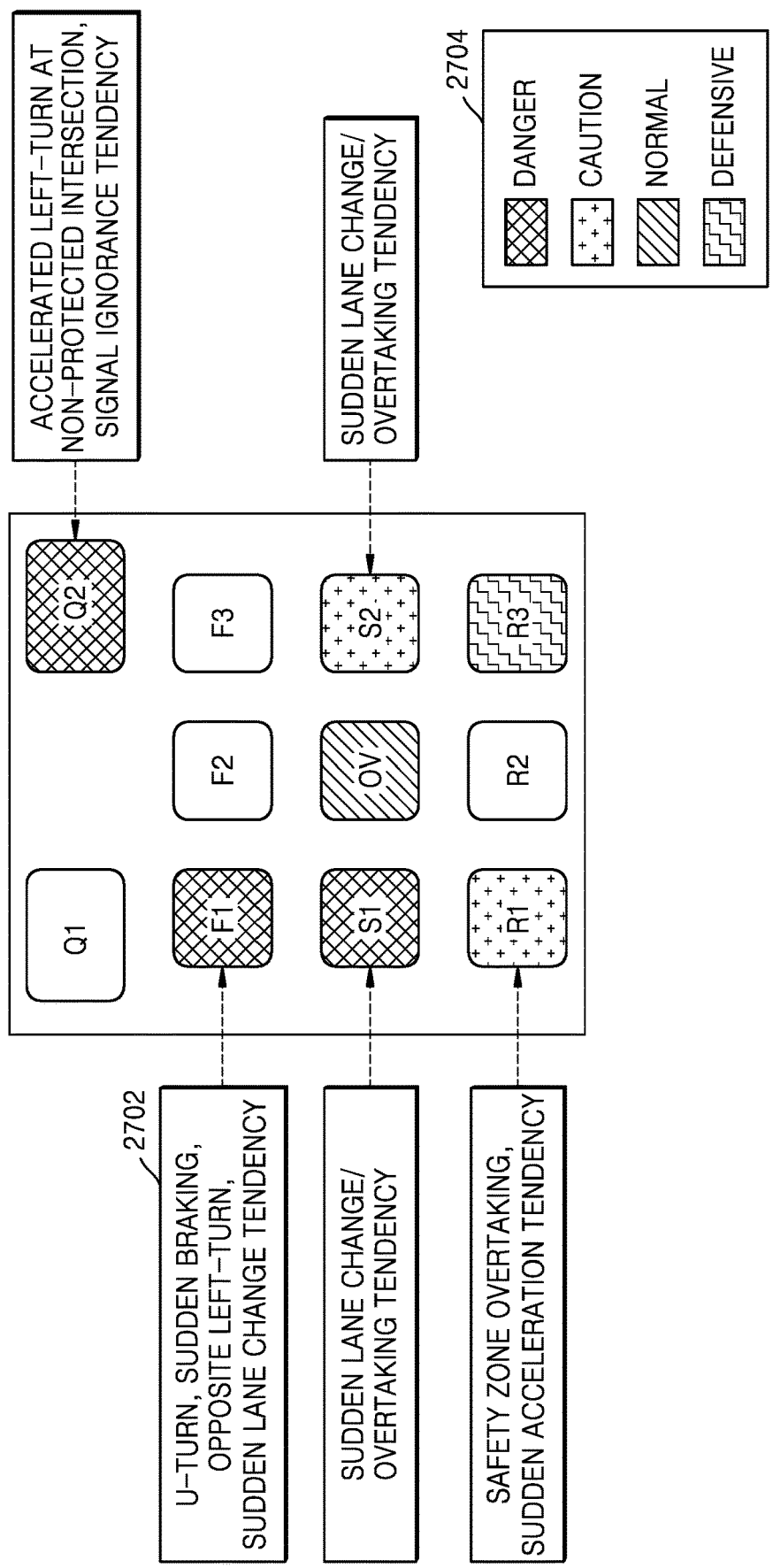
FIG. 27 is a diagram illustrating a method of defining a risk level of a second surrounding vehicle, according to an example embodiment of the disclosure.

FIG. 27 is a diagram illustrating a method of defining a risk level of a second surrounding vehicle, according to an embodiment of the disclosure.

According to an embodiment of the disclosure, the electronic device 110 may define a risk level of the second surrounding vehicle based on the relative position, based on the driver's tendency with respect to each route. For example, the second surrounding vehicle having the tendency of steering wheel direction change/rapid turn is not a dangerous vehicle when it is behind the second present vehicle OV, but may be classified as a dangerous vehicle when it is on the left side, the right side, or in front of the present vehicle OV. In another example, the second surrounding vehicle having the tendency of entering the safety zone may not be classified as a dangerous vehicle when it is in front of the second corresponding vehicle, but may be classified as a dangerous vehicle when it is on a left rear side or behind the second present vehicle OV. As described above, the electronic device 110 may calculate the risk level of the second surrounding vehicle according to the relative position of the second surrounding vehicle and the driver's tendency in the second surrounding vehicle, and may provide the user with the risk level as the accident risk information. A certain label 2704 is assigned to the risk level and is used when outputting the accident risk information.

As shown in FIG. 27, the risk levels of the second surrounding vehicles F1, F2, F3, S1, S2, R1, R2, R3, O1, and O2 of the present vehicle OV may be defined. In addition, the risk level information for the second surrounding vehicles may be output through the output interface. For example, the risk level information, to which the label is assigned, may be displayed as shown in FIG. 27. Also, according to an embodiment of the disclosure, with respect to the second surrounding vehicles F1, F2, F3, S1, S2, R1, R2, R3, O1, and O2, risk level related information 2702 may be output with the risk level information. For example, with respect to the vehicle F1 on the left front portion, the risk level related information 2702 indicating that the vehicle F1 has the tendency of not complying with the U-turn lane, sudden braking tendency, and sudden lane change tendency.

Next, an example of providing accident information will be described below.

As described above with reference to FIGS. 1 and 3, the electronic device 110 may generate the accident risk information and outputs the accident risk information through the output interface 118 (S308). The accident risk information may be output in various ways, e.g., in the form of GUI, audio, vibration, etc. Also, the accident risk information may be transferred to an external device such as a server or a second peripheral device via the communicator 116 and output.

According to an embodiment of the disclosure, the electronic device 110 may generate and provide the accident risk information by determining whether there is a possibility of accident occurrence. For example, when the similarity between the driver information of the accident model and the second corresponding/surrounding driver information is equal to or greater than a certain reference value, the electronic device 110 may determine that there is a possibility of accident occurrence and warn the user of the accident risk.

According to another embodiment of the disclosure, the electronic device 110 may generate and provide the accident risk information by determining a probability of accident occurrence. For example, the electronic device 110 may classify the probability of the accident occurrence in levels of high, caution, normal, low, safe, etc. according to a numerical range of the driver information similarity, and may provide the user with the level of accident occurrence probability as the accident risk information. Also, the level of accident occurrence probability may correspond respectively to a label to which a certain attribute is applied. For example, the levels of the accident occurrence probability may match with different colors (e.g., red, orange, gray, blue, green, etc.), and thus, when the accident possibility is provided, the levels of the accident occurrence probability may be also provided in colors.

According to another embodiment of the disclosure, the electronic device 110 may quantify the accident occurrence probability and may provide the quantified accident occurrence probability as the accident risk information. For example, the accident occurrence probability may be quantified as a percentage (%) value. Also, the accident occurrence probability may be provided as a numerical percentage value, in the form of a graph, etc.

Figure 28:
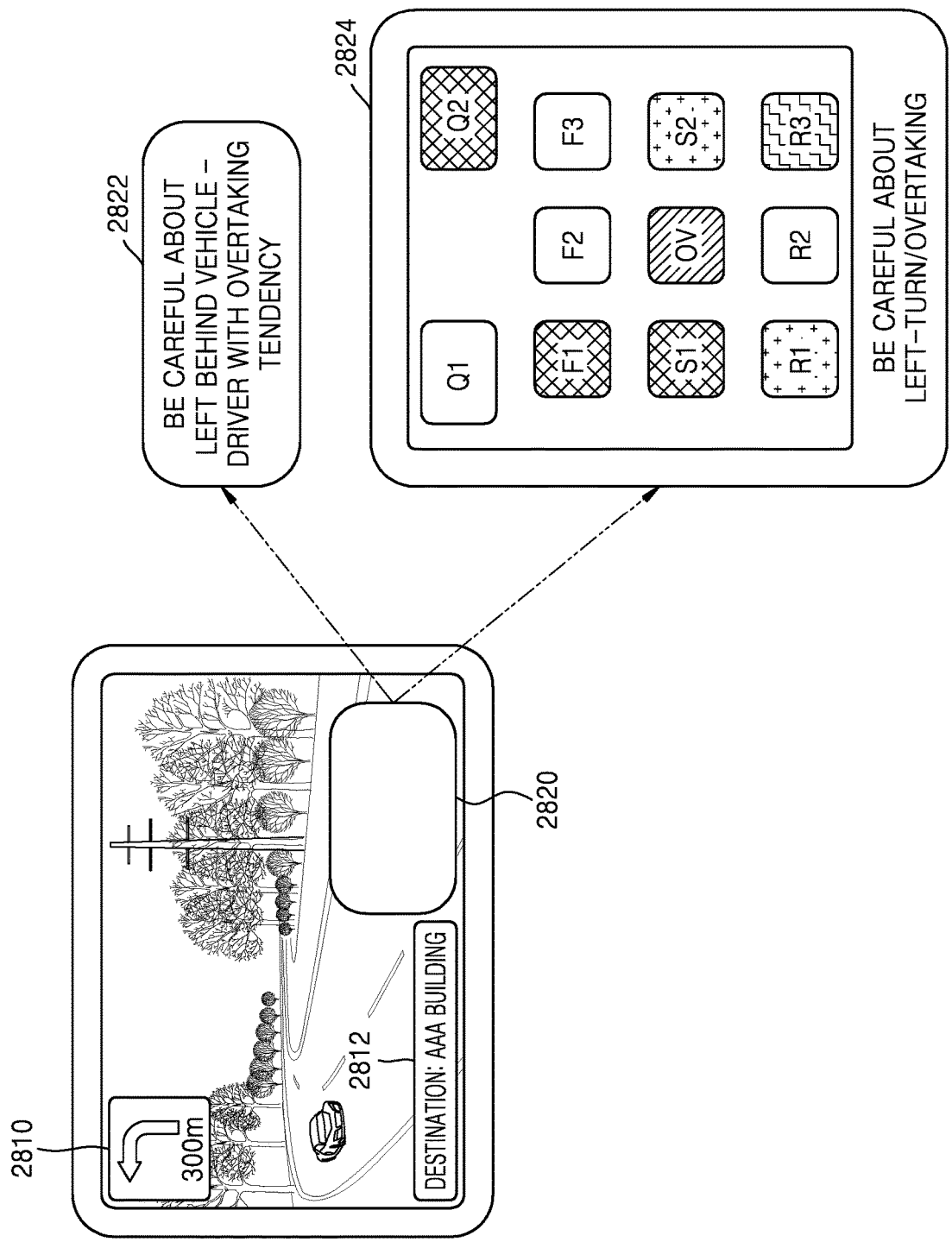
FIG. 28 is a diagram showing a GUI view outputting accident risk information, according to an example embodiment of the disclosure.

FIG. 28 is a diagram showing a GUI view outputting accident risk information, according to an embodiment of the disclosure.

According to an embodiment of the disclosure, the electronic device 110 may display the accident risk information. The accident risk information may be output as a single GUI view or may be output with information regarding other functions.

According to an embodiment of the disclosure, the accident risk information may be displayed with a navigation GUI view. The electronic device 110 may output the accident risk information on a certain region 2820, while outputting navigation information 2810 and 2812. The electronic device 110 may continuously output the accident risk information during the driving of the vehicle, may output the accident risk information when a dangerous vehicle or a dangerous situation is detected (e.g., but not under normal driving conditions), or may output the accident risk information when a surrounding vehicle is detected (e.g., but not when no surrounding vehicles are detected).

According to an embodiment of the disclosure, the accident risk information may be displayed as text information 2822. According to another embodiment of the disclosure, the accident risk information may be provided on a picture showing relative positions of the second corresponding vehicle and the second surrounding vehicle (2824). For example, the accident risk information may be displayed as shown in FIG. 27.

According to an embodiment of the disclosure, the accident risk information may be output as audio information together with visual information. For example, the output interface may output a voice regarding the accident risk information (for example, a guide voice such as 'be careful about the left behind vehicle').

Figure 29:
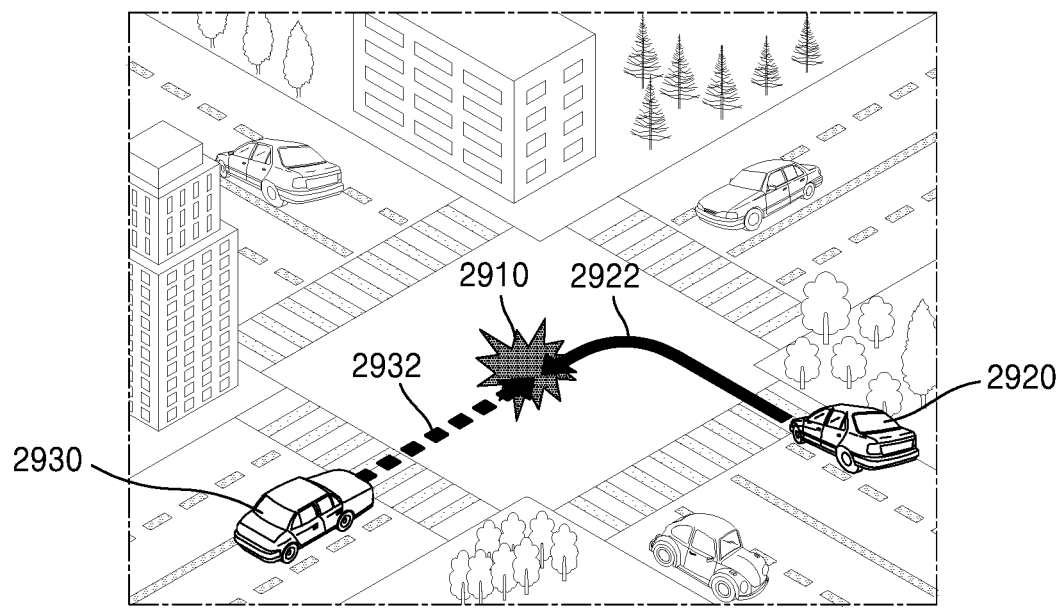
FIG. 29 is a diagram showing a GUI view providing accident risk information, according to an example embodiment of the disclosure.

FIG. 29 is a diagram showing a GUI view providing accident risk information, according to an embodiment of the disclosure.

According to an embodiment of the disclosure, when occurrence of an accident is predicted, information about a predicted point 2910 of accident and a related surrounding vehicle 2930 may be provided. As described above, the electronic device 110 may calculate predicted routes of the second corresponding vehicle and the second surrounding vehicle (S1006 and S1014), and may generate the accident model information (S1008 and S1014) based on the accident model and the real-time driver information. When an accident is predicted during the processes of calculating the predicted routes of the vehicles and the predicted point of the accident as described above, the electronic device 110 may calculate and output predicted routes of the vehicles related to the accident and the predicted point of the accident.

According to an embodiment of the disclosure, the electronic device 110 may display a second corresponding vehicle 2920, a predicted route 2922 of the second corresponding vehicle 2920, the second surrounding vehicle 2930 related to a predicted accident, a predicted route 2932 of the second surrounding vehicle 2930, and a predicted point 2910 of the accident. The locations of the vehicles, the predicted routes, and the predicted point of the accident may be updated in real-time over time. According to an embodiment of the disclosure, when it is determined that the accident risk meets a threshold, the electronic device 110 may magnify a size of the region 2820 indicating the accident risk information to display the accident risk information, or may display the accident risk information on the entire screen.

According to an embodiment of the disclosure, the electronic device 110 may depict and display the vehicle location, the predicted route, and the predicted point of the accident on map data of the current location. According to another embodiment of the disclosure, the electronic device 110 may depict and display the vehicle location, the predicted route, and the predicted point of the accident on a captured image captured by the exterior camera of the vehicle.

Figure 30:
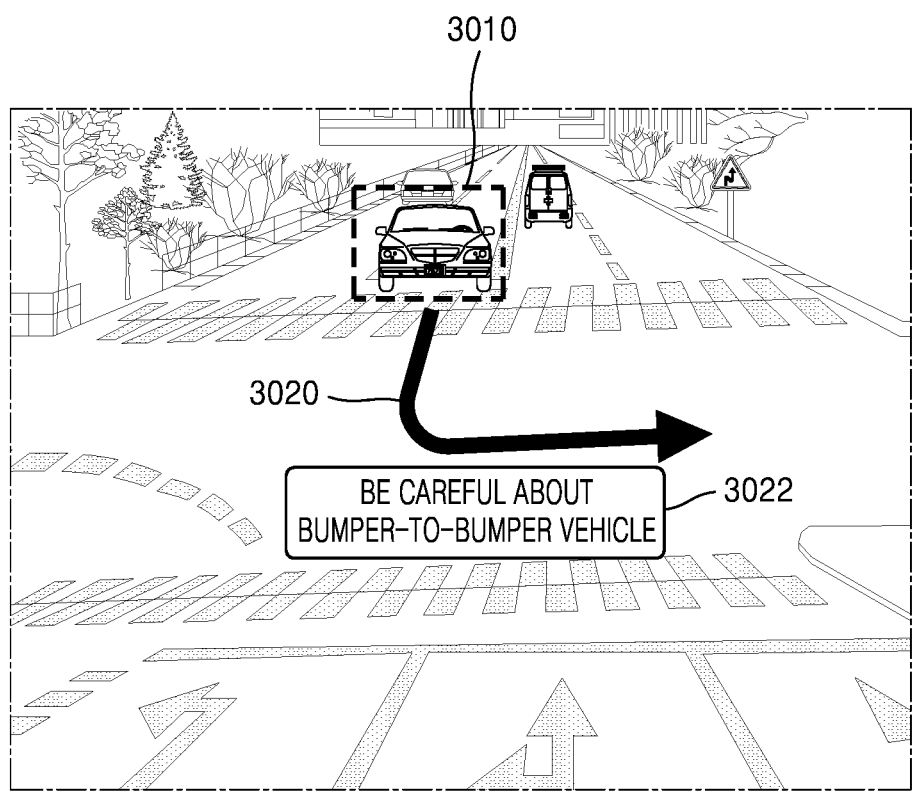
FIG. 30 is a diagram showing a GUI view providing accident risk information, according to an example embodiment of the disclosure.

FIG. 30 is a diagram showing a GUI view providing accident risk information, according to an embodiment of the disclosure.

According to an embodiment of the disclosure, the electronic device 110 may indicate a second surrounding vehicle 3010 having a threshold level of risk, a predicted route 3020 of the second surrounding vehicle 3010, and the second surrounding driver information 3022 on the captured image captured by the exterior camera of the vehicle. The electronic device 110 displays the captured image in real-time and displays the accident risk information on the captured image, and thus, the driver of the second corresponding vehicle may easily match the actual situation with the accident risk information.

Figure 31:
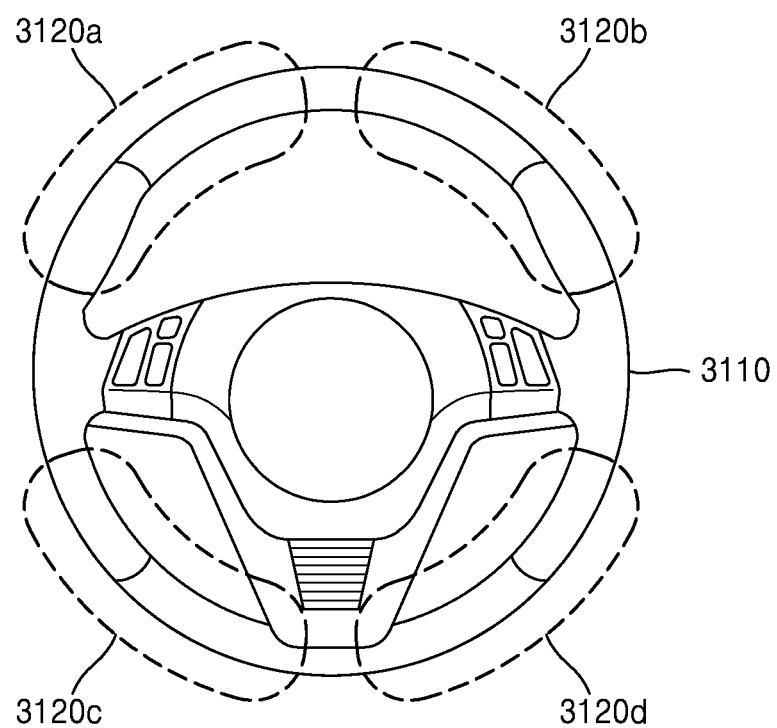
FIG. 31 is a diagram showing a configuration of providing accident risk information via a steering wheel, according to an example embodiment of the disclosure.

FIG. 31 is a diagram showing a configuration of providing accident risk information via a steering wheel, according to an embodiment of the disclosure.

According to an embodiment of the disclosure, the accident risk information may be provided via vibration of a steering wheel 3110. For example, a vibration device is installed at a certain location in the steering wheel 3110, and a caution alarm may be output through the vibration of the steering wheel 3110. The processor 114 of the electronic device 110 may directly control the vibration device in the steering wheel 3110 or request a vehicle driving system (ECU, etc.) to output vibration to a certain vibration region, and outputs a vibration signal.

According to an embodiment of the disclosure, the steering wheel 3110 includes a vibration device in each of vibration regions 3120a, 3120b, 3120c, and 3120d of the steering wheel 3110, and may output the vibration region of the steering wheel 3110, which corresponds to a direction to which the driver should be attentive. For example, when a second surrounding vehicle having a threshold risk is detected from the front left portion and the driver needs to be careful, the electronic device 110 may output a vibration signal through the vibration region 3120a. Also, when a second surrounding vehicle having threshold risk is detected behind the vehicle and the driver needs to be careful, the electronic device 110 may output a vibration signal through the vibration regions 3120c and 3120d. According to an embodiment of the disclosure, the electronic device 110 may provide information such as a risk level, an emergency level, etc. by using a vibration intensity and a vibration pattern.

Figure 32:
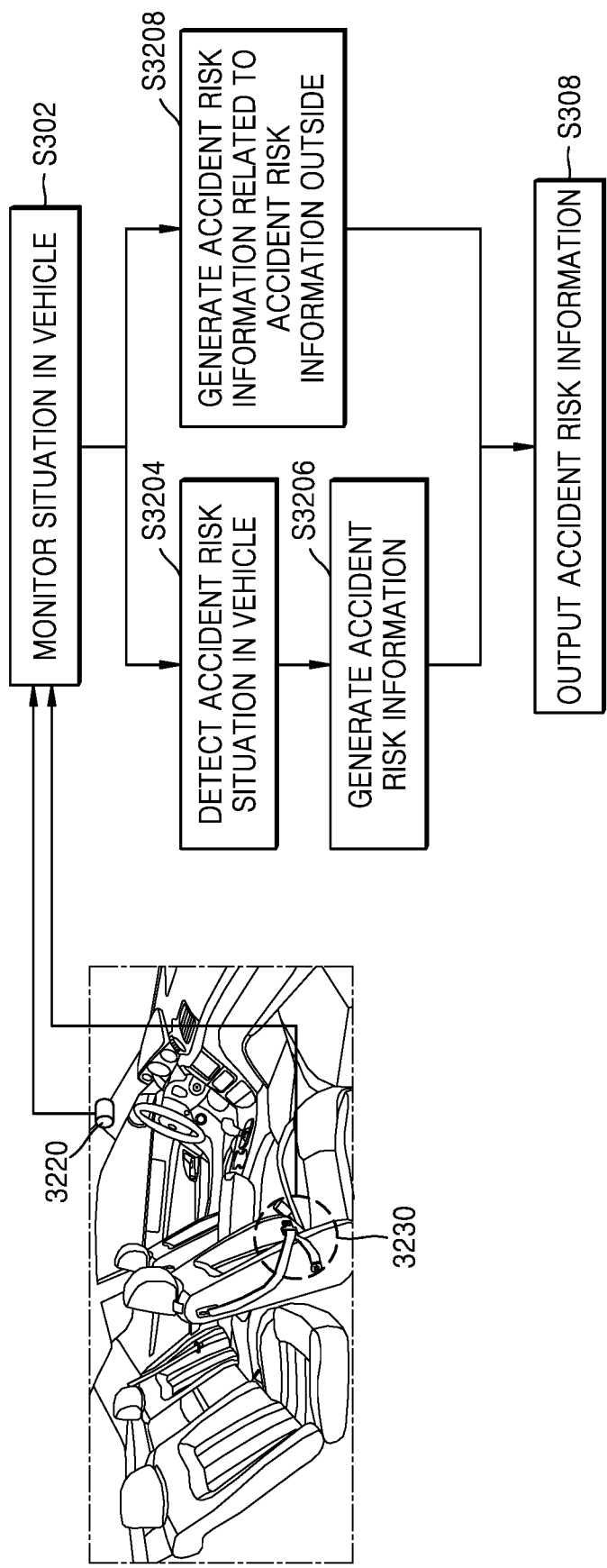
FIG. 32 is a diagram illustrating a process of generating accident risk information by using a camera in a vehicle and a certain sensor, according to an example embodiment of the disclosure.

FIG. 32 is a diagram illustrating a process of generating accident risk information by using a camera in a vehicle and a certain sensor, according to an embodiment of the disclosure.

According to an embodiment of the disclosure, the electronic device 110 may generate accident risk information related to the situation in the vehicle based on information about the situation in the vehicle by monitoring the inside of the vehicle. The vehicle may include at least one interior camera 3220 and at least one sensor for monitoring the inside of the vehicle (e.g., such as a seatbelt sensor 3230). For example, the vehicle may include a seat belt sensor 3230, a weight sensor, a noise sensor, etc. The interior camera 3220 may capture an image of the inside of the vehicle. The inside image may include a driver, a passenger, inside the vehicle, etc. The seat belt sensor 3230 may detect fastened/released states of the seat belt.

The electronic device 110 monitors the inside situation of the vehicle by receiving the inside image captured by the interior camera 3220, a detection signal of the seat belt sensor 3230, etc. (S3202). The electronic device 110 may monitor the inside situation of the vehicle, e.g., whether the driver and the passenger fasten/unfasten the seat belt, whether the driver and the passenger is out of the seats, whether a dangerous material is detected from the inside, a noise level in the vehicle, etc. from the information collected from the inside of the vehicle.

When a dangerous situation is detected from the information about the inside situation of the vehicle (S3204), the electronic device 110 generates accident risk information notifying the dangerous situation (S3206). For example, when the dangerous situation in the vehicle such as a case in which a passenger is out of the seat, a case in which the passenger does not fasten the seat belt, etc. is detected, the accident risk information related to the inside situation is generated.

Next, an example, in which the accident risk information is generated taking into account the inside situation information of the vehicle and the accident model, will be described below. When it is determined that the accident risk is a threshold value based on the first type accident model and the second type accident model, the electronic device 110 generates the accident risk information regarding the inside of the vehicle based on the inside situation information of the vehicle (S3208). For example, in a case in which a vehicle having a sudden braking tendency approaches from behind, when there is a passenger who does not fasten the seat belt in the vehicle, the electronic device 110 generates accident risk information for guiding the passenger to fasten the seat belt (S3208).

The electronic device 110 may output the accident risk information regarding the inside of the vehicle through the output interface (S308). For example, the output interface may output a guide voice such as a seat belt fastening request or a seating request, or may display a guide message.

Figure 33:
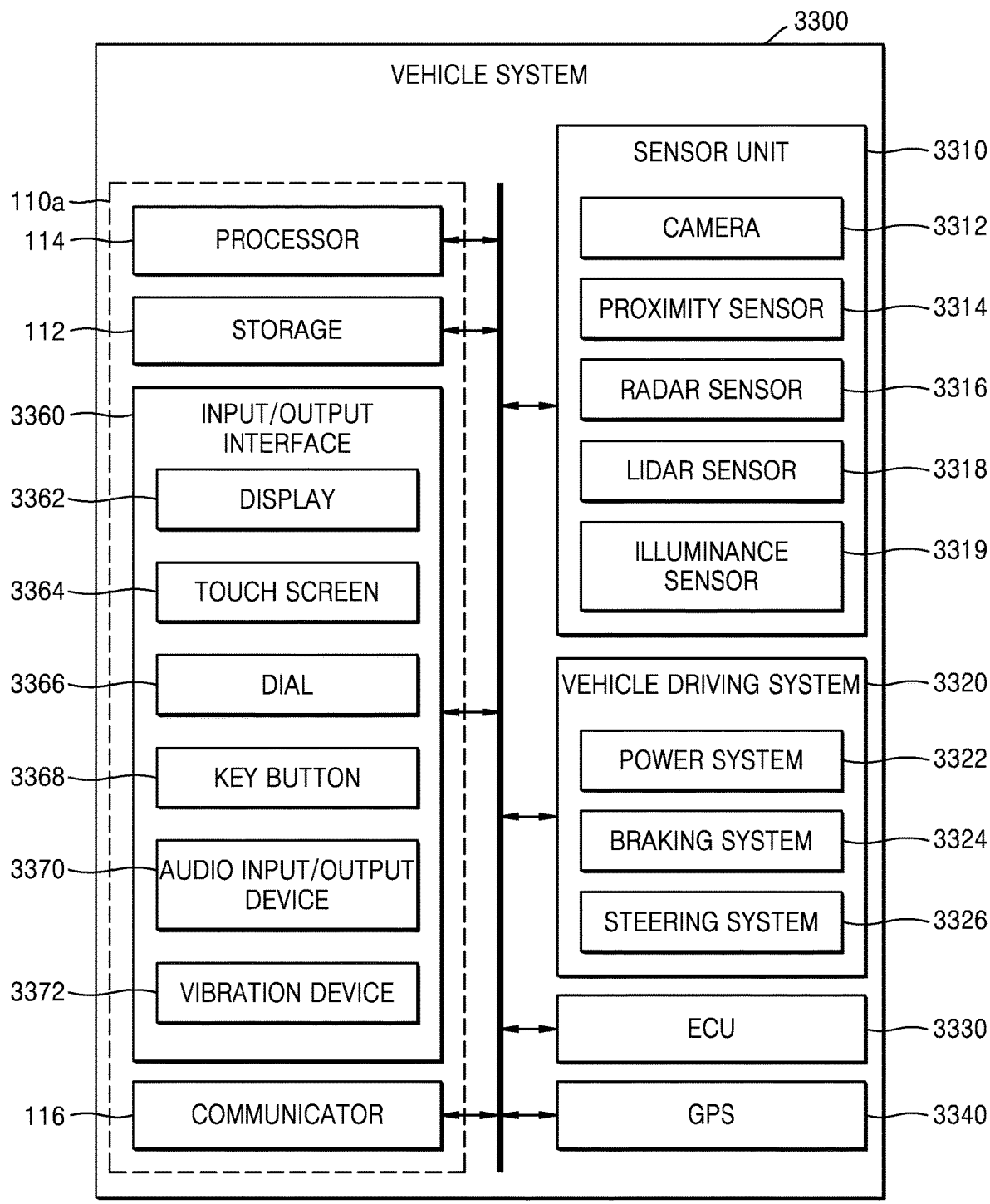
FIG. 33 is a diagram showing a configuration of a vehicle system according to an example embodiment of the disclosure.

FIG. 33 is a diagram showing a configuration of a vehicle system 3300 according to an embodiment of the disclosure.

An electronic device 110a for vehicle according to one or more embodiments of the disclosure may be included in the vehicle system 3300. The vehicle system 3300 denotes an overall system of a vehicle, and may include various mechanical and electronic devices included in the vehicle. The electronic device 110a for vehicle may receive and use driving-related information and detection signals obtained by other elements in the vehicle system 3300. Also, the electronic device 110a for vehicle may provide various data to other elements of the vehicle system 3300 or may output a control signal to control other elements in the vehicle system 3300.

According to an embodiment of the disclosure, the vehicle system 3300 may include the electronic device 110a for vehicle, a sensor portion 3310, a vehicle driving system 3320, an ECU 3330, and a GPS 3340.

The electronic device 110a for vehicle may include the processor 114, the storage 112, an input/output interface 3360, and the communicator 116. The input/output interface 3360 may include the output interface 118 described above with reference to FIG. 1. The input/output interface 3360 may selectively include elements such as a display 3362, a touch screen 3364, a dial 3366, a key button 3368, an audio input/output device 3370, a vibration device 3372, etc., and may include input/output devices of various combinations. One or more visual output interfaces such as the display 3362, the touch screen 3364, etc. may be provided, and the touch screen 3364 and the display 3362 may be provided together. The audio input/output device 3370 may include a microphone for detecting external sound and a speaker outputting audio signals. The processor 114 may provide a voice recognition user interface via the audio input/output device 3370. The vibration device 3372 may be located at various locations such as seats in the vehicle, in addition to the steering wheel as described above.

The communicator 116 may communicate via near field communication of various types, via a mobile communication network, etc. The communicator 116 may include, for example, a near field communication module such as Bluetooth, Bluetooth low energy (BLE), near field communication, wireless local area network (WLAN) (Wi-Fi), ZigBee, infrared data association (IrDA), Wi-Fi Direct (WFD), ultra-wideband (UWB), Ant+ communication, etc. Also, the communicator 116 may include a mobile communication module such as Wave, C-Vehicle to Everything (V2X), 5G-V2X, LTE-V2X, etc. Also, the communicator 116 may include a communication module such as a dedicated short-range communications (DSRC), C-V2X, 5G-V2X, LTE-V2X, etc. Kinds and combinations of the communication modules included in the communicator 116 may vary according to embodiments of the disclosure.

Also, the communicator 116 may provide a communication function by using a communication device such as an antenna, signal lines, etc. included in the vehicle system 3300.

The sensor portion 3310 may include various kinds of sensors such as a camera 3312, a proximity sensor 3314, a RADAR sensor 3316, a LIDAR sensor 3318, an illuminance sensor 3319, etc. The electronic device 110*a* for vehicle may provide various functions by using signals obtained by the sensor portion 3310. The electronic device 110*a* for vehicle may include an additional sensor.

The vehicle driving system 3320 performs mechanical operations related to the driving of the vehicle. The vehicle driving system 3320 may include a power system 3322, a braking system 3324, a steering system 3326, etc.

The ECU 3330 controls overall operations of the vehicle. The ECU 3330 may control operations of the elements in the vehicle system 3300 such as the vehicle driving system 3320, the sensor portion 3310, the GPS 3340, etc. and overall operations of the vehicle system 3300. The electronic device 110*a* for vehicle may obtain the information related to the sensor portion 3310 and the vehicle driving system 3320 via the ECU 3330, and may transfer data to the elements of the vehicle system 3300 via the ECU 3330 or control the elements of the vehicle system 3300.

The GPS 3340 obtains a GPS signal and provides the GPS signal to the ECU 3330 and the electronic device 110*a* for vehicle.

In addition, one or more embodiments of the disclosure may be implemented as S/W programs including instructions stored in a computer-readable storage medium. Also, one or more embodiments of the disclosure may be implemented as a computer-readable storage medium storing a computer program.

A computer is a device capable of fetching instructions stored in a storage medium and operating according to the instructions, and may include the electronic device for a vehicle according to one or more embodiments of the disclosure.

The computer-readable storage medium may be provided in the form of a non-transitory storage medium. Here, the term "non-transitory" simply denotes that the storage medium is a tangible device, and does not include a signal, but this term does not differentiate between where data is semi-permanently stored in the storage medium and where the data is temporarily stored in the storage medium.

Also, the electronic device for a vehicle and the operating method thereof according to one or more embodiments of the disclosure may be included in a computer program product. The computer program product may be traded between a seller and a buyer as a product.

The computer program product may include a S/W program, or a computer-readable storage medium on which the S/W program is stored. For example, the computer program product may include a product (e.g., a downloadable app) in the form of a S/W program that is electronically distributed through a manufacturer of the electronic device for a vehicle or an electronic market (e.g., Google Play Store or App Store). For electronic distribution, at least a part of a S/W program may be stored in a storage medium or temporarily generated. In this case, the storage medium may include a server of a manufacturer, a server of an electronic market, or a storage medium of a relay server that temporarily stores a S/W program.

The computer program product may include a storage medium of a server or a storage medium of a terminal in a system including the server and the terminal (e.g., an electronic device for a vehicle, a portable electronic device, a wearable device, etc.) Alternatively, when there is a third device (e.g., smartphone) communicating with the server or the terminal, the computer program product may include a storage medium of the third device. Alternatively, the computer program product may include a S/W program itself that is transferred from the server to the terminal or the third device, or from the third device to the terminal.

In this case, one of the server, the terminal, and the third device may execute the computer program product to perform the method according to the embodiments of the disclosure. Alternatively, two or more of the server, the terminal, and the third device may execute the computer program product to implement the method according to the embodiments of the disclosure in a distributed manner.

For example, the server (e.g., a cloud server, an AI server, etc.) may execute the computer program product stored in the server, and may control the terminal communicating with the server to execute the method according to the embodiments of the disclosure.

In another example, the third device may execute the computer program product and may control the terminal communicating with the third device to execute the method according to the embodiments of the disclosure. In detail, the third device may remotely control the electronic device for a vehicle to perform the operating method of the electronic device for a vehicle.

In another example, the third device may execute the computer program product and may control the method according to the embodiment of the disclosure based on a value input from an auxiliary device. In detail, the auxiliary device may obtain surrounding driver information of a surrounding vehicle. The third device may generate and output the accident risk information based on the surrounding driver information obtained from the auxiliary device.

When the third device execute the computer program product, the third device downloads the computer program product from the server and executes the computer program product. Alternatively, the third device may execute the computer program product provided in a preloaded state to perform the method according to the embodiments of the disclosure.

According to the embodiments of the disclosure, an electronic device for a vehicle, the electronic device effectively predicting car accidents taking into account accident models of the vehicle and driver habit information of surrounding vehicles and providing accident risk information to prevent car accidents, an operating method of the electronic device, and a computer-readable storage medium may be provided.

Also, according to the embodiments of the disclosure, car accidents may be prevented effectively and a driver may be guided, by providing accurate and particular guides about situations in which the driver has to be careful and guides for preventing accidents.

Also, according to the embodiments of the disclosure, essential information about drivers of surrounding vehicles may be effectively collected, in order to reduce a load to an electronic device for a vehicle and to address a personal information protecting issue of the drivers of surrounding vehicles.

The embodiments of the disclosure are described as above with reference to accompanying drawings. It will be understood by one of ordinary skill in the art that the disclosure may be implemented in different forms from those of disclosed embodiments of the disclosure without changing technical features or essential characteristics of the disclosure. The embodiments of the disclosure are examples and should not be construed as limiting.

What is claimed is:

1. An electronic device for a vehicle, the electronic device comprising:
   communication circuitry;
   an output interface;
   a memory; and
   at least one processor configured to:
   store, in the memory, accident modeling information including at least one of a history of accidents at a present location, and a first driver habit information of a driver associated with the history of accidents at the present location, the first driver habit information including information on the driver's behaviors and tendencies during driving of the vehicle,
   receive at least a portion of a second driver habit information from at least one external vehicle proximate to the vehicle via the communication circuitry, the second driver habit information including information on a driver's behaviors and tendencies during driving of the at least one external vehicle,
   generate accident risk information based on a degree of similarity between the first driver habit information included in the accident modeling information and the second driver habit information, and
   output the generated accident risk information through the output interface, and
   wherein the first driver habit information and the second driver habit information further include at least one of lane keeping ignorance information, signal compliance information, guide ignorance tendency information, overtaking tendency information, regulated speed compliance information, center-line over information, nonprotected high speed entry information, or bumper-to-bumper driving information.

2. The electronic device of claim 1, wherein the accident model information further includes an accident point defined by geographic coordinates of a historical accident of the present location, and historical driver habit information indicating driving characteristics of drivers involved in the historical accident at the present location.

3. The electronic device of claim 2, wherein the at least one processor is further configured to:
   determine whether the vehicle is disposed within a threshold range of the accident point, and
   based on determining that the vehicle is within the threshold range of the accident point, determine whether at least a partial match exists between at least one historical driver habit information included in the accident modeling information with the second driver habit information, and
   wherein the accident risk information is generated and output to notify a present driver of the vehicle of an accident risk when the at least the partial match exists.

4. The electronic device of claim 3, wherein the accident modeling information includes relative positions of a plurality of vehicles present at the historical accident, and historical driver habit information of historical drivers of the plurality of vehicles present at the historical accident, the at least one processor is further configured to:
   for a given position indicated in the accident modeling information, compare a driver habit information of a driver disposed at the given position in the accident modeling information with the second driver habit information, when the at least one external vehicle is presently disposed at the given position.

5. The electronic device of claim 1, wherein the accident modeling information includes an attribute of a first historical vehicle indicated in the accident history, and a locational position of the first historical vehicle in the accident history, and
   wherein generating the accident risk information is further based on detecting that the at least one external vehicle has an attribute corresponding to the attribute of the first historical vehicle, and is disposed at a location position corresponding to the locational position of the first historical vehicle in the accident history.

6. The electronic device of claim 1, wherein the at least one processor is further configured to:
   calculate predicted routes of the vehicle and the at least one external vehicle, and calculate a predicted accident point between the vehicle and the at least one external vehicle based on the accident modeling information and the at least the portion of the second driver habit information,
   wherein outputting the generated accident risk information further includes outputting the calculated predicted routes and the predicted accident point through the output interface.

7. The electronic device of claim 1, further comprising a haptic device installed in a steering wheel of the vehicle, wherein outputting the accident risk information further includes controlling the haptic device to vibrate.

8. The electronic device of claim 7, wherein the haptic device includes a plurality of vibrational generators disposed at different locations within the steering wheel, and
   wherein the at least one processor is further configured to selectively vibrate some of the vibrational generators from among a totality of the plurality of vibrational generators to indicate by vibration a direction indicated by the accident risk information.

9. The electronic device of claim 1, further comprising one or more cameras,
   wherein the at least one processor is further configured to:
   capture imagery of surrounding vehicles proximate to the vehicle by the one or more cameras,
   select one of the surrounding vehicles as the at least one external vehicle for which the at least the portion of the second driver habit information is requested, based on a license plate number of the at least one external vehicle as depicted in the captured imagery, and
   transmit a request for the at least the portion of the second driver habit information to the external vehicle using the communication circuitry based on the license plate number.

10. The electronic device of claim 9, wherein the at least one processor is further configured to:
    detect occurrence of an accident based on at least one of imagery obtained from the camera of the vehicle, a detection signal generated by a sensor in the vehicle, an abnormal system deactivation of the vehicle, and accident information received from an external server.

11. The electronic device of claim 1, wherein the at least one processor is further configured to:
- identify a present driver of the vehicle via authentication of the present driver, and
- when the present driver is authenticated, retrieve a driver habit information of the present driver,
- wherein the accident risk information is generated further based on the driver habit information of the present driver, the accident modeling information, and the at least the portion of the second driver habit information.

12. The electronic device of claim 11, wherein the present driver is authenticated through biometric information.

13. The electronic device of claim 11, wherein the driver habit information of the present driver is retrieved from a server via the communication circuitry, and
- wherein the at least one processor is further configured to:
- collect update information by monitoring driving characteristics of the present driver as the present driver operates the vehicle and update the driver habit information of the present driver based on the collected update information, and
- upload the updated driver habit information to the server via the communication circuitry.

14. The electronic device of claim 1, wherein the at least one processor is further configured to:
- receive input of a destination and generate a navigational route to the destination; and
- determine an accident-prone portion of the navigational route for which there is a threshold level of accident risk, based on the destination and the accident modeling information.

15. The electronic device of claim 14, wherein the at least one processor is further configured to:
- alter the navigational route to avoid the accident-prone portion of the navigational route, and
- output the altered generated navigational route via the output interface.

16. The electronic device of claim 1, wherein the at least the portion of the second driver habit information includes at least one of present driving characteristics of a nearby driver of the at least one external vehicle captured in real-time, and historical driving characteristics of the nearby driver accumulated over a historical time period, and
- wherein the accident risk information is further generated based on the at least one of the present driving characteristics of the nearby driver, and the historical driving characteristics of the nearby driver.

17. The electronic device of claim 1, further comprising an interior sensor for monitoring an interior of the vehicle, wherein the at least one processor is further configured to:
- monitor an interior situation of the vehicle using the interior sensor,
- wherein the accident risk information is generated further based on the monitored interior situation of the vehicle.

18. A method of an electronic device in a vehicle, the method comprising:
- storing, in a memory, accident modeling information including at least one of a history of accidents at a present location, and a first driver habit information of a driver associated with the history of accidents at the present location, the first driver habit information including information on the driver's behaviors and tendencies during driving of the vehicle;
- receiving, via communication circuitry, at least a portion of a second driver habit information from at least one external vehicle proximate to the vehicle, the second driver habit information including information on a driver's behaviors and tendencies during driving of the at least one external vehicle;
- generating, via a processor, accident risk information based on a degree of similarity between the first driver habit information included in the accident modeling information and the second driver habit information; and
- outputting the generated accident risk information through an output interface, and
- wherein the first driver habit information and the second driver habit information further include at least one of lane keeping ignorance information, signal compliance information, guide ignorance tendency information, overtaking tendency information, regulated speed compliance information, center-line over information, non-protected high speed entry information, or bumper-to-bumper driving information.

19. A non-transitory computer-readable recording medium having stored thereon computer program instructions for performing, when executed by a processor, an operating method of an electronic device for a vehicle, wherein the operating method comprises:
- storing, in a memory, accident modeling information including at least one of a history of accidents at a present location, and a first driver habit information of a driver associated with the history of accidents at the present location, the first driver habit information including information on the driver's behaviors and tendencies during driving of the vehicle;
- receiving, via communication circuitry, at least a portion of a second driver habit information from at least one external vehicle proximate to the vehicle, the second driver habit information including information on a driver's behaviors and tendencies during driving of the at least one external vehicle;
- generating, via the processor, accident risk information based on a degree of similarity between the first driver habit information included in the accident modeling information and the second driver habit information; and
- outputting the generated accident risk information through an output interface.

* * * * *